(12) United States Patent
McKnight et al.

(10) Patent No.: US 11,198,655 B2
(45) Date of Patent: Dec. 14, 2021

(54) NON-AQUEOUS ORGANO LIQUID DELIVERY SYSTEMS CONTAINING DISPERSED ORGANO POLYCARBOXYLATE FUNCTIONALITIES THAT IMPROVES EFFICIENCIES AND PROPERTIES OF NITROGEN SOURCES

(71) Applicants: Gary David McKnight, High Point, NC (US); Randall Linwood Rayborn, Burlington, NC (US)

(72) Inventors: Gary David McKnight, High Point, NC (US); Randall Linwood Rayborn, Burlington, NC (US)

(*) Notice: Subject to any disclaimer, the term of this patent is extended or adjusted under 35 U.S.C. 154(b) by 70 days.

(21) Appl. No.: 16/273,051

(22) Filed: Feb. 11, 2019

(65) Prior Publication Data
US 2019/0248714 A1    Aug. 15, 2019

Related U.S. Application Data

(60) Provisional application No. 62/629,060, filed on Feb. 11, 2018.

(51) Int. Cl.
| | | |
|---|---|---|
| *C05G 5/30* | (2020.01) | |
| *C05C 1/00* | (2006.01) | |
| *C05C 9/00* | (2006.01) | |
| *C05C 3/00* | (2006.01) | |
| *C05G 3/90* | (2020.01) | |
| *C09D 7/20* | (2018.01) | |
| *C05F 11/08* | (2006.01) | |
| *C09K 15/16* | (2006.01) | |
| *C09K 15/18* | (2006.01) | |
| *C09K 3/00* | (2006.01) | |
| *C05G 3/60* | (2020.01) | |
| *C05G 5/20* | (2020.01) | |

(52) U.S. Cl.
CPC ............. *C05G 5/37* (2020.02); *C05C 1/00* (2013.01); *C05C 3/005* (2013.01); *C05C 9/005* (2013.01); *C05F 11/08* (2013.01); *C05G 3/60* (2020.02); *C05G 3/90* (2020.02); *C05G 5/20* (2020.02); *C05G 5/30* (2020.02); *C09D 7/20* (2018.01); *C09K 3/00* (2013.01); *C09K 15/16* (2013.01); *C09K 15/18* (2013.01)

(58) Field of Classification Search
None
See application file for complete search history.

(56) References Cited

U.S. PATENT DOCUMENTS

| | | | | |
|---|---|---|---|---|
| 3,961,932 | A | * | 6/1976 | Miller ..................... C05B 1/02 71/1 |
| 4,172,072 | A | | 10/1979 | Ashmead |
| 4,799,953 | A | | 1/1989 | Danzig et al. |
| 4,804,403 | A | * | 2/1989 | Moore ............... C08G 18/4213 71/28 |
| 4,813,997 | A | | 3/1989 | Kinnersley et al. |
| 4,839,461 | A | | 6/1989 | Boehmke |
| 4,863,506 | A | | 9/1989 | Young |
| 5,047,078 | A | | 9/1991 | Gill |
| 5,059,241 | A | | 10/1991 | Young |
| 5,350,735 | A | | 9/1994 | Kinnersley et al. |
| 5,593,947 | A | | 1/1997 | Kinnersley et al. |
| 5,783,523 | A | | 7/1998 | Koskan et al. |
| 5,814,582 | A | | 9/1998 | Koskan et al. |
| 6,391,406 | B1 | * | 5/2002 | Zenner ................ B65D 81/266 252/188.28 |
| 6,709,724 | B1 | * | 3/2004 | Teumac ............... B65D 81/266 206/204 |
| 6,753,395 | B2 | | 6/2004 | Sanders et al. |
| 6,756,461 | B2 | | 6/2004 | Sanders et al. |
| 6,818,039 | B2 | | 11/2004 | Sanders et al. |
| 8,016,907 | B2 | | 9/2011 | Sanders et al. |
| 8,025,709 | B2 | | 9/2011 | Sanders et al. |
| 8,043,995 | B2 | | 10/2011 | Sanders et al. |
| 8,888,886 | B1 | * | 11/2014 | Whitehurst .............. C05G 3/90 71/28 |
| 9,139,481 | B2 | | 9/2015 | Sanders |
| 9,359,264 | B2 | | 6/2016 | Sanders |
| 10,273,194 | B2 | | 4/2019 | McKnight et al. |
| 10,301,230 | B2 | | 5/2019 | McKnight et al. |
| 10,464,858 | B2 | | 11/2019 | McKnight et al. |
| 2004/0031303 | A1 | * | 2/2004 | Whitehurst ............. C05C 9/00 71/28 |
| 2009/0301972 | A1 | * | 12/2009 | Hines ..................... C04B 24/12 210/705 |
| 2011/0296886 | A1 | * | 12/2011 | Gabrielson ............. C05G 3/90 71/29 |
| 2013/0143039 | A1 | * | 6/2013 | Wilbur .................... C09D 7/20 428/339 |
| 2014/0037570 | A1 | * | 2/2014 | Whitehurst ............ C05C 9/005 424/76.6 |
| 2014/0171327 | A1 | * | 6/2014 | Armstrong ........... C11D 3/3753 504/359 |
| 2015/0376077 | A1 | * | 12/2015 | Barr ....................... C05G 5/37 71/28 |
| 2016/0060184 | A1 | * | 3/2016 | Gabrielson ............. C05G 3/90 71/30 |
| 2017/0050895 | A1 | * | 2/2017 | Ortiz-Suarez ......... C09K 15/18 |
| 2017/0369385 | A1 | * | 12/2017 | Schmid .................. C05G 3/90 |

* cited by examiner

*Primary Examiner* — Wayne A Langel
(74) *Attorney, Agent, or Firm* — Ben Schroeder Law, PLLC

(57) ABSTRACT

The present invention comprises one or more organic solvents that create a non-aqueous organo solvent delivery system, (NOSDS), and one or more Organo Polycarboxylate functionalities, OPCF, that results in a stable, non-aqueous solution that can easily, safely, evenly and economically coat nitrogen source granules and/or be added to a mobile liquid form of a nitrogen source such as an aqueous dispersion, pressurized ammonia gas or molten urea and/or molten modified urea. Using these solvents provides more flexibility for nitrogen source manufacturers to produce nitrogen sources designed for a particular soil or plant. The liquid solutions are comprised of NOSDS and OPCFs and one or more of a) nitrification inhibitors, b) urease inhibitors, c) pesticides, d) fungicides, e) herbicides, f) insecticides and g) micronutrients.

11 Claims, No Drawings

NON-AQUEOUS ORGANO LIQUID DELIVERY SYSTEMS CONTAINING DISPERSED ORGANO POLYCARBOXYLATE FUNCTIONALITIES THAT IMPROVES EFFICIENCIES AND PROPERTIES OF NITROGEN SOURCES

The present invention claims priority under 35 USC 119(e) to US Provisional Patent Application No. 62/629,060 filed Feb. 11, 2018, the entire contents of which are incorporated by reference in its entirety.

FIELD OF INVENTION

The present invention relates to improving the efficiency of man-made and/or natural organic-based nitrogen sources by administration of liquid solutions containing Organo Polycarboxylate Functionalities, OPCF(s), dispersed in a Non-aqueous Organo Solvent Delivery System (NOSDS). Utilizing a NOSDS allows for the quick and even distribution of OPCFs onto/into nitrogen sources whether the nitrogen sources are liquid, molten, pressurized gas or a granule/prill/solid. The OPCFs dispersed in a NOSDS can impart better physical/chemical properties to urea prills and granules, aids in the conservation of nitrogen, deliver micronutrients in a complexed, plant available form and liberates, in a plant available form, the micronutrient metals and macronutrients that are bound as insoluble salts and complexes in the soil.

BACKGROUND OF THE INVENTION

Macronutrients (N, K, Ca, Mg, P, and S) and micronutrients (Fe, B, Mn, Zn, Cu, Mo, Co, and Ni) are crucial to a plant's growth, development, disease resistance and various metabolic pathways such as photosynthesis. Plant available micronutrient insufficiencies are due to traditional farming methods that have exhausted the soil and to the micronutrient metals existing as water insoluble salts and complexes. Many of the water insoluble forms in the soil involve a metal cation and boron, sulfur, or phosphorous based anions. A deficiency in micronutrients results in poor plant growth and development and thus in diminished yields (Mortvedt 1990). Plant requirements for many of the micronutrients can be as low as parts/million in the plant tissue. It is known that increasing the plant available micronutrient metal ions by addition of complexed metal ions to the soil or to plant foliage or by freeing up micronutrients, bound in the soil as an insoluble salts or complexes, in a plant absorbable form can help to significantly alleviate soil deficiencies and assist in development, growth, and disease resistance of the plants.

Phosphorous is second to nitrogen as the most limiting macronutrient. In the case of phosphorus fertilizer, 40% of landscape soil is considered to contain inadequate levels of phosphorus for woody plant growth. Moreover, most of the phosphorus in the soil is largely inaccessible as it exists in a form that is not soluble in water and thus is not readily available to plants. In some cases, only 0.01% of the total soil phosphorus is in the form of a water soluble ion, the only form which can be absorbed by the plant. Adequate and accessible soil phosphorus is essential for optimal crop yields. Phosphorus enables a plant to store and transfer energy, promotes root, flower and fruit development, and allows early maturity. Phosphorus is also involved in many processes critical to plant development such as photosynthesis where plants utilize organic phosphorous compounds when converting sunlight to energy. Without enough phosphorus present in the soil, plants cannot grow sufficient root structure, which is key to the plant's ability to absorb water and nutrients from the soil. Moreover, woody plants, without sufficient root structure cannot maintain an equilibrium between roots and shoots, which is key to surviving drought, windy weather, and/or pests. Many of the nutrients required by plants are locked into salts and complexes that are water insoluble and therefore not plant available.

DESCRIPTION OF RELATED ART

To overcome these challenges, the agriculture industry has turned to chelates and anionic based polymers to form water soluble complexes with metal cations such as the micronutrients Ca, Mg, Mn, Fe, Cu, Co Ni, Zn, and Mo resulting in freeing up bound macronutrients such as phosphorous. The current delivery system technology of the chelates and polymer based products is water. Water is not only an excellent solubilizing/dispersing medium for chelates and OPCFs, but can solvate a high load of water soluble metal salts. However, the use of water soluble metal salts can form insoluble complexes with certain fertilizer components such as monoammonium and diammonium phosphates and with anions in the soil such as phosphates. While the micronutrients are present in the soil they are in a water insoluble complex and unavailable to plants.

To present, multiple products have been developed to try to:
Increase the efficiency of the release of macronutrients, such as phosphorus, from a fertilizer formulation in plant absorbable form,
Release nutrients bound in the soil as insoluble salts and complexes
Deliver fertilizer formulations that contains micronutrients in a plant available form.

The mechanisms of action for the vast majority of these products are similar. When a fertilizer containing nitrogen sources and phosphorus is applied to the soil, most of the phosphorous is in a water-soluble phosphate ion form, the only form of phosphorus that is readily absorbed by the plant. In the presence of moisture, however, these soluble phosphate anions can form complexes with metal cations such as calcium, magnesium, iron, and aluminum which have very low solubility in water and thus, cannot be readily absorbed by plants. Polymers with negatively charged ions can complex with the metal cations resulting in a freed, water-soluble phosphate anion and with the metal cation in a plant available form. Both the phosphate anion and the OPCF complexed cation are now more readily available to plants for absorption.

Variations of the above described mechanism are listed in the patents below, which are incorporated by reference in their entireties. These methods have been proposed and developed for the release of nutrients bound in the soil, a delivery system for micronutrients to soil and to seeds and the manufacturing processes to produce the metal cation complexing OPCFs.

Boehmke (U.S. Pat. No. 4,839,461) teaches how to synthesize and use a man-made version of polyaspartic acid and its salts that prevents incrustations formed by the metal ions that are responsible for hard water. Boehmke further discloses that this compound can be used as a fertilizer.

Ashmead (U.S. Pat. No. 4,172,072) discloses the use of protein sources to form metal proteinates, which are in a biologically accepted form. Others reveal carboxylic containing entities either as monomers or as polymers such as Danzig (U.S. Pat. No. 4,799,953), which utilizes polymers of thiolactic acid or thioglycolic acid and thiolactic acid, dithiobispropanoic acid and dithiobisacetic acid, Kinnersley (U.S. Pat. No. 4,813,997), which utilizes glycolic and/or lactic acid, and Young (U.S. Pat. Nos. 4,863,506 and 5,059,241) that disclose that d-lactic acid can promote increased plant growth, increased concentration of chlorophyll, and increase the rate of root formation.

Gill (U.S. Pat. No. 5,047,078) utilized scale inhibiting compounds such as those based on polymers of ethylenically unsaturated carboxylic acids and/or maleic acid/anhydride monomers and/or phosphorous based chelators such as dihydroxy ethylidene diphosphonic acid to make available nutrients bound in the soil as insoluble salts and complexes resulting in increased growth and yields.

Kinnersley (U.S. Pat. Nos. 5,350,735 and 5,593,947) and Koskan (U.S. Pat. Nos. 5,783,523 and 5,814,582) teach using poly (organic) acids like poly (amino acids) such as poly(aspartic) acid to enhance fertilizer uptake and promote plant growth.

Sanders (U.S. Pat. Nos. 6,753,395, 6,756,461, 6,818,039, and 8,043,995) demonstrate that man-made OPCFs based on maleic, itaconic and/or citraconic anhydrides can be utilized to enhance nutrient uptake by plants.

Sanders (U.S. Pat. Nos. 8,016,907 and 8,025,709) show the importance of having a quick drying product that one can apply to the surface of granules for fertilizer. Sanders accomplish this by using 10-50% of a volatile alcohol such as methanol. This technology utilizes volatile organic solvents to promote quick drying, which increases the VOC release and utilizes a low flash point alcohol such as methanol adding an unnecessary flammable hazard to the processing of a fertilizer.

Sanders (U.S. Pat. Nos. 9,139,481 and 9,359,264) discusses a composition comprising of anhydrous ammonia, ammonia solution, and an agricultural active comprising a polyanionic polymer. In this innovation, he describes the use of polyanionic polymer containing maleic and itaconic repeat units being dispersed in an ammonia solution. The ammonia solution is formed by adding $NH_3$ to his polyanionic polymer converting the water that is utilized in his method of making, to the ammonia solution which lowers the potential for violent and uncontrolled exothermic reaction when water is exposed to anhydrous ammonia. However, the polyanionic polymer in an ammonium hydroxide has a preferred pH range of 9.5-11.5 resulting in the handling and shipping requiring protective equipment for skin and especially lungs and eyes due to the corrosivity, strong ammonia odors and requiring spill containment measure since ammonium hydroxide is an aquatic toxicant. The presence ammonium hydroxide would also make it extremely difficult to incorporate other bio-active agents such as but not limited to family of urease inhibitors alkyl thiophosphoric triamides and nitrification inhibitors dicyandiamide and 2-chloro-6-trichloromethyl)pyridine that are normally associated with anhydrous ammonia formulations. The presence of ammonium hydroxide would also limit utility as a coating for fertilizer granules or injection/spraying into molten urea and/or molten modified urea production processes.

McKnight (U.S. patent application Ser. Nos. 14/740,327, 15/079,844) discloses compositions comprising poly(organic acids) dispersed in organic liquid solvating systems and their utility in application to fertilizers and the impact of freeing up macronutrients and micronutrients bound in the soil as insoluble salts and complexes. He also discusses that these poly(organic acids) in an organic liquid solvating system can also comprise micronutrients.

McKnight (U.S. patent application Ser. No. 15/854,319) discusses combining DCD/formaldehyde oligomers/polymers and alkyl pyrazoles/formaldehyde oligomers/polymers with poly(organic acids) and that these compositions can be added to molten urea.

In an embodiment, the presence of water in many of these innovation will limit utilizing these innovation in anhydrous ammonia or charging into molten urea/molten modified urea manufacturing processes. Coating a nitrogen source with water as the solvent for Organo Polycarboxylate functionalities can result in severe clumping of the nitrogen sources granules/prills during blending and clumping has a negative impact on the Organo Polycarboxylate functionalities' effectiveness to complex with metal cations. The use of aqueous based Organo Polycarboxylate functionalities can have a deleterious impact on the urease inhibitor, NBPT, whether the application technique is coating nitrogen sources or an addition to a molten urea and/or molten modified urea production process. The presence of water can negatively impact dicyandiamide (DCD) due to the temperatures associated with a molten urea and/or molten modified urea production process. Not being bound by theory, the presence of water can cause the conversion of the cyano group to an amido group resulting in poorer performance as nitrification inhibitor.

The agricultural industry needs a flexible technology that is capable of incorporating liquid Organo Polycarboxylate functionalities with a nitrogen source through various application routes such as of the surface of a nitrogen source and/or the dispersal into a mobile liquid form of a nitrogen source such as aqueous dispersion, pressurized ammonia gas or molten urea and/or molten modified urea and the capability to incorporate other bio-active agents through the use solubilizing properties of the liquid solutions' non-aqueous organo solvent delivery system. The industry needs liquid solutions low in moisture, rated safe for humans, plant and animals contact and environmental friendly. The technology needs to ensure an even distribution of the Organo Polycarboxylate functionalities and/or any accompanying bio-active agents whether the application technique involves a coating of the surface of a nitrogen source and/or the dispersal into a mobile liquid form of a nitrogen source such as aqueous dispersion, pressurized ammonia gas or molten urea and/or molten modified urea.

SUMMARY OF THE INVENTION

The present invention is comprised of one or more organic solvents that create a non-aqueous organo solvent delivery system, (NOSDS), and one or more Organo Polycarboxylate functionalities, OPCF, that results in a stable, non-aqueous solution that can easily, safely, evenly and economically coat nitrogen source granules and/or be added to a mobile liquid form of a nitrogen source such as aqueous dispersion, pressurized ammonia gas or molten urea and/or molten modified urea.

In an embodiment, the present invention provides more flexibility for nitrogen source manufacturers to produce nitrogen sources designed for a particular soil or plant. In a variation, the liquid solutions are comprised of NOSDS and OPCFs and one or more members selected from the group consisting of a) nitrification inhibitors, b) urease inhibitors, c) pesticides, d) fungicides, e) herbicides, f) insecticides and g) micronutrients.

In an embodiment, the present invention relates to improving the efficiency of man-made and/or natural organic-based animal manure nitrogen sources by administration of solutions containing Organo Polycarboxylate functionalities, OPCFs, dispersed in a Non-aqueous Organo Solvent Delivery System (NOSDS) through the delivery of micronutrients that improve the uptake of nitrogen by plants and with a subsurface application of a nitrogen source, provide a film in the root zone that assist in the movement of micronutrients and water to a plant's roots and thus to the plants. In an embodiment, utilizing the liquid solutions allows for coating the surface of nitrogen source granule/prill and/or adding to a mobile liquid form of nitrogen sources such as aqueous dispersions, pressurized ammonia gas and molten urea and/or molten modified urea, In an embodiment, the presence of OPCFs in soil results in the liberation, in a plant available form, of micronutrient cation metals and macronutrients, that are bound as insoluble salts and complexes in the soil. In an embodiment, OPCFs, when applied to the surfaces of one or more fertilizer components selected from the group consisting of monoammonium phosphate, diammonium phosphate, and one or more micronutrient inorganic salts wherein the salts' cations are one or more micronutrients selected from the group consisting of Mg, Ca, Fe, Zn, Mn, Cu, Co, Mo and Ni, renders the phosphates and the micronutrient cations less likely to be bound in the soil as an insoluble salt or complex.

In an embodiment, the carboxylate functionalities of a OPCF dispersed within a NOSDS is comprised of one or more members selected from the group consisting of a) carboxylic acids, b) carboxylic anhydrides c) carboxylic imides, d) carboxylic esters and e) carboxylic salts. In a variation, the carboxylic salts are derived from the reaction of a neutralizing agent with the carboxylate functionality wherein neutralizing agents are comprised of one or more metal cations and one or more nitrogen containing compounds. In a variation, the metal cations are derived from one or more members selected from the group consisting of a) elemental metals b) metal oxides c) metal hydroxides, d) metal alkylates and e) metal carbonates. In another variation, the one or more nitrogen containing compounds are selected from the group consisting of ammonia, ammonium hydroxide and organoamines. In another variation, the said carboxylic salts dissolved in a NOSDS form a stable solution that can contain completely complexed micronutrients and provide the vehicle for the delivery of these nutrients to soils, to a mobile liquid form of nitrogen sources such as aqueous dispersions, pressurized gases and molten urea and/or molten modified urea, as a coating to the surfaces of nitrogen source granules and/or to the surfaces of mixed fertilizer components.

In an embodiment, the one or more metal cations' portion of the neutralizing agent is selected from the group consisting of: Na, K, Mg, Ca, Fe, Zn, Mn, Cu, Co, Mo and Ni.

In an embodiment, the one or more organoamine neutralizing agents is selected from the group consisting of: a) mono $C_{1-6}$ amine, b) di $C_{1-6}$ amine, c) tri $C_{1-6}$ amine, d) monoethanolamine, e) diethanolamine, f) triethanolamine, g) monoisopropanolamine, h) diisopropanolamine, i) triisopropanolamine, j) ethylenediamine, k) diethylene triamine, l) triethyl tetraamine, m) tetraethylpentamine.

In an embodiment, one method of making the OPCFs comprise one or more of the following steps a) dispersing/suspending poly(organic acids/esters) monomers within a NOSDS, b) heating to a temperature such that the monomers are solubilized within a NOSDS polymerization, with or without catalysts. The resulting OPCF can be utilized as is or can be further reacted to form carboxylic salts wherein the carboxylic salt is derived from the reaction of a neutralizing agent with the carboxylate functionalities wherein the neutralizing agents are comprised of one or more metal cations and one or more nitrogen containing compounds. In a variation, the metal cations are derived from one or more members selected from the group consisting of a) elemental metals b) metal oxides c) metal hydroxides, d) metal alkylates and e) metal carbonates. In another variation, the one or more nitrogen containing compounds are selected from the group consisting of ammonia, ammonium hydroxide and organoamines.

In an embodiment, the resulting liquid compositions of OPCFs in a NOSDS and the methods to produce a OPCF within a NOSDS results in a flowable, low moisture liquid solution that can be readily mixed with mobile liquid forms of nitrogen sources, applied safely, quickly, evenly and economically on the surface of solid nitrogen source granules or applied directly to the soil.

In embodiments, the present invention relates to non-aqueous organo solvent delivery system solutions (NOSDS) dissolves and/or dispersing OPCFs for application to man-made and/or natural organic based animal manure nitrogen sources.

In one embodiment, the invention proposes solutions of NOSDS that comprise one or more organic solvents selected from the group consisting of aprotic and protic solvents, which are environmentally friendly and are safe for manufacturers, transporters and others who work with/handle the liquid solutions.

In one embodiment, non-aqueous liquid delivery solutions have been developed that deliver effective levels of OPCFs to soil either through direct application to the soil, through incorporation with a nitrogen source and coating a mixed fertilizers or a fertilizer components that contains other nutrients such a MAP (monoammonium phosphate), DAP (diammonium phosphate), one or more micronutrient inorganic salts wherein the salts' cations are one or more micronutrients selected from the group consisting of Mg, Ca, Fe, Zn, Mn, Cu, Co, Mo and Ni. Examples of these micronutrient inorganic salts are but not limited to calcium carbonates, limes, zinc sulfate, manganese sulfate, zinc chloride and copper sulfate. In an embodiment, OPCFs not only liberate nutrients bound in the soil as insoluble salts and complexes, when applied to the surfaces of ammonium phosphates and/or micronutrient inorganic salts assist in preventing these nutrients from forming complexes with components in the soil that are water insoluble.

In an embodiment, the liquid solutions of OPCFs are dispersed/dissolved in a non-aqueous organo solvent delivery systems (NOSDS)s that improve the storage life urease inhibitors such as alkyl thiophosphoric triamides, acetohydroxamic acid and its derivatives, phosphodiamidates relative to those solutions utilizing water as the solvent delivery system. In a variation, one can combine OPCFs, nitrification inhibitors, pesticides, fungicides, herbicides, insecticides and urease inhibitors into one product by either blending together the dispersions of each active ingredient or by combining the pesticides, fungicides, herbicides, insecticides and the nitrification and urease inhibitors within the same NOSDS.

In embodiments, the present invention is comprised of OCPFs dissolved within a NOSDS that provides a composition that:

Is environmentally safe,

Has flashpoints above 145° F.,

Is inherently rated safe for contact with humans and animals,

Provides stable dispersions of OPCFs at levels of 1-70% in a NOSDS, wherein said level includes all possible combinations between stated level such as levels of 5-70%, 5-65%, 10-70%, 10-65%, etc.

Provides even application of a coating to fertilizer granules while not causing clumping of the nitrogen source granules, Contains less than 5% water, Quickly and evenly disperses into mobile liquid form of nitrogen sources such as aqueous dispersion, pressurized ammonia gas, molten urea and/or molten modified urea, will not cause a violent exotherm when mixed with anhydrous ammonia.

In one embodiment, NOSDS of the present invention can be optimized to provide a solution with a high concentration of OPCFs while maintaining a low chill point by combining two or more organic solvents.

In one embodiment, the method of making the liquid solution comprises a) heating the NOSDS to temperature range of 60-100° C., b) charging OPCFs to weight percent levels of 10-60% of the total formula composition, c) mixing until OPCFs is dissolved in the NOSDS and d) cool the mixture to below 40 C and packaged.

In one embodiment, the present invention relates to an effective NOSDS that comprises dimethyl sulfoxide (DMSO). In a variation, another NSODS can be added to improve the evenness of the dispersal of the liquid solution into a mobile liquid form of nitrogen sources, to lower viscosity and improve solvating properties for bio-active agents. Besides the advantages listed above, DMSO (41% sulfur) is a potential source of the important plant nutrient sulfur.

DETAILED DESCRIPTION

Definitions

Nitrogen source is a general term used to identify fertilizer components that are utilized to provide nitrogen for plants including but not limited to urea, manure, compost, urea formaldehyde reaction products, urea/ammonia/formaldehyde reaction products, ammonium sulfate, ammonium nitrate, anhydrous ammonia, urea/ammonium nitrate aqueous solutions (UAN) and other urea aqueous solutions.

Mobile liquid form of nitrogen sources is a general description of a liquid form of a nitrogen source that is mobile including but not limited to aqueous dispersions, pressurized ammonia and molten urea and molten modified urea.

OPCA is an abbreviation for Organo Polycarboxylic Acid and has been replaced with the term OPCF.

OPCF is an abbreviation for Organo Polycarboxylate Functionalities

Organo Polycarboxylic Acids is a general term used to describe an organic compound and/or polymer with a minimum of three carboxylate functionalities wherein the polycarboxylate functionalities are comprised of one or more functional groups selected from the group consisting of a) carboxylic acids, b) carboxylic anhydrides c) carboxylic imides, d) carboxylic esters and e) carboxylic salts.

Organo Polycarboxylate Functionalities has replaced the term "Organo Polycarboxylic Acid" and is defined as a general term used to describe an organic compound and/or polymer with a minimum of three carboxylate functionalities wherein the polycarboxylate functionalities are comprised of one or more functional groups selected from the group consisting of a) carboxylic acids, b) carboxylic anhydrides c) carboxylic imides, d) carboxylic esters and e) carboxylic salts.

Neutralizing agents are comprised of alkaline compounds that contain one or more of the metal cations such as but not limited to Na, K, Mg, Ca, Fe, Zn, Mn, Cu, Co, Mo and Ni and/or one or more of nitrogen containing compounds such as but not limited to ammonia, ammonium hydroxide and organoamines NOSDS is an abbreviation for a non-aqueous organo solvent delivery system.

Nitrogen source aqueous solution is a generic term to describe a nitrogen source that has been dissolved in water including but not limited to urea, urea and/or ammonium nitrate (UAN) and other mixed nitrogen sources.

Modified urea is a generic term used to describe urea that has been chemically modified with one or more reactive agents selected from the group consisting of a) formaldehyde, modified formaldehydes including but not limited to paraformaldehyde, trioxane, methoxy capped formaldehyde reaction products including but not limited to 1,3,4,6-Tetrakis(methoxymethyl)glycoluril and N,N,N',N',N",N"-Hexakis(methoxymethyl)-1,3,5-triazine-2,4,6-triamine and/or may contain one or more bio-active agents.

Treated urea and/or treated modified urea are terms used to describe urea and modified urea whose composition comprises the invention's liquid solutions.

Bio-active agent is a generic term used to describe compounds manmade and products of natural processes that imparts one or more properties to soil selected from the group consisting of urease inhibition, nitrification inhibition, de-nitrification inhibition, pesticides, herbicides, fungicides and insecticides.

Biologics are bio-active agents that are specified as a different category due to their definition as naturally occurring substances, substances produced by natural processes such as fermentation and/or extracts of naturally occurring substances.

Ranges of Compositions are defined as when a range is discussed, it is contemplated and therefore within the scope of the invention that any number that falls within that range is contemplated as an end point generating a plurality of sub-ranges within that range. For example if a range of 1-10 is given, 2, 3, 4, 5, 6, 7, 8, and 9 are contemplated as end points to generate a sub-range that fit within the scope of the enumerated range.

Temperature Ranges are defined as when a range is discussed, it is contemplated and therefore within the scope of the invention that any number that falls within that range is contemplated as an end point generating a plurality of sub-ranges within that range. For example if a range of 1-10° C. is given, 2, 3, 4, 5, 6, 7, 8, and 9° C. are contemplated as end points to generate a sub-range that fit within the scope of the enumerated range In an embodiment, the present invention is comprised of one or more organic solvents that create a non-aqueous organo solvent delivery system, (NOSDS), and one or more Organo Polycarboxylate functionalities, OPCFs, in stable, non-aqueous dispersions that can coat nitrogen source granules easily, safely, evenly and economically and/or be added to a mobile liquid form of a nitrogen source such as aqueous dispersion, pressurized ammonia gas or molten urea and/or molten modified urea.

In an embodiment, these delivery solutions provide a liquid vehicle to deliver an even, non-clumping coating of the desired OPCFs to the surfaces of nitrogen source granules and to quickly deliver dispersed levels of OPCFs into a molten urea and/or molten modified urea.

In another embodiment, solutions based on non-aqueous organo solvent delivery systems, NOSDS, do not negatively impact the storage life of important urease inhibitors, such as alkyl thiophosphoric triamides (such as NBPT). Alkyl thiophosphoric triamides have been shown to be extremely effective urease inhibitors but if present in combination with an aqueously dispersed OPCF and/or its salt, will suffer from degradation upon storage. Thus, in one embodiment the present invention relates to compositions that are substantially free of water wherein the composition comprises <5% water.

In an embodiment, a stable dispersion of one or more OPCFs in a non-aqueous organo solvent delivery system, NOSDS, can further comprise one or more members selected from the group consisting of:
  one or more bio-active agents selected from the group consisting of i) urease inhibitors, ii) nitrification inhibitors, iii) pesticides, iv) herbicides, v) fungicides and vi) insecticides,
  one or more visual aids selected from the group consisting of as food colors, dispersion of pigments, colorants or dyes, wherein the inclusion of visual aids improve the visual evidence of complete coverage and serve as a visual marker, wherein the visual aids contain <5% water and/or low molecular weight alcohols, and wherein % composition of the invention's liquid solution can optionally comprise 0.1-2.5% of the active colorant or dye,
  scents or masking agents to improve the odor of the formula,
  nonionic, anionic, cationic, zwitterionic, and/or amphoteric surfactants to improve formula application performance of nitrogen source granules,
  buffering agents, micronutrients and flow modifiers such as silica, zinc stearate, calcium stearate and the like,
  One or more crosslinking agents selected from the group consisting of i) paraformaldehyde, ii) trioxane, iii) one or more methoxy capped formaldehyde reaction products including but not limited to 1,3,4,6-Tetrakis (methoxymethyl)glycoluril and N,N,N',N',N'',N''-Hexakis(methoxymethyl)-1,3,5-triazine-2,4,6-triamine.

In one embodiment, the solvent formulations, NOSDS, of the present invention meet one or more of the following criteria:
  are environmentally safe,
  have flashpoints above 145° F.,
  are inherently rated safe for contact with humans and animals,
  provides stable dispersions of OPCFs at levels of 1-70% in a NOSDS, wherein said level includes all possible combinations between stated levels such as levels of 5-70%, 5-65%, 10-70%, 10-65% and etc.,
  provides even application of a coating to fertilizer granules while not causing clumping of the nitrogen source granules,
  contains less than 5% water,
  quickly and evenly disperses into mobile liquid forms of nitrogen sources such as aqueous dispersion, pressurized ammonia gas, molten urea and/or molten modified urea,
  will not cause a violent exotherm when mixed with anhydrous ammonia.

In an embodiment, the carboxylate functionalities of a OPCF dispersed within a NOSDS is comprised of one or more functional groups selected from the group consisting of a) carboxylic acids, b) carboxylic anhydrides c) carboxylic imides, d) carboxylic esters and e) carboxylic salts wherein said salt is derived from the reaction of a neutralizing agent with carboxylate functionalities, wherein the neutralizing agents are comprised of one or more metal cations and one or more nitrogen containing compounds. In a variation, the metal cations are derived from one or more members selected from the group consisting of a) elemental metals b) metal oxides c) metal hydroxides, d) metal alkylates and e) metal carbonates. In another variation, the one or more nitrogen containing compounds are selected from the group consisting of ammonia, ammonium hydroxide and organoamines. In another variation, the said carboxylic salts dissolved in a NOSDS form a stable dispersion that can contain completely complexed micronutrients and provide the vehicle for the delivery of these nutrients to soils, to a mobile liquid form of nitrogen sources such as aqueous dispersions, pressurized gases and molten urea and/or molten modified urea, as a coating to the surfaces of nitrogen source granules and to the surfaces of mixed fertilizers components.

In an embodiment, the one or more metal cations' portion of the neutralizing agent is selected from the group consisting of: Na, K, Mg, Ca, Fe, Zn, Mn, Cu, Co, Mo and Ni.

In an embodiment, the one or more organoamine neutralizing agents is selected from the group consisting of: a) mono $C_{1-6}$ amine, b) di $C_{1-6}$ amine, c) tri $C_{1-6}$ amine, d) monoethanolamine, e) diethanolamine, f) triethanolamine, g) monoisopropanolamine, h) diisopropanolamine, i) triisopropanolamine, j) ethylenediamine, k) diethylene triamine, l) triethyl tetraamine, m) tetraethylpentamine.

In an embodiment, one method of making the OPCFs comprise one or more of the following steps a) dispersing/suspending poly(organic acids/esters) monomers within a NOSDS and b) heating the monomers/NOSDS to a polymerization temperature with or without catalysts. The resulting OPCF can be utilized as is or is further reacted forming carboxylic salts wherein said salt is derived from the reaction of a neutralizing agent with the carboxylate functionalities and wherein the neutralizing agents are comprised of one or more metal cations and one or more nitrogen containing compounds. In a variation, the metal cations are derived from one or more members selected from the group consisting of a) elemental metals b) metal oxides c) metal hydroxides, d) metal alkylates and e) metal carbonates. In another variation, the one or more nitrogen containing compounds are selected from the group consisting of ammonia, ammonium hydroxide and organoamines.

In an embodiment, the one or more metal cations' portion of the neutralizing agent is selected from the group consisting of: Na, K, Mg, Ca, Fe, Zn, Mn, Cu, Co, Mo and Ni.

In an embodiment, the one or more organoamine neutralizing agents is selected from the group consisting of: a) mono $C_{1-6}$ amine, b) di $C_{1-6}$ amine, c) tri $C_{1-6}$ amine, d) monoethanolamine, e) diethanolamine, f) triethanolamine, g) monoisopropanolamine, h) diisopropanolamine, i) triisopropanolamine, j) ethylenediamine, k) diethylene triamine, l) triethyl tetraamine, m) tetraethylpentamine.

In an embodiment, the resulting liquid compositions of OPCFs in a NOSDS and the methods to produce a OPCF within a NOSDS results in a flowable, low moisture liquid that can be readily mixed with mobile liquid forms of nitrogen sources, applied safely, quickly, evenly and economically on the surface of solid nitrogen source granules and/or applied directly to the soil.

In embodiments, the present invention relates to non-aqueous organo solvent delivery system formulations (NOSDS) dissolving and/or dispersing OPCFs for application to and into man-made and/or natural organic based nitrogen sources.

In one embodiment, the invention proposes formulations of NOSDS that comprise aprotic and protic solvents, which are environmentally friendly and are safe for manufacturers, transporters and others who work with/handle the liquid formulations.

In an embodiment, liquid solutions comprises OPCFs and a NOSDS wherein the NOSDS is comprised of one or more solvents selected from the group consisting of protic and aprotic solvents, wherein one or more protic solvent is selected from the group consisting of: 1) an alcohol from the family of $C_{1-10}$ alkanols, 2) one or more polyols selected from the group consisting of trimethylol propane, trimethylol ethane, pentaerythritol, sorbitol and sorbitan, glucose, fructose, galactose, and glycerin, 3) poly($C_{1-10}$ alkylene) glycols, 4) one or more alkylene glycols selected from the group consisting of ethylene, 1,3 propylene glycol, 1,2 propylene glycol, and butylene glycol, 5) isopropylidene glycerol 6) one or more alkylene glycol alkyl ethers selected from the group consisting of tripropylene glycol methyl ether, tripropylene glycol butyl ether, dipropylene glycol butyl ether and dipropylene glycol butyl ether, 7) one or more alkyl lactates selected from the group consisting of ethyl lactate, propyl lactate and butyl lactate, 8) one or more alkanolamine selected from the group consisting of ethanolamine, diethanolamine, dipropanolamine, methyl diethanolamine, monoisopropanolamine and triethanolamine and 9) glycerol carbonate, and wherein one or more aprotic solvents are selected from the group consisting of:

1) Dimethyl Sulfoxide and 2) dialkyl, diaryl, or alkylaryl sulfoxide(s) having the formula:

$R_1S(O)_xR_2$ wherein $R_1$ and $R_2$ are each independently a $C_{1-6}$ alkylene group, an aryl group, or $C_{1-3}$alkylenearyl group or $R_1$ and $R_2$ with the sulfur to which they are attached form a 4 to 8 membered ring wherein $R_1$ and $R_2$ together are a $C_{1-6}$ alkylene group which optionally contains one or more atoms selected from the group consisting of O, S, Se, Te, N, and P in the ring and x is 1 or 2.

3) one or more alkylene carbonates selected from the group consisting of ethylene carbonate, propylene carbonate and butylene carbonate, 4) one or more polyols capped with acetate or formate wherein the one or more polyol portion is selected from the group consisting of ethylene glycol, 1,3 propylene glycol, 1,2 propylene glycol, butylene glycol, trimethylol propane, trimethylol ethane, pentaerythritol, sorbitol and sorbitan, glucose, fructose, galactose and glycerin, 5) one or more alkylene glycol alkyl ethers acetates selected from the group consisting of dipropylene glycol methyl ether acetate, tripropylene glycol methyl ether acetate, and tripropylene glycol butyl ether acetate, 6) isophorone, 7) dimethylsuccinate, dimethyl adipate, diethyl glutarate, and dimethyl glutarate, 8) dimethylacetamide, dimethylformamide, dimethyl-2-imidazolidinone 9) hexamethylphosphoramide, 10) 1,2-dimethyloxethane, 2-methoxyethyl ether, 11) cyclohexylpyrrolidone, 12) limonene, 13) one or more alkyl pyrrolidones selected from the group consisting of methyl pyrrolidone, ethyl pyrrolidone, propyl pyrrolidone and butyl pyrrolidone and 14) one or more organo phosphorous liquids selected from the group consisting of hexamethylphosphoramide and one or more trialkylphosphates represented by the formula:

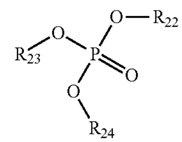

wherein:

$R_{22}$ is an alkyl radical $—C_1H_3$ to $—C_6H_{13}$ $R_{23}$ is an alkyl radical $—C_1H_3$ to $—C_6H_{13}$ $R_{24}$ is an alkyl radical $—C_1H_3$ to $—C_6H_{13}$ In an embodiment, a liquid solution comprised of a) OPCFs and b) a Non-aqueous Organo Solvent Delivery System (NOSDS) wherein the one or more OPCFs is selected from the group consisting of a) organic polymers/oligomers polycarboxylate functionalities and b) amino polycarboxylate functionalities wherein the carboxylate functionalities are comprised of one or more members selected from the group consisting of a) carboxylic acids, b) carboxylic anhydrides c) carboxylic imides, d) one or more carboxylic esters and e) carboxylic acid salt wherein said salt is derived from the reaction of a neutralizing agent with the carboxylate functionalities and wherein said carboxylic esters is derived from the reaction of said carboxylate functionalities with a protic solvent. In a variation, the neutralizing agents are comprised of one or more metal cations and one or more nitrogen containing compounds In an embodiment, said OPCFs comprise polymers and oligomers wherein the polymers and oligomers comprises homopolymers, copolymers and terpolymers which is the reaction products of one or more monomer selected from the group consisting of aspartic acid, glutamic acid, maleic acid, itaconic acid, citraconic acid, citric acid, acrylic acid and methacrylic acid.

In an embodiment, OPCFs are further comprised of one or more amino polycarboxylate functionalities selected from the group consisting of ethylenediaminetetraacetic acid, N-hydroxyethylethlyenediaminetriacetic acid, diethylenetriaminepentaacetic acid, cyclohexanediaminetetraacetic acid, propylenediaminetetraacetic acid, ethylenediamine-N,N'-disuccinic acid, Methylglycinediacetic acid, L-glutamic acid N,N-diacetic acid, nitrilotriacetic acid, N,N-bis(carboxymethyl)glutamic acid, Ethylenediamine-N,N'-bis(2-hydroxyphenylacetic acid, N,N'-Bis(2-hydroxybenzyl)ethylenediamine-N,N'-diacetic acid, Glycine, N,N'-ethylenebis(N-salicyl) and Iminodisuccinic acid.

In an embodiment, said neutralizing agents are comprised of one or more metal cations and one or more nitrogen containing compounds. In a variation neutralizing agents are comprised of metal cations derived from one or more members selected from the group consisting of a) elemental metals b) metal oxides c) metal hydroxides, d) metal alkylates and e) metal carbonates and wherein the one or more nitrogen containing compounds is selected from the group consisting of ammonia, ammonium hydroxide and organoamines.

In an variation, the one or more metal cations' portion of the neutralizing agent is selected from the group consisting of: Na, K, Mg, Ca, Fe, Zn, Mn, Cu, Co, Mo and Ni.

In a variation, the one or more organoamine neutralizing agents is selected from the group consisting of: a) mono $C_{1-6}$ amine, b) di $C_{1-6}$ amine, c) tri $C_{1-6}$ amine, d) monoethanolamine, e) diethanolamine, f) triethanolamine, g) monoisopropanolamine, h) diisopropanolamine, i) triisopropanolamine, j) ethylenediamine, k) diethylene triamine, l) triethyl tetraamine, m) tetraethylpentamine.

In an embodiment, said carboxylic esters are derived from the reaction of said carboxylate functionalities with one or more protic solvents selected from the group consisting of 1) an alcohol from the family of $C_{1-10}$ alkanols, 2) one or more polyols selected from the group consisting of trimethylol propane, trimethylol ethane, pentaerythritol, sorbitol and sorbitan, glucose, fructose, galactose, and glycerin, 3) poly ($C_{1-10}$ alkylene) glycols, 4) one or more alkylene glycols selected from the group consisting of ethylene, 1,3 propylene glycol, 1,2 propylene glycol, and butylene glycol, 5) isopropylidene glycerol 6) one or more alkylene glycol alkyl ethers selected from the group consisting of tripropylene glycol methyl ether, tripropylene glycol butyl ether, dipropylene glycol butyl ether and dipropylene glycol butyl ether, 7) triethanolamine and 8) glycerol carbonate In one embodiment, improved liquid delivery solutions have been developed that deliver effective levels of OPCFs that can liberate nutrients bound in the soil as insoluble salts and complexes.

In an embodiment, the liquid solutions of OPCFs are dispersed/dissolved in a non-aqueous organo solvent delivery systems (NOSDS)s that improve the storage life urease inhibitors such as alkyl thiophosphoric triamides, acetohydroxamic acid and its derivatives, phosphodiamidates relative to those formulations utilizing water as the solvent delivery system. In a variation, one can combine OPCFs, nitrification inhibitors, pesticides, fungicides, herbicides, insecticides and urease inhibitors into one product by either blending together the dispersions of each active ingredient or by combining the pesticides, fungicides, herbicides, insecticides and the nitrification and urease inhibitors in the NOSDS of said liquid solutions.

In embodiments, the present invention comprises compositions/formulations comprised of OPCFs and NOSDS that:
are environmentally safe,
have flashpoints above 145° F.,
are inherently rated safe for contact with humans and animals,
provides stable dispersions of OPCFs at levels of 1-70% in a NOSDS, wherein said level includes all possible combinations between stated level such as levels of 5-70%, 5-65%, 10-70%, 10-65%, etc.,
provides improved even application of a coating to fertilizer granules while not causing clumping of the nitrogen source granules,
contains less than 5% water,
quickly and evenly disperses into mobile liquid form of nitrogen sources such as aqueous dispersion, pressurized ammonia gas, molten urea and/or molten modified urea,
will not cause a violent exotherm when mixed with anhydrous ammonia.

In an embodiment, a stable dispersion of one or more OPCFs in a non-aqueous organo solvent delivery system, NOSDS, can further comprise one or more members selected from the group consisting of:
one or more bio-active agents selected from the group consisting of i) urease inhibitors, ii) nitrification inhibitors, iii) pesticides, iv) herbicides, v) fungicides and vi) insecticides,
one or more visual aids selected from the group consisting of as food colors, dispersion of pigments, colorants or dyes, wherein the inclusion of visual aids improve the visual evidence of complete coverage and serve as a visual marker, wherein the visual aids contain <5% water and/or low molecular weight alcohols, and wherein % composition of the invention's liquid solution can optionally comprise 0.1-2.5% of the active colorant or dye,
scents or masking agents to improve the odor of the formula,
nonionic, anionic, cationic, zwitterionic, and/or amphoteric surfactants to improve formula application performance of nitrogen source granules,
buffering agents, micronutrients and one or more flow modifiers selected from the group consisting of silica, zinc stearate and calcium stearate,
One or more crosslinking agents selected from the group consisting of i) paraformaldehyde, ii) trioxane, iii) one or more methoxy capped formaldehyde reaction products including but not limited to 1,3,4,6-Tetrakis (methoxymethyl)glycoluril and N,N,N',N',N",N"-Hexakis(methoxymethyl)-1,3,5-triazine-2,4,6-triamine.

In an embodiment, said one or more bio-active agents are selected from the group consisting of:
1) one or more biologics selected from the group consisting of
a) one or more *Bacillus* biologics selected from the group consisting of
   i. *Bacillus mucilaginosas*
   ii. *Bacillus Subtilus*
   iii. *Lactobacillus acidophilus*
   iv. *Bacillus amylofliquifaciens*
   v. *Bacillus itcheniformis*
   vi. *Bacillus megaterium*
   vii. *Bacillus pumilus*
   viii. *Bacillus megaterium*
   ix. *Bacillus pumilus*
   x. *Bacillus circulans*
   xi. *Bacillus globisporus*
   xii. *Bacillus firmus*
   xiii. *Bacillus thuringiensis galleriae*
   xiv. *Bacillus thuringiensis kurstaki*
   xv. *Bacillus cereus*
   xvi. *Bacillus globisporus*
   xvii. *Bacillus amyloliquefaciens*
   xviii. *Bacillus thuringiensis galleriae*
   xix. *Bacillus thuringiensis kurstaki*
   xx. *Bacillus mycoide isolate*
   xxi. *Bacillus aryabhattai*
   xxii. *B. flexus*
   xxiii. *B. nealsonii*
   xxiv. *Bacillus sphaericus*
   xxv. *B. vallismortis*
b) *Rhizobium*
c) *Bradyrhizobium* species
d) *Bradyrhizobium japonicum*
e) *Rhizobium meliloti*
f) One or more *Azospirillum* biologics selected from the group consisting of
   i. *Azospirillum lipoferum*
   ii. *Azospirillum brasilense*
   iii. *Azospirillum amazonense*
   iv. *Azospirillum halopreaferens*
   v. *Azospirillum irankense*
g) One or more *Azobacter* and *Gluconacetobacter* biologics selected from the group consisting of
   i. *Azotobacter agilis*
   ii. *Azotobacter armeniacus* iii. *Azotobacter* sp. AR
iv. *Azotobacter beijerinckii*
v. *Azotobacter chroococcum*
vi. *Azotobacter* sp. DCU26
vii. *Azotobacter* sp. FA8
viii. *Azotobacter nigricans*
ix. *Azotobacter paspali*
x. *Azotobacter salinestris*
xi. *Azotobacter tropicalis*
xii. *Azotobacter vinelandii*
h) *Phosphobacteria*
i) *Cyanobacteria*
j) *Herbaspirillum*
k) *Burkholderia*,
l) *Pseudomonas*
m) *Gluconacetobacter*
n) *Enterobacter*
o) *Klebsiella*
p) *Burkholderia*
q) *Laccaria bicolor*
r) *Glomus imraradices timanita*
s) *Actinomyces*
t) *Penicillium*
u) *Mesorhizobium cicero*
v) *Reynoutria sachalinensis*
w) One or more insecticidal or insect repellent microbial species and strains selected from the group consisting of: *Telenomus podisi, Baculovirus anticarsia, Trichogramma pretiosum, Trichogramma gallai, Chromobacterium subtsugae, Trichoderma fertile, Beauveria bassiana, Beauveria bassiana, Beauveria bassiana, Paecilomyces fumosoroseus, Trichoderma harzianum, Verticillium lecanii, lsarfofumosarosea Lecanicillium muscarium, Streptomyces microflavus, Muscodor albus,*
x) one or more nematodal microbial species and strains selected from the group consisting of: *Myrothecium verrucaria, Pasteuria* species, *Pasteuria Metarhizium* species, *Flavobacterium* species and
y) one or more antifungal, antimicrobial and/or plant growth promoting microbial species and strains selected from a group consisting of: *Gliocladium* species, *Pseudomonas* species (e.g. *Pseudomonas fluorescens, Pseudomonas fluorescens. putida* and *P. chlororaphis*), *Pseudomonasfluorescens* VP5, *Pseudomonas diazotrophicus, Enterobacter cloacae, Trichoderma* species, *Trichoderma virens, Trichoderma atroviride* strains, *Coniothyrium minitans, Gliocladium* species, *Gliacladium virens, Gliacladium roseum, Trichoderma harzianum* species.

2) and one or more biologically active agents selected from the group consisting of:
a. one or more urease inhibitors selected from the group consisting of a) aliphatic phosphoric triamide, b) phosphoramides, c) N-alkyl thiophosphoric triamides, d) N-(n-butyl) thiophosphoric Triamide, e) one or more (aminomethyl)phosphinic acids and their salts selected by the formula structure:

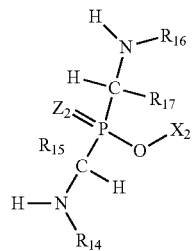

wherein:
$R_{11}$ is selected from one or more of the group consisting of H, $CH_3$, $C_2H_5$, $C_3H_7$, $C_4H_9$, $C_5H_{11}$, $C_6H_{13}$, $C_7H_{15}$ and $C_8H_{17}$,
$R_{12}$ is selected from one or more of the group consisting of H, $CH_3$, $C_2H_5$, $C_3H_7$, $C_4H_9$, $C_5H_{11}$ and $C_6H_{13}$,
$R_{13}$ is selected from one or more of the group consisting of H, O—$X_3$, $CH_3$, $C_2H_5$, $C_3H_7$, $C_4H_9$, $C_5H_{11}$, $C_6H_{13}$, $C_7H_{15}$, $C_8H_{17}$, $OCH_3$, $OC_2H_5$, $OC_3H_7$, $OC_4H_9$, $OC_5H_{11}$, $OC_6H_{13}$, $OC_7H_{15}$ and $OC_8H_{17}$
wherein
(1) $X_3$ is selected from one or more of the group consisting of selected from the group consisting of:
(a) H, Na, Li and K,
(b) $NH_4$
(c) one or more organoamines selected from the group consisting of mono $C_{1-6}$ amine, di $C_{1-6}$ amine, tri $C_{1-6}$ amine, mono ethanol amine, diethanol amine, triethanol amine, monoisopropanol amine, diisopropanol amine, triisopropanol amine, ethylene diamine, diethylene triamine, triethylene tetraamine, and tetraethylene pentamine.
$X_1$ is selected from one or more of the group consisting of
(a) H, Na, Li and K,
(b) $NH_4$
(c) one or more organoamines selected from the group consisting of mono $C_{1-6}$ amine, di $C_{1-6}$ amine, tri $C_{1-6}$ amine, mono ethanol amine, diethanol amine, triethanol amine, monoisopropanol amine, diisopropanol amine, triisopropanol amine, ethylene diamine, diethylene triamine, triethylene tetraamine, and tetraethylene pentamine.
$Z_1$ is selected from one or more of the group consisting of Oxygen and Sulfur.
and f) one or more bis-(aminomethyl)phosphinic acids and their salts selected from the formula structure:

wherein:
(1) $R_{14}$ is selected from one or more of the group consisting of H, $CH_3$, $C_2H_5$, $C_3H_7$, $C_4H_9$, $C_5H_{11}$, $C_6H_{13}$, $C_7H_{15}$ and $C_8H_{17}$
(2) $R_{15}$ is selected from one or more of the group consisting of H, $CH_3$, $C_2H_5$, $C_3H_7$, $C_4H_9$, $C_5H_{11}$ and $C_6H_{13}$
(3) $R_{16}$ is selected from one or more of the group consisting of H, $CH_3$, $C_2H_5$, $C_3H_7$, $C_4H_9$, $C_5H_{11}$, $C_6H_{13}$, $C_7H_{15}$ and $C_8H_{17}$ (4) $R_{17}$ is selected from one or more of the group consisting of H, $CH_3$, $C_2H_5$, $C_3H_7$, $C_4H_9$, $C_5H_{11}$ and $C_6H_{13}$ (5) $X_2$ is selected from one or more of the group consisting of
(a) H, Na, Li and K,
(b) $NH_4$
(c) one or more organoamines selected from the group consisting of mono $C_{1-6}$ amine, di $C_{1-6}$ amine, tri $C_{1-6}$ b. one or more nitrification inhibitors selected from the group consisting of 2-chloro-6-trichloromethyl)pyridine, 4-amino-1,2,4,6-triazole-HCl, 2,4-diamino-6-trichloromethyltriazine CL-1580, dicyandiamide (DCD), thiourea, 1-mercapto-1,2,4-triazole, ammonium thiosulfate, dimethylpyrazole organic and inorganic salts, and 2-amino-4-chloro-6-methylpyrimidine, c. one or more fungicides such as but not limited to azoxystrobin, *bacillus* lichenformis, boscalid, captan, chloroneb, chlorothalonil, ethazole (etridiazole), fenarimol, fludioxonil, flutolanil, fosetyl-aluminum, iprodione, mancozeb, mefenoxam, myclobutanil, potassium phosphite, polyoxin D, propamocarb, propiconazole, pyraclostrobin, tebuconazole, thiophanate-methyl, thiram, triadimefon, trifloxystrobin, vinclozolin, d. one or more herbicides such as but not limited to 2,4-D, 2,4-DB, acetochlor, acifluorfen, alachlor, ametryn, atrazine, aminopyralid, benefin, bensulfuron, bensulide, bentazon, bromacil, bromoxynil, butylate, carfentrazone, chlorimuron, chlorsulfuron, clethodim, clomazone, clopyralid, cloransulam, cycloate, DCPA, desmediphm, dicamba, dichlobenil, diclofop, diclosulam, diflufenzopyr, dimethenamid, diquat, diuron, DSMA, endothall, EPTC, ethalfluralin, ethofumesate, fenoxaprop, fluazifop-P, flucarbazone, flufenacet, flumetsulam, flumiclorac, flumioxazin, fluometuron, fluroxypyr, fomesafen, foramsulfuron, glufosinate, glyphosate, halosulfuron, hexazinone, imazamethabenz, imazamox, imazapic, imazaquin, imazethapyr, isoxaben, isoxaflutole, lactofen, linuron, MCPA, MCPB, mesotrione, metolachlor-s, metribuzin, metsulfuron, molinate, MSMA, napropamide, naptalam, nicosulfuron, norflurazon, oryzalin, oxadiazon, oxyfluorfen, paraquat, pelargonic acid, pendimethalin, phenmedipham, picloram, primisulfuron, prodiamine, prometryn, pronamide, propanil, prosulfuron, pyrazon, pyrithiobac, quinclorac, quizalofop, rimsulfuron, sethoxydim, siduron, simazine, sulfentrazone, sulfometuron, sulfosulfuron, tebuthiuron, terbacil, thiazopyr, thifensulfuron, thiobencarb, tralkoxydim, triallate, triasulfuron, tribenuron, triclopyr, trifluralin, triflusulfuron, e. and one or more insecticides such as but not limited to, cypermethrin, permethrin, piperonyl butoxide, lambda-cyhalothrin, (s)-methoprene, deltamethrin, permethrin, esfenvalerate, pyriproxyfen, fipronil, etofenprox, cyphenothrin, carbofuran, chlorpoyrifos, disulfoton, fenvalerate, ethoprop, fonofos, malathion, permethrin, phorate, tefluthrin, terbufos, trimethacarb, nornicotine, oxymatrine, pyrethrins, cinerins, jasmolin, quassia, rhodojaponin, rotenone, ryania, sabadilla, sanguinarine, triptolide, carbamate insecticides, benzofuranyl methylcarbamate insecticides, dimethylcarbamate insecticides, oxime carbamate insecticides, phenyl methylcarbamate insecticides, dinosam, DNOC, fluorine insecticides, formamidine insecticides, amitraz, chlordimeform, formetanate, formparanate, mediameform, semiamitraz.

In an embodiment, the resulting liquid compositions of OPCFs dissolved within a NOSDS and the methods to produce a OPCF within a NOSDS results in a flowable, low moisture liquid that can be readily mixed with mobile liquid forms of nitrogen sources, applied safely, quickly, evenly and economically on the surface of solid nitrogen source granules and on the surfaces of components of a mix fertilizer and/or applied directly to the soil.

In an embodiment, one method of making the OPCFs comprise one or more of the following steps a) dispersing/suspending poly(organic acids/esters) monomers within a NOSDS and b) heating the monomers dispersed within a NOSDS to a polymerization temperature with or without catalysts. The resulting OPCF can be utilized as is or is further reacted forming carboxylic salts wherein said salt is derived from the reaction of a neutralizing agent with the carboxylate functionalities wherein the neutralizing agents are comprised of one or more members selected from the group consisting of metal cations and nitrogen containing compounds. In a variation, the metal cations are derived from one or more members selected from the group consisting of a) elemental metals b) metal oxides c) metal hydroxides, d) metal alkylates and e) metal carbonates. In another variation, the one or more nitrogen containing compounds are selected from the group consisting of ammonia, ammonium hydroxide and organoamines.

In an embodiment, the one or more metal cations' portion of the neutralizing agent is selected from the group consisting of: Na, K, Mg, Ca, Fe, Zn, Mn, Cu, Co, Mo and Ni.

In an embodiment, the one or more organoamine neutralizing agents is selected from the group consisting of: a) mono $C_{1-6}$ amine, b) di $C_{1-6}$ amine, c) tri $C_{1-6}$ amine, d) monoethanolamine, e) diethanolamine, f) triethanolamine, g) monoisopropanolamine, h) diisopropanolamine, i) triisopropanolamine, j) ethylenediamine, k) diethylene triamine, l) triethyl tetraamine, m) tetraethylpentamine.

In embodiments, the present invention relates to non-aqueous organo solvent delivery system formulations (NOSDS) dissolves OPCFs for application to man-made and/or natural organic based nitrogen sources.

In one embodiment, a stable non-aqueous, liquid formulation can be produced that comprises Organo Polycarboxylate functionalities polymer (polymer weight=500 to 10,000 or alternatively about 1000-7500 or alternatively 1500-5000 or alternatively about 1750-3000) and a NOSDS. In an embodiment, a method to make liquid solutions comprises dissolving Organo Polycarboxylate functionalities polymer into a NOSDS wherein the NOSDS is comprised of one or more of the following solvents selected from the group consisting of protic and aprotic solvents wherein one or more protic solvent is selected from the group consisting of: 1) an alcohol from the family of $C_{1-10}$ alkanols, 2) one or more polyols selected from the group consisting of trimethylol propane, trimethylol ethane, pentaerythritol, sorbitol and sorbitan, glucose, fructose, galactose, and glycerin, 3) poly($C_{1-10}$ alkylene) glycols, 4) one or more alkylene glycols selected from the group consisting of ethylene, 1,3 propylene glycol, 1,2 propylene glycol, and butylene glycol, 5) isopropylidene glycerol 6) one or more alkylene glycol alkyl ethers selected from the group consisting of tripropylene glycol methyl ether, tripropylene glycol butyl ether, dipropylene glycol butyl ether and dipropylene glycol butyl ether, 7) one or more alkyl lactates selected from the group consisting of ethyl lactate, propyl lactate and butyl lactate, 8)

one or more alkanolamine selected from the group consisting of ethanolamine, diethanolamine, dipropanolamine, methyl diethanolamine, monoisopropanolamine and triethanolamine and 9) glycerol carbonate, and wherein one or more aprotic solvents selected from the group consisting of:
1) Dimethyl Sulfoxide and 2) dialkyl, diaryl, or alkylaryl sulfoxide(s) having the formula:

$R_1S(O)_xR_2$ wherein $R_1$ and $R_2$ are each independently a $C_{1-6}$ alkylene group, an aryl group, or $C_{1-3}$alkylenearyl group or $R_1$ and $R_2$ with the sulfur to which they are attached form a 4 to 8 membered ring wherein $R_1$ and $R_2$ together are a $C_{1-6}$ alkylene group which optionally contains one or more atoms selected from the group consisting of O, S, Se, Te, N, and P in the ring and x is 1 or 2.

3) one or more alkylene carbonates selected from the group consisting of ethylene carbonate, propylene carbonate and butylene carbonate, 4) one or more polyols capped with acetate or formate wherein the one or more polyol portion is selected from the group consisting of ethylene glycol, 1,3 propylene glycol, 1,2 propylene glycol, butylene glycol, trimethylol propane, trimethylol ethane, pentaerythritol, sorbitol and sorbitan, glucose, fructose, galactose and glycerin, 5) one or more alkylene glycol alkyl ethers acetates selected from the group consisting of dipropylene glycol methyl ether acetate, tripropylene glycol methyl ether acetate, and tripropylene glycol butyl ether acetate, 6) isophorone, 7) dimethylsuccinate, dimethyl adipate, diethyl glutarate, and dimethyl glutarate, 8) dimethylacetamide, dimethylformamide, dimethyl-2-imidazolidinone 9) hexamethylphosphoramide, 10) 1,2-dimethyloxethane, 2-methoxyethyl ether, 11) cyclohexylpyrrolidone, 12) limonene, 13) one or more alkyl pyrrolidones selected from the group consisting of methyl pyrrolidone, ethyl pyrrolidone, propyl pyrrolidone and butyl pyrrolidone and 14) one or more organo phosphorous liquids selected from the group consisting of hexamethylphosphoramide and one or more trialkylphosphates represented by the formula:

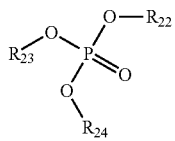

wherein:
$R_{22}$ is an alkyl radical $-C_1H_3$ to $-C_6H_{13}$
$R_{23}$ is an alkyl radical $-C_1H_3$ to $-C_6H_{13}$
$R_{24}$ is an alkyl radical $-C_1H_3$ to $-C_6H_{13}$ In an embodiment, the liquid solution is comprised of a) organic polycarboxylate functionalities, (OPCFs) and b) a Non-aqueous Organo Solvent Delivery System (NOSDS) wherein the one or more OPCFs are selected from the group consisting of a) polymers/oligomers containing 3 or more carboxylate functionalities and b) amino polycarboxylate functionalities wherein the carboxylate functionalities are comprised of one or more members selected from the group consisting of a) carboxylic acids, b) carboxylic anhydrides c) carboxylic imides, d) one or more carboxylic esters and e) carboxylic acid salt wherein said salt is derived from the reaction of a neutralizing agent with the carboxylate functionalities and wherein said carboxylic esters is derived from the reaction of said carboxylate functionalities with a protic solvent. In a variation, the neutralizing agents are comprised of one or more metal cations and one or more nitrogen containing compounds In an embodiment, said OPCF comprise polymers and oligomers wherein the polymers and oligomers comprises homopolymers, copolymers and terpolymers which is the reaction products of one or more monomer selected from the group consisting of aspartic acid, glutamic acid, maleic acid, itaconic acid, citraconic acid, citric acid, acrylic acid and methacrylic acid In an embodiment, the OPCFs are comprised of one or more amino polycarboxylate functionalities selected from the group consisting of: ethylenediaminetetraacetic acid, N-hydroxyethylethlyenediaminetriacetic acid, diethylenetriaminepentaacetic acid, cyclohexanediaminetetraacetic acid, propylenediaminetetraacetic acid, Iminodisuccinic acid, ethylenediamine-N,N'-disuccinic acid, Methylglycinediacetic acid, L-glutamic acid N,N-diacetic acid, nitrilotriacetic acid, N,N-bis(carboxymethyl)glutamic acid, Ethylenediamine-N, N'-bis(2-hydroxyphenylacetic acid, N,N-Bis(2-hydroxybenzyl)ethylenediamine-N,N-diacetic acid, Glycine, N,N'-ethylenebis(N-salicyl) and Iminodisuccinic acid.

In an embodiment, said neutralizing agents are comprised of one or more metal cations and one or more nitrogen containing compounds. In a variation, neutralizing agents are comprised of metal cations derived from one or more members selected from the group consisting of a) elemental metals b) metal oxides c) metal hydroxides, d) metal alkylates and e) metal carbonates and wherein the one or more nitrogen containing compounds is selected from the group consisting of ammonia, ammonium hydroxide and organoamines.

In an variation, the one or more metal cations' portion of the neutralizing agent is selected from the group consisting of: Na, K, Mg, Ca, Fe, Zn, Mn, Cu, Co, Mo and Ni.

In a variation, the one or more organoamine neutralizing agents is selected from the group consisting of: a) mono $C_{1-6}$ amine, b) di $C_{1-6}$ amine, c) tri $C_{1-6}$ amine, d) monoethanolamine, e) diethanolamine, f) triethanolamine, g) monoisopropanolamine, h) diisopropanolamine, i) triisopropanolamine, j) ethylenediamine, k) diethylene triamine, l) triethyl tetraamine, m) tetraethylpentamine.

In an embodiment, said carboxylic esters are derived from the reaction of said carboxylate functionalities with one or more protic solvents selected from the group consisting of 1) an alcohol from the family of $C_{1-10}$ alkanols, 2) one or more polyols selected from the group consisting of trimethylol propane, trimethylol ethane, pentaerythritol, sorbitol and sorbitan, glucose, fructose, galactose, and glycerin, 3) poly ($C_{1-10}$ alkylene) glycols, 4) one or more alkylene glycols selected from the group consisting of ethylene, 1,3 propylene glycol, 1,2 propylene glycol, and butylene glycol, 5) isopropylidene glycerol 6) one or more alkylene glycol alkyl ethers selected from the group consisting of tripropylene glycol methyl ether, tripropylene glycol butyl ether, dipropylene glycol butyl ether and dipropylene glycol butyl ether, 7) triethanolamine and 8) glycerol carbonate In an embodiment, a stable dispersion of one or more OPCFs in a non-aqueous organo solvent delivery system, NOSDS, can further comprise one or more members selected from the group consisting of:
one or more bio-active agents selected from the group consisting of i) urease inhibitors, ii) nitrification inhibitors, iii) pesticides, iv) herbicides, v) fungicides and vi) insecticides, one or more visual aids selected from the group consisting of as food colors, dispersion of pigments, colorants or dyes, wherein the inclusion of visual aids improve the visual evidence of complete coverage and serve as a visual marker, wherein the visual aids contain <5% water and/or low molecular weight alcohols, and wherein % composition of the invention's liquid solution can optionally comprise 0.1-2.5% of the active colorant or dye, scents or masking agents to improve the odor of the formula, nonionic, anionic, cationic, zwitterionic, and/or amphoteric surfactants to improve formula application performance of nitrogen source granules, buffering agents, micronutrients and one or more flow modifiers selected from the group consisting of silica, zinc stearate and calcium stearate, One or more crosslinking agents selected from the group consisting of i) paraformaldehyde, ii) trioxane, iii) one or more methoxy capped formaldehyde reaction products including but not limited to 1,3,4,6-Tetrakis (methoxymethyl)glycoluril and N,N,N',N',N'',N''-Hexakis(methoxymethyl)-1,3,5-triazine-2,4,6-triamine.

other NOSDSs.

In an embodiment, a liquid solution is comprised of a OPCFs and an aprotic NOSDS wherein OPCFs comprise 5-75% by weight of the total composition. In an embodiment, the method to make a liquid OPCF/aprotic NOSDS composition comprises a) adding OPCFs to a aprotic NOSDS under agitation, b) mixing the OPCF/NOSDS composition 20° C. to 120° C. or alternatively at a temperature of about 40° C. to 100° C. or alternatively, at a temperature of about 40° C. to 80° C., or alternatively between about 50° C. and 100° C., and d) mixed until the OPCF is completely dissolved. The heating of mix vessel, in this embodiment, may be jacketed and the temperature carefully controlled. In an embodiment, the mixing action should allow complete mixing without too much aeration. In a variation, the heating may be accomplished using hot water or low pressure steam to control any hot spots on walls of the vessel to prevent heat degradation. In a variation, the carboxylate functionalities of OPCF/NOSDS composition further comprises a salt wherein said salt is derived from the reaction of a neutralizing agent with the carboxylate functionalities wherein the neutralizing agents are comprised of one or more metal cations and one or more nitrogen containing compounds. In a variation, the metal cations are derived from one or more members selected from the group consisting of a) elemental metals b) metal oxides c) metal hydroxides, d) metal alkylates and e) metal carbonates. In another variation, the one or more nitrogen containing compounds are selected from the group consisting of ammonia, ammonium hydroxide and organoamines. In an embodiment, the aprotic NOSDS comprises one or more members selected from the group consisting of:

1) Dimethyl Sulfoxide and 2) dialkyl, diaryl, or alkylaryl sulfoxide(s) having the formula:

$R_1S(O)_xR_2$ wherein $R_1$ and $R_2$ are each independently a $C_{1-6}$ alkylene group, an aryl group, or $C_{1-3}$alkylenearyl group or $R_1$ and $R_2$ with the sulfur to which they are attached form a 4 to 8 membered ring wherein $R_1$ and $R_2$ together are a $C_{1-6}$ alkylene group which optionally contains one or more atoms selected from the group consisting of O, S, Se, Te, N, and P in the ring and x is 1 or 2.

3) one or more alkylene carbonates selected from the group consisting of ethylene carbonate, propylene carbonate and butylene carbonate, 4) one or more polyols capped with acetate or formate wherein the one or more polyol portion is selected from the group consisting of ethylene glycol, 1,3 propylene glycol, 1,2 propylene glycol, butylene glycol, trimethylol propane, trimethylol ethane, pentaerythritol, sorbitol and sorbitan, glucose, fructose, galactose and glycerin, 5) one or more alkylene glycol alkyl ethers acetates selected from the group consisting of dipropylene glycol methyl ether acetate, tripropylene glycol methyl ether acetate, and tripropylene glycol butyl ether acetate, 6) isophorone, 7) dimethylsuccinate, dimethyl adipate, diethyl glutarate, and dimethyl glutarate, 8) dimethylacetamide, dimethylformamide, dimethyl-2-imidazolidinone 9) hexamethylphosphoramide, 10) 1,2-dimethyloxethane, 2-methoxyethyl ether, 11) cyclohexylpyrrolidone, 12) limonene 13) one or more alkyl pyrrolidones selected from the group consisting of methyl pyrrolidone, ethyl pyrrolidone, propyl pyrrolidone and butyl pyrrolidone and 14)) one or more organo phosphorous liquids selected from the group consisting of hexamethylphosphoramide and one or more trialkylphosphates represented by the formula:

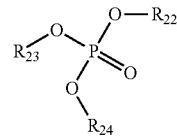

wherein:
$R_{22}$ is an alkyl radical —$C_1H_3$ to —$C_6H_{13}$
$R_{23}$ is an alkyl radical —$C_1H_3$ to —$C_6H_{13}$
$R_{24}$ is an alkyl radical —$C_1H_3$ to —$C_6H_{13}$ In another embodiment, the one or more OPCFs is selected from the group consisting of a) polymers/oligomers and b) amino polycarboxylate functionalities wherein the polymers and oligomers comprises homopolymers, copolymers and terpolymers which is the reaction products of one or more monomer selected from the group consisting of aspartic acid, glutamic acid, mono NOSDS aspartate and wherein the one or more amino polycarboxylate functionalities are selected from the group consisting of: ethylenediaminetetraacetic acid, N-hydroxyethylethlyenediaminetriacetic acid, diethylenetriaminepentaacetic acid, cyclohexanediaminetetraacetic acid, propylenediaminetetraacetic acid, ethylenediamine-N,N'-disuccinic acid, Methylglycinediacetic acid, L-glutamic acid N,N-diacetic acid, nitrilotriacetic acid, N,N-bis(carboxymethyl)glutamic acid, Ethylenediamine-N,N'-bis(2-hydroxyphenylacetic acid, N,N'-Bis(2-hydroxybenzyl)ethylenediamine-N,N'-diacetic acid, Glycine, N,N'-ethylenebis(N-salicyl) and Iminodisuccinic acid.

In an embodiment, the one or more metal cations' portion of the neutralizing agent is selected from the group consisting of: Na, K, Mg, Ca, Fe, Zn, Mn, Cu, Co, Mo and Ni.

In an embodiment, the one or more organoamine neutralizing agents is selected from the group consisting of: a) mono $C_{1-6}$ amine, b) di $C_{1-6}$ amine, c) tri $C_{1-6}$ amine, d) monoethanolamine, e) diethanolamine, f) triethanolamine, g) monoisopropanolamine, h) diisopropanolamine, i) triisopropanolamine, j) ethylenediamine, k) diethylene triamine, l) triethyl tetraamine, m) tetraethylpentamine.

In an embodiment, the liquid solution can further comprise one or more members selected from the group consisting of:
- one or more bio-active agents selected from the group consisting of i) urease inhibitors, ii) nitrification inhibitors, iii) pesticides, iv) herbicides, v) fungicides and vi) insecticides,
- one or more visual aids selected from the group consisting of as food colors, dispersion of pigments, colorants or dyes, wherein the inclusion of visual aids improve the visual evidence of complete coverage and serve as a visual marker, wherein the visual aids contain <5% water and/or low molecular weight alcohols, and wherein % composition of the invention's liquid solution can optionally comprise 0.1-2.5% of the active colorant or dye,
- scents or masking agents to improve the odor of the formula,
- nonionic, anionic, cationic, zwitterionic, and/or amphoteric surfactants to improve formula application performance of nitrogen source granules,
- buffering agents, micronutrients and flow modifiers such as silica, zinc stearate, calcium stearate and the like,
- One or more crosslinking agents selected from the group consisting of i) paraformaldehyde, ii) trioxane, iii) one or more methoxy capped formaldehyde reaction products including but not limited to 1,3,4,6-Tetrakis(methoxymethyl)glycoluril and N,N,N',N',N",N"-Hexakis(methoxymethyl)-1,3,5-triazine-2,4,6-triamine,
- other NOSDSs.

In an embodiment, it is contemplated that the composition of a liquid solution is comprised of a) OPCFs and b) a Non-aqueous Organo Solvent Delivery System (NOSDS) wherein the one or more OPCFs is selected from the group consisting of organic polymers/oligomers wherein the polymers and oligomers comprises homopolymers, copolymers and terpolymers which is the reaction products of one or more monomer selected from the group consisting of aspartic acid, glutamic acid can further comprise other organic mono acids and/or diacids and other organic monoamines and diamines up to 30% of the weight of the OPCFs of the composition.

In an embodiment, a liquid solution is comprised the OPCFs polysuccinimide (PSI) (molecular weight of 1000-10,000) and the Non-aqueous Organo Solvent Delivery System (NOSDS) dimethyl sulfoxide (DMSO) wherein the PSI is 5-75% by weight of the total composition. In an embodiment, the method to make a liquid PSI/DMSO composition comprises a) adding the PSI to DMSO under agitation, b) mixing the PSI/DMSO composition 20° C. to 120° C. or alternatively at a temperature of about 40° C. to 100° C. or alternatively, at a temperature of about 40° C. to 80° C., or alternatively between about 50° C. and 100° C., and d) mixed until the PSI is completely dissolved. The heating of mix vessel, in this embodiment, may be jacketed and the temperature carefully controlled. In an embodiment, the mixing action should allow complete mixing without too much aeration. In a variation, the heating may be accomplished using hot water or low pressure steam to control any hot spots on walls of the vessel to prevent heat degradation. In a variation, the succinimide functionalities of PSI/DMSO composition further comprises a salt wherein said salt is derived from the reaction of a neutralizing agent with the succinimide functionalities wherein the neutralizing agents are comprised of one or more metal cations and one or more nitrogen containing compounds In a variation, the metal cations are derived from one or more members selected from the group consisting of a) elemental metals b) metal oxides c) metal hydroxides, d) metal alkylates and e) metal carbonates. In another variation, the one or more nitrogen containing compounds are selected from the group consisting of ammonia, ammonium hydroxide and organoamines. In another variation, the said carboxylic salts dissolved in a NOSDS form a stable dispersion that can contain completely complexed micronutrients and provide the vehicle for the delivery of these nutrients to soils, to a mobile liquid form of nitrogen sources such as aqueous dispersions, pressurized gases and molten urea and/or molten modified urea and/or as a coating to the surfaces of nitrogen source granules.

In an embodiment, the one or more metal cations' portion of the neutralizing agent is selected from the group consisting of: Na, K, Mg, Ca, Fe, Zn, Mn, Cu, Co, Mo and Ni.

In an embodiment, the one or more organoamine neutralizing agents is selected from the group consisting of: a) mono $C_{1-6}$ amine, b) di $C_{1-6}$ amine, c) tri $C_{1-6}$ amine, d) monoethanolamine, e) diethanolamine, f) triethanolamine, g) monoisopropanolamine, h) diisopropanolamine, i) triisopropanolamine, j) ethylenediamine, k) diethylene triamine, l) triethyl tetraamine, m) tetraethylpentamine.

In a variation, the mixing action might include one or more of high shear devices such as a cowles blade, a colloid mill, a rotor stator and/or a ball mill.

In another variation, the method to make further comprises utilizing by sparging/sweeping with an inert gas such as but not limited to nitrogen, argon and carbon dioxide.

In another variation, the method to make further comprises utilizing reduced pressure to remove by-products and to assist in removing oxygen from the reaction vessel.

In an embodiment, the liquid solution can further comprise one or more members selected from the group consisting of:

- one or more bio-active agents selected from the group consisting of i) urease inhibitors, ii) nitrification inhibitors, iii) pesticides, iv) herbicides, v) fungicides and vi) insecticides,
- one or more visual aids selected from the group consisting of as food colors, dispersion of pigments, colorants or dyes, wherein the inclusion of visual aids improve the visual evidence of complete coverage and serve as a visual marker, wherein the visual aids contain <5% water and/or low molecular weight alcohols, and wherein % composition of the invention's liquid solution can optionally comprise 0.1-2.5% of the active colorant or dye,
- scents or masking agents to improve the odor of the formula,
- nonionic, anionic, cationic, zwitterionic, and/or amphoteric surfactants to improve formula application performance of nitrogen source granules,
- buffering agents, micronutrients and flow modifiers such as silica, zinc stearate, calcium stearate and the like,
- One or more crosslinking agents selected from the group consisting of i) paraformaldehyde, ii) trioxane, iii) one or more methoxy capped formaldehyde reaction products including but not limited to 1,3,4,6-Tetrakis (methoxymethyl)glycoluril and N,N,N',N',N'',N''-Hexakis(methoxymethyl)-1,3,5-triazine-2,4,6-triamine,
- other NOSDSs.

It should be recognized that in the temperature ranges given above, the ranges are set so as to allow adequate dissolution of the various compounds. The inventors recognize that should a compound be added that has temperature stability issues, the additions may be under reduced pressure conditions so as to prevent temperature sensitive degradations of the one or more compounds but at the same time allowing their dissolution in the NOSDS.

In an embodiment, a liquid solution is comprised of a OPCFs and a protic NOSDS wherein OPCFs comprise 5-60% by weight of the total composition. In an embodiment, the method to make a liquid OPCF/protic NOSDS composition comprises a) adding a OPCFs to a protic NOSDS under agitation, b) heating the OPCF/protic NOSDS composition to 60° C. to 180° C. or alternatively at a temperature of about 100° C. to 160° C. or alternatively, at a temperature of about 120° C. to 150° C. and c) mixing with heat until the OPCF is dissolved and reacted with the protic NOSDS d) cooling the composition to 50-80° C. In a variation, catalysts can be added to improve conversion from OPCF to OPCF/protic NOSDS esters. The heating of mix vessel, in this embodiment, may be jacketed and the temperature carefully controlled. In an embodiment, the mixing action should allow complete mixing without too much aeration. In a variation, the heating may be accomplished using hot water or low pressure steam to control any hot spots on walls of the vessel to prevent heat degradation. In a variation, the ester functionalities of OPCF/protic NOSDS composition further comprises a salt wherein said salt is derived from the reaction of a neutralizing agent with the ester functionalities wherein the neutralizing agents are comprised of one or more metal cations and one or more nitrogen containing compounds. In a variation, the metal cations are derived from one or more members selected from the group consisting of a) elemental metals b) metal oxides c) metal hydroxides, d) metal alkylates and e) metal carbonates. In another variation, the one or more nitrogen containing compounds are selected from the group consisting of ammonia, ammonium hydroxide and organoamines. In an embodiment, the protic NOSDS comprises one or more members selected from the group consisting of:

1) an alcohol from the family of $C_{1-10}$ alkanols, 2) one or more polyols selected from the group consisting of trimethylol propane, trimethylol ethane, pentaerythritol, sorbitol and sorbitan, glucose, fructose, galactose, and glycerin, 3) poly($C_{1-10}$ alkylene) glycols, 4) one or more alkylene glycols selected from the group consisting of ethylene, 1,3 propylene glycol, 1,2 propylene glycol, and butylene glycol, 5) isopropylidene glycerol 6) one or more alkylene glycol alkyl ethers selected from the group consisting of tripropylene glycol methyl ether, tripropylene glycol butyl ether, dipropylene glycol butyl ether and dipropylene glycol butyl ether, 7) triethanolamine and 8) glycerol carbonate and wherein the one or more OPCFs is selected from the group consisting of a) polymers/oligomers comprised of 3 or more carboxylate functionalities and b) amino polycarboxylate functionalities wherein the polymers and oligomers comprises homopolymers, copolymers and terpolymers which is the reaction products of one or more monomer selected from the group consisting of aspartic acid, glutamic acid, mono NOSDS aspartate and wherein the one or more amino polycarboxylate functionalities are selected from the group consisting of: ethylenediaminetetraacetic acid, N-hydroxyethylethlyenediaminetriacetic acid, diethylenetriaminepentaacetic acid, cyclohexanediaminetetraacetic acid, propylenediaminetetraacetic acid, ethylenediamine-N,N'-disuccinic acid, Methylglycinediacetic acid, L-glutamic acid N,N-diacetic acid, nitrilotriacetic acid, N,N-bis(carboxymethyl)glutamic acid, Ethylenediamine-N,N'-bis(2-hydroxyphenyl)acetic acid, N,N-Bis(2-hydroxybenzyl)ethylenediamine-N,N-diacetic acid, Glycine, N,N-ethylenebis(N-salicyl) and Iminodisuccinic acid.

In an embodiment, the one or more metal cations' portion of the neutralizing agent is selected from the group consisting of: Na, K, Mg, Ca, Fe, Zn, Mn, Cu, Co, Mo and Ni.

In an embodiment, the one or more organoamine neutralizing agents is selected from the group consisting of: a) mono $C_{1-6}$ amine, b) di $C_{1-6}$ amine, c) tri $C_{1-6}$ amine, d) monoethanolamine, e) diethanolamine, f) triethanolamine, g) monoisopropanolamine, h) diisopropanolamine, i) triisopropanolamine, j) ethylenediamine, k) diethylene triamine, l) triethyl tetraamine, m) tetraethylpentamine.

In a variation, the mixing action might include one or more of high shear devices such as a cowles blade, a colloid mill, a rotor stator and/or a ball mill.

In another variation, the method to make further comprises utilizing by sparging/sweeping with an inert gas such as but not limited to nitrogen, argon and carbon dioxide.

In another variation, the method to make further comprises utilizing reduced pressure to remove by products and to assist in removing oxygen from the reaction vessel.

In an embodiment, the liquid solution can further comprise one or more members selected from the group consisting of:
  one or more bio-active agents selected from the group consisting of i) urease inhibitors, ii) nitrification inhibitors, iii) pesticides, iv) herbicides, v) fungicides and vi) insecticides,
  one or more visual aids selected from the group consisting of as food colors, dispersion of pigments, colorants or dyes, wherein the inclusion of visual aids improve the visual evidence of complete coverage and serve as a visual marker, wherein the visual aids contain <5% water and/or low molecular weight alcohols, and wherein % composition of the invention's liquid solution can optionally comprise 0.1-2.5% of the active colorant or dye,
  scents or masking agents to improve the odor of the formula,
  nonionic, anionic, cationic, zwitterionic, and/or amphoteric surfactants to improve formula application performance of nitrogen source granules,
  buffering agents, micronutrients and flow modifiers such as silica, zinc stearate, calcium stearate and the like,
  One or more crosslinking agents selected from the group consisting of i) paraformaldehyde, ii) trioxane, iii) one or more methoxy capped formaldehyde reaction products including but not limited to 1,3,4,6-Tetrakis (methoxymethyl)glycoluril and N,N,N',N',N",N"-Hexakis(methoxymethyl)-1,3,5-triazine-2,4,6-triamine,
  other NOSDSs.

In an embodiment, a liquid solution is comprised of a OPCFs and an aprotic NOSDS wherein OPCFs comprise one or more monomers selected from the group consisting of maleic acid, itaconic acid, citraconic acid, acrylic acid and methacrylic acid. In an embodiment, the method to make a liquid OPCF/aprotic NOSDS composition comprises a) charging one or more of the monomers selected from the group consisting of maleic acid, itaconic acid, citraconic acid, acrylic acid and methacrylic acid to an aprotic NOSDS and a free radical initiator b) heating the composition to 60-240° C. and holding until desired molecular weight. In variation, the method to make further comprises sparging/sweeping with an inert gas such as but not limited to nitrogen, argon and carbon dioxide. In another variation, the method to make further comprises utilizing reduced pressure to remove by-products and to assist in removing oxygen from the reaction vessel.

In a variation, the free radical initiators as known by those skilled in the art include but not limited to ammonium persulfate, benzoyl peroxide and/or di-tert butyl peroxide.

In a variation, the method to make further comprises charging of monomers and/or initiators over time. The heating of mix vessel, in this embodiment, may be jacketed and the temperature carefully controlled. In an embodiment, the mixing action should allow complete mixing without too much aeration. In a variation, the heating may be accomplished using hot water or low pressure steam to control any hot spots on walls of the vessel to prevent heat degradation. In a variation, the carboxylate functionalities of OPCF/NOSDS composition further comprises a salt wherein said salt is derived from the reaction of a neutralizing agent with the carboxylate functionalities wherein the neutralizing agents are comprised of one or more metal cations and one or more nitrogen containing compounds. In a variation, the metal cations are derived from one or more members selected from the group consisting of a) elemental metals b) metal oxides c) metal hydroxides, d) metal alkylates and e) metal carbonates. In another variation, the one or more nitrogen containing compounds are selected from the group consisting of ammonia, ammonium hydroxide and organoamines. In another embodiment, the aprotic NOSDS comprises one or more members selected from the group consisting of:

1) Dimethyl Sulfoxide and 2) dialkyl, diaryl, or alkylaryl sulfoxide(s) having the formula:

$R_1S(O)_xR_2$ wherein $R_1$ and $R_2$ are each independently a $C_{1-6}$ alkylene group, an aryl group, or $C_{1-3}$alkylenearyl group or $R_1$ and $R_2$ with the sulfur to which they are attached form a 4 to 8 membered ring wherein $R_1$ and $R_2$ together are a $C_{1-6}$ alkylene group which optionally contains one or more atoms selected from the group consisting of O, S, Se, Te, N, and P in the ring and x is 1 or 2.

3) one or more alkylene carbonates selected from the group consisting of ethylene carbonate, propylene carbonate and butylene carbonate, 4) one or more polyols capped with acetate or formate wherein the one or more polyol portion is selected from the group consisting of ethylene glycol, 1,3 propylene glycol, 1,2 propylene glycol, butylene glycol, trimethylol propane, trimethylol ethane, pentaerythritol, sorbitol and sorbitan, glucose, fructose, galactose and glycerin, 5) one or more alkylene glycol alkyl ethers acetates selected from the group consisting of dipropylene glycol methyl ether acetate, tripropylene glycol methyl ether acetate, and tripropylene glycol butyl ether acetate, 6) isophorone, 7) dimethylsuccinate, dimethyl adipate, diethyl glutarate, and dimethyl glutarate, 8) dimethylacetamide, dimethylformamide, dimethyl-2-imidazolidinone 9) hexamethylphosphoramide, 10) 1,2-dimethyloxethane, 2-methoxyethyl ether, 11) cyclohexylpyrrolidone, 12) limonene 13) one or more alkyl pyrrolidones selected from the group consisting of methyl pyrrolidone, ethyl pyrrolidone, propyl pyrrolidone and butyl pyrrolidone and 14)) one or more organo phosphorous liquids selected from the group consisting of hexamethylphosphoramide and one or more trialkylphosphates represented by the formula:

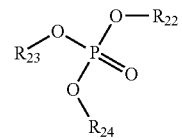

wherein:
$R_{22}$ is an alkyl radical —$C_1H_3$ to —$C_6H_{13}$
$R_{23}$ is an alkyl radical —$C_1H_3$ to —$C_6H_{13}$
$R_{24}$ is an alkyl radical —$C_1H_3$ to —$C_6H_{13}$
and wherein the liquid solution's composition comprises OPCFs levels at 5-80% of the total liquid formulation's composition In an embodiment, the one or more metal cations' portion of the neutralizing agent is selected from the group consisting of: Na, K, Mg, Ca, Fe, Zn, Mn, Cu, Co, Mo and Ni.

In an embodiment, the one or more organoamine neutralizing agents is selected from the group consisting of: a) mono $C_{1-6}$ amine, b) di $C_{1-6}$ amine, c) tri $C_{1-6}$ amine, d) monoethanolamine, e) diethanolamine, f) triethanolamine, g) monoisopropanolamine, h) diisopropanolamine, i) triisopropanolamine, j) ethylenediamine, k) diethylene triamine, l) triethyl tetraamine, m) tetraethylpentamine.

In an embodiment, the liquid formulation can further comprise one or more members selected from the group consisting of:
 one or more bio-active agents selected from the group consisting of i) urease inhibitors, ii) nitrification inhibitors, iii) pesticides, iv) herbicides, v) fungicides and vi) insecticides,
 one or more visual aids selected from the group consisting of as food colors, dispersion of pigments, colorants or dyes, wherein the inclusion of visual aids improve the visual evidence of complete coverage and serve as a visual marker, wherein the visual aids contain <5% water and/or low molecular weight alcohols, and wherein % composition of the invention's liquid solution can optionally comprise 0.1-2.5% of the active colorant or dye,
 scents or masking agents to improve the odor of the formula,
 nonionic, anionic, cationic, zwitterionic, and/or amphoteric surfactants to improve formula application performance of nitrogen source granules,
 buffering agents, micronutrients and flow modifiers such as silica, zinc stearate, calcium stearate and the like,
 One or more crosslinking agents selected from the group consisting of i) paraformaldehyde, ii) trioxane, iii) one or more methoxy capped formaldehyde reaction products including but not limited to 1,3,4,6-Tetrakis (methoxymethyl)glycoluril and N,N,N',N',N",N"-Hexakis(methoxymethyl)-1,3,5-triazine-2,4,6-triamine,
 other NOSDSs.

In an embodiment, it is contemplated that the composition of a liquid formulation is comprised of a OPCFs and an aprotic NOSDS wherein OPCFs comprise one or more monomers selected from the group consisting of maleic acid, itaconic acid, citraconic acid, acrylic acid and methacrylic acid can further comprise other free radical reactive entities in weight ratios of up to 30% of the OPCFs.

In an embodiment, a liquid solution is comprised of a OPCFs and a protic NOSDS wherein the method to make the OPCFs utilizes a liquid mono-NOSDS maleate. In an embodiment, the method to make a liquid maleate/protic NOSDS composition comprises a) adding slowly maleic anhydride to a protic NOSDS under agitation, b) heating the OPCF/protic NOSDS composition to 40° C. to 100° C., c) mixing until the maleic anhydride is dissolved and reacted with the protic NOSDS, d) heating to 110° C.-140° C. d) cooling the composition to <40° C. In a variation, the liquid formulation's composition further comprises stoichiometric excess of a protic NOSDS wherein the protic NOSDS comprises one or more members selected from the group consisting of:

1) an alcohol from the family of C1-10 alkanols, 2) one or more polyols selected from the group consisting of trimethylol propane, trimethylol ethane, pentaerythritol, sorbitol and sorbitan, glucose, fructose, galactose, and glycerin, 3) poly(C1-10 alkylene) glycols, 4) one or more alkylene glycols selected from the group consisting of ethylene, 1,3 propylene glycol, 1,2 propylene glycol, and butylene glycol, 5) isopropylidene glycerol 6) one or more alkylene glycol alkyl ethers selected from the group consisting of tripropylene glycol methyl ether, tripropylene glycol butyl ether, dipropylene glycol butyl ether and dipropylene glycol butyl ether, 7) triethanolamine and 8) glycerol carbonate, In a variation, the mix vessel was cooled to control any exotherms. The heating of mix vessel, in this embodiment, may be jacketed and the temperature carefully controlled.

In an embodiment, the mixing action should allow complete mixing without too much aeration. In a variation, the heating may be accomplished using hot water or low pressure steam to control any hot spots on walls of the vessel to prevent heat degradation. In an embodiment, the mono ester of the protic NOSDS reaction with maleic anhydride (mono NOSDS maleate) is an intermediate for the production of other OPCFs.

In an embodiment, a liquid solution is comprised of a OPCFs and a NOSDS wherein OPCFs comprise one or more monomers selected from the group consisting of mono NOSDS maleate, itaconic acid, citraconic acid, acrylic acid and methacrylic acid. In an embodiment, the method to make a liquid OPCF/a NOSDS composition comprises a) charging one or more of the monomers selected from the group consisting of mono NOSDS maleate, itaconic acid, citraconic acid, acrylic acid and methacrylic acid to a NOSDS and a free radical initiator b) heating the composition to 60-120° C. and holding until desired molecular weight. In variation, the method to make further comprises sparging/sweeping with an inert gas such as but not limited to nitrogen, argon and carbon dioxide.

In another variation, the method to make further comprises utilizing reduced pressure to remove by-products and to assist in removing oxygen from the reaction vessel. In a variation, the choice of free radical initiators is known by those skilled in the art. In a variation, the method to make further comprises charging of monomers and/or initiators over time. The heating of mix vessel, in this embodiment, may be jacketed and the temperature carefully controlled. In an embodiment, the mixing action should allow complete mixing without too much aeration. In a variation, the heating may be accomplished using hot water or low pressure steam to control any hot spots on walls of the vessel to prevent heat degradation. In a variation, the carboxylate functionalities of OPCF/NOSDS composition further comprises a salt wherein said salt is derived from the reaction of a neutralizing agent with the carboxylate functionalities wherein the neutralizing agents are comprised of one or more metal cations and one or more nitrogen containing compounds. In a variation, the metal cations are derived from one or more members selected from the group consisting of a) elemental metals b) metal oxides c) metal hydroxides, d) metal alkylates and e) metal carbonates. In another variation, the one or more nitrogen containing compounds are selected from the group consisting of ammonia, ammonium hydroxide and organoamines. In an embodiment, the liquid formulation's composition comprises OPCFs levels at 5-80% of the total liquid formulation's composition In an embodiment, the one or more metal cations' portion of the neutralizing agent is selected from the group consisting of: Na, K, Mg, Ca, Fe, Zn, Mn, Cu, Co, Mo and Ni.

In an embodiment, the one or more organoamine neutralizing agents is selected from the group consisting of: a) mono $C_{1-6}$ amine, b) di $C_{1-6}$ amine, c) tri $C_{1-6}$ amine, d) monoethanolamine, e) diethanolamine, f) triethanolamine, g) monoisopropanolamine, h) diisopropanolamine, i) triisopropanolamine, j) ethylenediamine, k) diethylene triamine, l) triethyl tetraamine, m) tetraethylpentamine.

In an embodiment, the liquid formulation can further comprise one or more members selected from the group consisting of:

one or more bio-active agents selected from the group consisting of i) urease inhibitors, ii) nitrification inhibitors, iii) pesticides, iv) herbicides, v) fungicides and vi) insecticides, one or more visual aids selected from the group consisting of as food colors, dispersion of pigments, colorants or dyes, wherein the inclusion of visual aids improve the visual evidence of complete coverage and serve as a visual marker, wherein the visual aids contain <5% water and/or low molecular weight alcohols, and wherein % composition of the invention's liquid solution can optionally comprise 0.1-2.5% of the active colorant or dye, scents or masking agents to improve the odor of the formula, nonionic, anionic, cationic, zwitterionic, and/or amphoteric surfactants to improve formula application performance of nitrogen source granules, buffering agents, micronutrients and flow modifiers such as silica, zinc stearate, calcium stearate and the like, One or more crosslinking agents selected from the group consisting of i) paraformaldehyde, ii) trioxane, iii) one or more methoxy capped formaldehyde reaction products including but not limited to 1,3,4,6-Tetrakis(methoxymethyl)glycoluril and N,N,N',N',N",N"-Hexakis(methoxymethyl)-1,3,5-triazine-2,4,6-triamine, other NOSDSs.

In an embodiment, a liquid solution is comprised of a OPCFs and a NOSDS wherein OPCFs comprises mono NOSDS aspartate. In an embodiment, the method to make a liquid mono NOSDS aspartate composition comprises a) charging reaction vessel with mono NOSDS maleate and begin mixing, b) heating composition to 40° C. and injecting ammonia gas sub-surface into the mono NOSDS maleate, c) heating to 100° C. and holding until conversion of maleate to aspartate is completed. In a variation, the liquid formulation's composition further comprises stoichiometric excess of a protic NOSDS. In variation, the method to make further comprises sparging/sweeping with an inert gas such as but not limited to nitrogen, argon and carbon dioxide. In another variation, the method to make further comprises utilizing reduced pressure to remove by-products and to assist in removing oxygen from the reaction vessel. In an embodiment, the mono NOSDS aspartate is an intermediate for the production of other OPCFs.

In an embodiment a liquid solution is comprised of the OPCF, iminodisuccinic acid, and a protic NOSDS. In an embodiment, the method to make a liquid iminodisuccinic acid composition comprises a) charging reaction vessel with mono NOSDS aspartate and mono NOSDS maleate and begin mixing, b) slowly heating composition to a temperature range of 80 to 110° C. and holding at temperature for a period of time of 1-15 hours. In a variation, the liquid formulation's composition further comprises stoichiometric excess of a protic NOSDS. In variation, the method to make further comprises sparging/sweeping with an inert gas such as but not limited to nitrogen, argon and carbon dioxide. In another variation, the method to make further comprises utilizing reduced pressure to remove by-products and to assist in removing oxygen from the reaction vessel.

In an embodiment, the present invention relates to making a liquid compositions that can be readily mixed with mobile liquid nitrogen sources or applied safely, quickly, evenly and economically on the surface of solid nitrogen source granules and/or applied to the soil. In a variation some of the carboxylic acids of the OPCF can be reacted with a neutralizing agent that is also a micronutrient. In a variation, an OPCF of a liquid solution can deliver chelated micronutrients into mobile liquid forms of nitrogen sources such as aqueous dispersion, pressurized ammonia gas, molten urea and/or molten modified urea. In variation, nitrogen sources' granules/prills can be coated with a liquid solution that contains chelated micronutrients.

In an embodiment, a fertilizer component composition of a treated urea and/or a treated modified urea granule/prill for application to soil comprises a) mobile liquid molten urea and/or molten modified urea, b) said liquid solution wherein the liquid solution comprises said NOSDS and said OPCF. In a variation, not being bound by theory, said treated urea and/or a treated modified urea granule/prill results in depositing the OPCF s to the soil imparting benefits of:
  moisture control,
  providing a transport medium for nutrients in plant available form and water to plant roots,
  freeing up macronutrients and micronutrients bound in the soil as insoluble salts and complexes in a plant available form,
  providing chelated micronutrients in urea and/or modified urea
  providing additional nitrification and urease inhibition properties though chelates and complexes with micronutrient,
  providing the micronutrient sulfur if the NOSDS comprises a sulfoxide or a sulfone.
and improving the manufacturing processing and the physical and chemical properties of the resulting treated urea and/or treated modified urea by:
  lowering melt point of urea and/or modified urea by introduction of the NOSDS from the liquid solution.
  improving properties of urea and/or a modified urea granule/prill.
    harder and tougher physical properties such as crush/impact resistance
    a lower ppm of biuret
  Providing a polymer with multiple crosslinking sites for urea/formaldehyde and/or urea/ammonia/formaldehyde manufacturing processes In a further embodiment, a fertilizer component composition of a treated urea and/or a treated modified urea granule/prill for application to soil further comprises a) mobile liquid molten urea and/or molten modified urea, b) said liquid solution wherein the liquid solution comprises said NOSDS and said OPCF and c) one or more bio-active agents selected from the group consisting of:

1. one or more biologics selected from the group consisting of
  a. one or more *Bacillus* biologics selected from the group consisting of
    i. *Bacillus mucilaginosas*
    ii. *Bacillus Subtilus*
    iii. *Lactobacillus acidophilus*
    iv. *Bacillus amylofliquifaciens*
    v. *Bacillus itcheniformis*
    vi. *Bacillus megaterium*
    vii. *Bacillus pumilus*
    viii. *Bacillus megaterium*
    ix. *Bacillus pumilus*
    x. *Bacillus circulans*
    xi. *Bacillus globisporus*
    xii. *Bacillus firmus*
    xiii. *Bacillus thuringiensis galleriae*
    xiv. *Bacillus thuringiensis kurstaki*
    xv. *Bacillus cereus*
    xvi. *Bacillus globisporus*
    xvii. *Bacillus amyloliquefaciens*
    xviii. *Bacillus thuringiensis galleriae*
    xix. *Bacillus thuringiensis kurstaki*
    xx. *Bacillus mycoide* isolate
    xxi. *Bacillus aryabhattai*
    xxii. *B. flexus*
    xxiii. *B. nealsonii*
    xxiv. *Bacillus sphaericus*
    xxv. *B. vallismortis*
  b. *Rhizobium*
  c. *Bradyrhizobium* species
  d. *Bradyrhizobium japonicum*
  e. *Rhizobium meliloti*
  f. One or more *Azospirillum* biologics selected from the group consisting of
    i. *Azospirillum lipoferum*
    ii. *Azospirillum brasilense*
    iii. *Azospirillum amazonense*
    iv. *Azospirillum halopreaferens*
    v. *Azospirillum irankense*
  g. One or more *Azobacter* and *Gluconacetobacter* biologics selected from the group consisting of
    i. *Azotobacter agilis*
    ii. *Azotobacter armeniacus*
    iii. *Azotobacter* sp. AR
    iv. *Azotobacter beijerinckii*
    v. *Azotobacter chroococcum*
    vi. *Azotobacter* sp. DCU26
    vii. *Azotobacter* sp. FA8
    viii. *Azotobacter nigricans*
    ix. *Azotobacter paspali*
    x. *Azotobacter salinestris*
    xi. *Azotobacter tropicalis*
    xii. *Azotobacter vinelandii*
  h. *Phosphobacteria*
  i. *Cyanobacteria*
  j. *Herbaspirillum*
  k. *Burkholderia*,
  l. *Pseudomonas*
  m. *Gluconacetobacter*
  n. *Enterobacter*
  o. *Klebsiella*
  p. *Burkholderia*
  q. *Laccaria bicolor*
  r. *Glomus imraradices timanita* s. *Actinomyces*
t. *Penicillium*
u. *Mesorhizobiwn cicero*
v. *Reynoutria sachalinensis*
w. One or more insecticidal or insect repellent microbial species and strains selected from the group consisting of *Telenomus podisi, Baculovirus anticarsia, Trichogramma pretiosum, Trichogramma gallai, Chromobacterium subtsugae, Trichoderma fertile, Beauveria bassiana, Beauveria bassiana, Beauveria bassiana, Paecilomyces fumosoroseus, Trichoderma harzianum, Verticillium lecanii, lsarfofumosarosea Lecanicillium muscarium, Streptomyces microflavus, Muscodor albus,*
x. one or more nematodal microbial species and strains selected from the group consisting of *Myrothecium verrucaria, Pasteuria* species, *Pasteuria Metarhizium* species, *Flavobacterium* species and
y. one or more antifungal, antimicrobial and/or plant growth promoting microbial species and strains selected from a group consisting of *Gliocladium* species, *Pseudomonas* species (e.g. *Pseudomonas fluorescens, Pseudomonas fluorescens. putida* and *P. chlororaphis*), *Pseudomonasfluorescens VP5, Pseudomonas diazotrophicus, Enterobacter cloacae, Trichoderma species, Trichoderma virens, Trichoderma atroviride* strains, *Coniothyrium minitans, Gliocladium* species, *Gliacladium virens, Gliacladium roseum, Trichoderma harzianum* species.

2. and one or more biologically active agents selected from the group consisting of:
   a. one or more urease inhibitors selected from the group consisting of aliphatic phosphoric triamide, phosphoramides, N-alkyl thiophosphoric triamides, (aminomethyl)phosphinic acids and their salts and aminomethyl (alkylaminomethyl)phosphinic acids and their salts,
   b. one or more nitrification inhibitors selected from the group consisting of 2-chloro-6-trichloromethyl)pyridine, 4-amino-1,2,4,6-triazole-HCl, 2,4-diamino-6-trichloromethyltriazine CL-1580, dicyandiamide (DCD), thiourea, 1-mercapto-1,2,4-triazole, ammonium thiosulfate, dimethylpyrazole organic and inorganic salts, and 2-amino-4-chloro-6-methylpyrimidine,
   c. one or more fungicides such as but not limited to azoxystrobin, *bacillus* lichenformis, boscalid, captan, chloroneb, chlorothalonil, ethazole (etridiazole), fenarimol, fludioxonil, flutolanil, fosetyl-aluminum, iprodione, mancozeb, mefenoxam, myclobutanil, potassium phosphite, polyoxin D, propamocarb, propiconazole, pyraclostrobin, tebuconazole, thiophanate-methyl, thiram, triadimefon, trifloxystrobin, vinclozolin,
   d. one or more herbicides such as but not limited to 2,4-D, 2,4-DB, acetochlor, aciflumfen, alachlor, ametryn, atrazine, aminopyralid, benefin, bensulfuron, bensulide, bentazon, bromacil, bromoxynil, butylate, carfentrazone, chlorimuron, chlorsulfuron, clethodim, clomazone, clopyralid, cloransulam, cycloate, DCPA, desmedipham, dicamba, dichlobenil, diclofop, diclosulam, diflufenzopyr, dimethenamid, diquat, diuron, DSMA, endothall, EPTC, ethalfluralin, ethofumesate, fenoxaprop, fluazifop-P, flucarbazone, flufenacet, flumetsulam, flumiclorac, flumioxazin, fluometuron, fluroxypyr, fomesafen, foramsulfuron, glufosinate, glyphosate, halosulfuron, hexazinone, imazamethabenz, imazamox, imazapic, imazaquin, imazethapyr, isoxaben, isoxaflutole, lactofen, linuron, MCPA, MCPB, mesotrione, metolachlor-s, metribuzin, metsulfuron, molinate, MSMA, napropamide, naptalam, nicosulfuron, norflurazon, oryzalin, oxadiazon, oxyfluorfen, paraquat, pelargonic acid, pendimethalin, phenmedipham, picloram, primisulfuron, prodiamine, prometryn, pronamide, propanil, prosulfuron, pyrazon, pyrithiobac, quinclorac, quizalofop, rimsulfuron, sethoxydim, siduron, simazine, sulfentrazone, sulfometuron, sulfosulfuron, tebuthiuron, terbacil, thiazopyr, thifensulfuron, thiobencarb, tralkoxydim, triallate, triasulfuron, tribenuron, triclopyr, trifluralin, triflusulfuron,
   e. and one or more insecticides such as but not limited to bifenthrin, cypermethrin, permethrin, piperonyl butoxide, lambda-cyhalothrin, (s)-methoprene, deltamethrin, permethrin, esfenvalerate, pyriproxyfen, fipronil, etofenprox, cyphenothrin, carbofuran, chlorpoyrifos, disulfoton, fenvalerate, ethoprop, fonofos, malathion, permethrin, phorate, tefluthrin, terbufos, trimethacarb, allicin, anabasine, azadirachtin, carvacrol, d-limonene, matrine, nicotine, nornicotine, oxymatrine, pyrethrins, cinerins, jasmolin, quassia, rhodojaponin, rotenone, ryania, sabadilla, sanguinarine, triptolide, carbamate insecticides, benzofuranyl methylcarbamate insecticides, dimethylcarbamate insecticides, oxime carbamate insecticides, phenyl methylcarbamate insecticides, dinosam, DNOC, fluorine insecticides, formamidine insecticides, amitraz, chlordimeform, formetanate, formparanate, medimeform, semiamitraz In a variation, a fertilizer component composition of a treated urea and/or a treated modified urea granule/prill for application to soil comprises a) mobile liquid molten urea and/or molten modified urea, b) said liquid solution wherein the liquid solution comprises said NOSDS and said OPCF and c) one or more slow release/hydrophobizing bio-active agents are selected from the group consisting of a) a composition comprising a polymer/oligomer resulting from the reaction of formaldehyde and dicyandiamide wherein the cyano functionalities of the dicyandiamide has been conserved wherein the reaction medium is an aprotic NOSDS and b) a composition comprising a polymer/oligomer resulting from the reaction of formaldehyde and one or more pyrazoles represented by the structure:

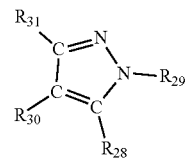

wherein R28=—H, —CH3, —CH2CH3, —NH2 or —NHCH3
wherein R29=—H, —OH, —SH, —CONH2 or —CONHCH3
wherein R30=—H, —CH3, —CH2CH3, —NH2 or —NHCH3
wherein R31=—H, —CH3, —CH2CH3, —NH2 or —NHCH3, resulting in a polymer/oligomer wherein the reaction medium is an aprotic NOSDS and wherein the resulting properties of treated urea and treated modified urea granules/prills are:
lower solubility of the treated urea and/or treated modified urea, longer lifespan for the nitrification inhibition properties of the treated urea,
reduced mobility through the soil and atmospheric volatility of the nitrification inhibitors.

In a variation, a fertilizer component composition of a treated urea and/or a treated modified urea granule/prill for application to soil comprises a) mobile liquid molten urea and/or molten modified urea, b) said liquid solution wherein the liquid formulation comprises said NOSDS and said OPCF and c) one or more crosslinking agents selected from the group consisting of i) paraformaldehyde, ii) trioxane, iii) one or more methoxy capped formaldehyde reaction products including but not limited to 1,3,4,6-Tetrakis(methoxymethyl)glycoluril and N,N,N',N',N'',N''-Hexakis(methoxymethyl)-1,3,5-triazine-2,4,6-triamine wherein the crosslinking agent can be dissolved/slurried with the said liquid formulation and added to the mobile liquid molten urea to develop a crosslink network for improved urea granule/prills physical properties such as crush/deformation resistance and lower absorbance of atmospheric moisture. Not to be bound by theory, the solubility of the liquid solution in urea allows for more even distribution of the contents of the said liquid solutions. In a variation, the composition further comprises one or more slow release/hydrophobizing bio-active agents are selected from the group consisting of a) a composition comprising a polymer/oligomer resulting from the reaction of formaldehyde and dicyandiamide wherein the cyano functionalities of the dicyandiamide has been conserved wherein the reaction medium is an aprotic NOSDS and b) a composition comprising a polymer/oligomer resulting from the reaction of formaldehyde and one or more pyrazoles represented by the structure:

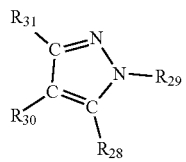

wherein R28=—H, —CH3, —CH2CH3, —NH2 or —NHCH3
wherein R29=—H, —OH, —SH, —CONH2 or —CONHCH3
wherein R30=—H, —CH3, —CH2CH3, —NH2 or —NHCH3
wherein R31=—H, —CH3, —CH2CH3, —NH2 or —NHCH3,
resulting in a polymer/oligomer wherein the reaction medium is an aprotic NOSDS and wherein the resulting properties of treated urea and treated modified urea granules/prills are improved physical properties such as crush/deformation resistance and lower absorbance of atmospheric moisture.

In a variation, a fertilizer component composition of a treated urea and/or a treated modified urea granule/prill for application to soil comprise a) mobile liquid molten urea and molten modified urea, said NOSDS and said OPCF salts resulting in an even distribution of the micronutrients throughout the treated urea and treated modified urea ensuring a more even distribution into the soil.

In an embodiment, a treated urea and/or a treated modified urea granule/prill for application to soil comprises the composition weight of 80-99.5% of urea and modified urea and 0.5-20% of said liquid solution or alternatively 85-98% of urea and modified urea and 2-15% of said liquid solution or alternatively 88-97% of urea and modified urea and 3-12% of said liquid solution or alternatively 90-95% of urea and modified urea and 5-12% of said liquid solution wherein said liquid solution comprises 99-20% of said NOSDS and 1-80% of said OPCF or alternatively 80-30% of said NOSDS and 20-70% of said OPCF or alternatively 70-40% of said NOSDS and 30-60% of said OPCF or alternatively 60-50% of said NOSDS and 40-50% of said OPCF. In a variation, a treated urea and/or a treated modified urea granule/prill for application to soil comprises the composition weight of 60-95% of urea and modified urea and 0.5-15% of said liquid solution wherein the liquid solution comprises 99-30% of said NOSDS and 1-70% of said OPCF or alternatively 80-30% of said NOSDS and 20-70% of said OPCF or alternatively 70-40% of said NOSDS and 30-60% of said OPCF or alternatively 60-50% of said NOSDS and 40-50% of said OPCF, 0.1-10% one or more of said bio-active agents and/or slow release/hydrophobizing bio-actives and 4.4-15% of said NOSDS. In a variation the said liquid solution, bio-actives and NOSDS can be combined as a mobile liquid molten urea and molten modified urea additive wherein the additive's composition weight comprises 5-40% of said OPCFs, 5-25% of said bio-active agents and/or slow release/hydrophobizing bio-actives and 35-90% of said NOSDS.

In an embodiment, the treated urea and treated modified urea can be dissolved into water resulting in an mobile liquid nitrogen source for application to soil and/or as a foliar application to plants wherein the liquid mobile nitrogen source is an aqueous dispersion. In a variation, other nitrogen sources such as ammonium nitrate and other fertilizer component such as diammonium phosphate can be added to the aqueous dispersion. In another variation water soluble/dispersible bio-actives can be added to the aqueous dispersion.

In an embodiment, the composition of a mobile liquid fertilizer for sub-surface injection into the soil comprises anhydrous ammonia, said liquid solution wherein the liquid solution comprises said NOSDS and said OPCF. In a variation, not being bound by theory, said mobile liquid fertilizer for sub-surface injection into the soil results in depositing the OPCF into the root zone of the soil imparting benefits of:
  moisture control,
  providing a transport medium for nutrients in plant available form and water to plant roots,
  freeing up macronutrients and micronutrients bound in the soil as insoluble salts and complexes in a plant available form,
  providing chelated micronutrients at the roots of plants,
  providing additional nitrification inhibition properties though chelates and complexes with micronutrient,
  providing the micronutrient sulfur if the NOSDS comprises a sulfoxide or a sulfone.

In a further embodiment, the composition of a mobile liquid fertilizer for sub-surface injection into the soil further comprises anhydrous ammonia, said liquid solution wherein the liquid solution comprises said NOSDS and said OPCF and one or more bio-active agents are selected from the group consisting of:
  1) one or more biologics selected from the group consisting of
    a. one or more *Bacillus* biologics selected from the group consisting of
      i. *Bacillus mucilaginosas*
      ii. *Bacillus Subtilus*
      iii. *Lactobacillus acidophilus* iv. *Bacillus amylofliquifaciens*
v. *Bacillus itcheniformis*
vi. *Bacillus megaterium*
vii. *Bacillus pumilus*
viii. *Bacillus megaterium*
ix. *Bacillus pumilus*
x. *Bacillus circulans*
xi. *Bacillus globisporus*
xii. *Bacillus firmus*
xiii. *Bacillus thuringiensis galleriae*
xiv. *Bacillus thuringiensis kurstaki*
xv. *Bacillus cereus*
xvi. *Bacillus globisporus*
xvii. *Bacillus amyloliquefaciens*
xviii. *Bacillus thuringiensis galleriae*
xix. *Bacillus thuringiensis kurstaki*
xx. *Bacillus mycoide* isolate
xxi. *Bacillus aryabhattai*
xxii. *B. flexus*
xxiii. *B. nealsonii*
xxiv. *Bacillus sphaericus*
xxv. *B. vallismortis*
b. *Rhizobium*
c. *Bradyrhizobium* species
d. *Bradyrhizobium japonicum*
e. *Rhizobium meliloti*
f. One or more *Azospirillum* biologics selected from the group consisting of
  i. *Azospirillum lipoferum*
  ii. *Azospirillum brasilense*
  iii. *Azospirillum amazonense*
  iv. *Azospirillum halopreaferens*
  v. *Azospirillum irankense*
g. One or more *Azobacter* and *Gluconacetobacter* biologics selected from the group consisting of
  i. *Azotobacter agilis*
  ii. *Azotobacter armeniacus*
  iii. *Azotobacter* sp. AR
  iv. *Azotobacter beijerinckii*
  v. *Azotobacter chroococcum*
  vi. *Azotobacter* sp. DCU26
  vii. *Azotobacter* sp. FA8
  viii. *Azotobacter nigricans*
  ix. *Azotobacter paspali*
  x. *Azotobacter salinestris*
  xi. *Azotobacter tropicalis*
  xii. *Azotobacter vinelandii*
h. *Phosphobacteria*
i. *Cyanobacteria*
j. *Herbaspirillum*
k. *Burkholderia,*
l. *Pseudomonas*
m. *Gluconacetobacter*
n. *Enterobacter*
o. *Klebsiella*
p. *Burkholderia*
q. *Laccaria bicolor*
r. *Glomus imraradices timanita*
s. *Actinomyces*
t. *Penicillium*
u. *Mesorhizobiwn cicero*
v. *Reynoutria sachalinensis*
w. One or more insecticidal or insect repellent microbial species and strains selected from the group consisting of: *Telenomus podisi, Baculovirus anticarsia, Trichogramma pretiosum, Trichogramma gallai, Chromobacterium subtsugae, Trichoderma fertile, Beauveria bassiana, Beauveria bassiana, Beauveria bassiana, Paecilomyces fumosoroseus, Trichoderma harzianum, Verticillium lecanii, lsarfofumosarosea Lecanicillium muscarium, Streptomyces microflavus, Muscodor albus,*
x. one or more nematodal microbial species and strains selected from the group consisting of: *Myrothecium verrucaria, Pasteuria* species, *Pasteuria Metarhizium* species, *Flavobacterium* species and
y. one or more antifungal, antimicrobial and/or plant growth promoting microbial species and strains selected from a group consisting of: *Gliocladium* species, *Pseudomonas* species (e.g. *Pseudomonas fluorescens, Pseudomonas fluorescens. putida* and *P. chlororaphis*), *Pseudomonasfluorescens* VP5, *Pseudomonas diazotrophicus, Enterobacter cloacae, Trichoderma* species, *Trichoderma virens, Trichoderma atroviride* strains, *Coniothyrium minitans, Gliocladium* species, *Gliacladium virens, Gliacladium roseum, Trichoderma harzianum* species.

2) and one or more biologically active agents selected from the group consisting of:
  a. one or more urease inhibitors selected from the group consisting of aliphatic phosphoric triamide, phosphoramides, N-alkyl thiophosphoric triamides, (aminomethyl)phosphinic acids and their salts and aminomethyl (alkylaminomethyl)phosphinic acids and their salts,
  b. one or more nitrification inhibitors selected from the group consisting of 2-chloro-6-trichloromethyl)pyridine, 4-amino-1,2,4,6-triazole-HCl, 2,4-diamino-6-trichloromethyltriazine CL-1580, dicyandiamide (DCD), thiourea, 1-mercapto-1,2,4-triazole, ammonium thiosulfate, dimethylpyrazole organic and inorganic salts, and 2-amino-4-chloro-6-methylpyrimidine,
  c. one or more fungicides such as but not limited to azoxystrobin, *bacillus* lichenformis, boscalid, captan, chloroneb, chlorothalonil, ethazole (etridiazole), fenarimol, fludioxonil, flutolanil, fosetyl-aluminum, iprodione, mancozeb, mefenoxam, myclobutanil, potassium phosphite, polyoxin D, propamocarb, propiconazole, pyraclostrobin, tebuconazole, thiophanate-methyl, thiram, triadimefon, trifloxystrobin, vinclozolin,
  d. one or more herbicides such as but not limited to 2,4-D, 2,4-DB, acetochlor, acifluorfen, alachlor, ametryn, atrazine, aminopyralid, benefin, bensulfuron, bensulide, bentazon, bromacil, bromoxynil, butylate, carfentrazone, chlorimuron, chlorsulfuron, clethodim, clomazone, clopyralid, cloransulam, cycloate, DCPA, desmedipham, dicamba, dichlobenil, diclofop, diclosulam, diflufenzopyr, dimethenamid, diquat, diuron, DSMA, endothall, EPTC, ethalfluralin, ethofumesate, fenoxaprop, fluazifop-P, flucarbazone, flufenacet, flumetsulam, flumiclorac, flumioxazin, fluometuron, fluroxypyr, fomesafen, foramsulfuron, glufosinate, glyphosate, halosulfuron, hexazinone, imazamethabenz, imazamox, imazapic, imazaquin, imazethapyr, isoxaben, isoxaflutole, lactofen, linuron, MCPA, MCPB, mesotrione, metolachlor-s, metribuzin, metsulfuron, molinate, MSMA, napropamide, naptalam, nicosulfuron, norflurazon, oryzalin, oxadiazon, oxyfluorfen, paraquat, pelargonic acid, pendimethalin, phenmedipham, picloram, primisulfuron, prodiamine, prometryn, pronamide, propanil, prosulfuron, pyrazon, pyrithiobac, quinclorac, quizalofop, rimsulfuron, sethoxydim, siduron, simazine, sulfentrazone, sulfometuron, sulfosulfuron, tebuthiuron, terbacil, thiazopyr, thifensulfuron, thiobencarb, tralkoxydim, triallate, triasulfuron, tribenuron, triclopyr, trifluralin, triflusulfuron, e. and one or more insecticides such as but not limited to bifenthrin, cypermethrin, permethrin, piperonyl butoxide, lambda-cyhalothrin, (s)-methoprene, deltamethrin, permethrin, esfenvalerate, pyriproxyfen, fipronil, etofenprox, cyphenothrin, carbofuran, chlorpoyrifos, disulfoton, fenvalerate, ethoprop, fonofos, malathion, permethrin, phorate, tefluthrin, terbufos, trimethacarb, allicin, anabasine, azadirachtin, carvacrol, d-limonene, matrine, nicotine, nornicotine, oxymatrine, pyrethrins, cinerins, jasmolin, quassia, rhodojaponin, rotenone, ryania, sabadilla, sanguinarine, triptolide, carbamate insecticides, benzofuranyl methylcarbamate insecticides, dimethylcarbamate insecticides, oxime carbamate insecticides, phenyl methylcarbamate insecticides, dinosam, DNOC, fluorine insecticides, formamidine insecticides, amitraz, chlordimeform, formetanate, formparanate, medimeform, semiamitraz.

In a variation, a composition of a mobile liquid fertilizer for sub-surface injection into the soil further comprises anhydrous ammonia, said liquid solution wherein the liquid solution comprises said NOSDS and said OPCF and one or more slow release/hydrophobizing bio-active agents are selected from the group consisting of a) a composition comprising a polymer/oligomer resulting from the reaction of formaldehyde and dicyandiamide wherein the cyano functionalities of the dicyandiamide has been preserved wherein the reaction medium is an aprotic NOSDS and b) a composition comprising a polymer/oligomer resulting from the reaction of formaldehyde and one or more pyrazoles represented by the structure:

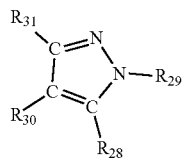

wherein R28=—H, —CH3, —CH2CH3, —NH2 or —NHCH3
wherein R29=—H, —OH, —SH, —CONH2 or —CONHCH3
wherein R30=—H, —CH3, —CH2CH3, —NH2 or —NHCH3
wherein R31=—H, —CH3, —CH2CH3, —NH2 or —NHCH3,
resulting in a polymer/oligomer dispersed within an aprotic NOSDS and wherein the resulting properties of anhydrous ammonia are:
lower solubility,
longer lifespan for the nitrification inhibition properties,
reduced mobility through the soil and atmospheric volatility of the nitrification inhibitors.

In a variation, a composition of a mobile liquid fertilizer for sub-surface injection into the soil further comprises anhydrous ammonia, said liquid formulation wherein the liquid formulation comprises said NOSDS and OPCFs wherein the OPCFs comprise a) one or more polymers/oligomers wherein the monomers are selected from the group consisting aspartic and glutamic acids and b) said amino polycarboxylate functionalities impart an anti-corrosivity property to application equipment to protect the equipment from corrosive mobile liquid fertilizer compositions that comprises the nitrification inhibitor 2-chloro-6-trichloromethyl)pyridine.

In a variation, the composition of a mobile liquid fertilizer for sub-surface injection into the soil comprises anhydrous ammonia, said liquid solution wherein the liquid solution comprises said NOSDS and said OPCF and/or their resulting in an even distribution of the micronutrients throughout the anhydrous ammonia ensuring a more even distribution in the sub-soil.

In an embodiment, a mobile liquid fertilizer for sub-surface injection into the soil comprises the composition weight of 80-99.9% anhydrous ammonia and 0.1-20% of said liquid formulation or alternatively 85-98% of anhydrous ammonia and 2-15% of said liquid formulation or alternatively 88-97% of anhydrous ammonia and 3-12% of said liquid formulation or alternatively 90-95% of anhydrous ammonia and 5-12% of said liquid formulation wherein said liquid formulation comprises 99-20% of said NOSDS and 1-80% of said OPCF or alternatively 80-30% of said NOSDS and 20-70% of said OPCF or alternatively 70-40% of said NOSDS and 30-60% of said OPCF or alternatively 60-50% of said NOSDS and 40-50% of said OPCF. In a variation, a mobile liquid fertilizer for sub-surface injection into the soil comprises the composition weight of 60-95% anhydrous ammonia and 0.5-15% of said liquid formulation wherein the liquid formulation comprises 99-30% of said NOSDS and 1-70% of said OPCF or alternatively 80-30% of said NOSDS and 20-70% of said OPCF or alternatively 70-40% of said NOSDS and 30-60% of said OPCF or alternatively 60-50% of said NOSDS and 40-50% of said OPCF, 0.1-10% one or more of said bio-active agents and/or slow release/hydrophobizing bio-actives and 4.4-15% of said NOSDS. In a variation the said liquid formulation, bio-actives and NOSDS can be combined as an anhydrous ammonia additive wherein the anhydrous ammonia additive's composition weight comprises 5-40% of said OPCFs, 5-25% of said bio-active agents and/or slow release/hydrophobizing bio-actives and 35-90% of said NOSDS.

In an embodiment, the composition of a mobile liquid fertilizer for application to soil comprises water, one or more nitrogen sources selected from the group consisting of a) urea, b) modified urea, c) treated urea, d) treated modified urea, e) ammonium nitrate and f) ammonium sulfate, said liquid formulation wherein the liquid formulation comprises said NOSDS and said OPCF. In a variation, not being bound by theory, said mobile liquid fertilizer for application to soil results in depositing the OPCF onto the soil imparting benefits of:
moisture control,
freeing up macronutrients and micronutrients bound in the soil as insoluble salts and complexes in a plant available form,
providing chelated micronutrients to plants,
providing additional nitrification inhibition properties though chelates and complexes with micronutrient,
providing the micronutrient sulfur if the NOSDS comprises a sulfoxide or a sulfone.

In a further embodiment, the composition of a mobile liquid fertilizer for application to soil comprises water, one or more nitrogen sources selected from the group consisting of a) urea, b) modified urea, c) treated urea, d) treated modified urea, e)ammonium nitrate and f) ammonium sulfate, said liquid formulation wherein the liquid formulation comprises said NOSDS and said OPCF and one or more bio-active agents are selected from the group consisting of:
1) one or more biologics selected from the group consisting of
  a. one or more *Bacillus* biologics selected from the group consisting of
    i. *Bacillus mucilaginosas*
    ii. *Bacillus Subtilus*
    iii. *Lactobacillus acidophilus*
    iv. *Bacillus amylofliquifaciens*
    v. *Bacillus itcheniformis*
    vi. *Bacillus megaterium*
    vii. *Bacillus pumilus*
    viii. *Bacillus megaterium*
    ix. *Bacillus pumilus*
    x. *Bacillus circulans*
    xi. *Bacillus globisporus*
    xii. *Bacillus firmus*
    xiii. *Bacillus thuringiensis galleriae*
    xiv. *Bacillus thuringiensis kurstaki*
    xv. *Bacillus cereus*
    xvi. *Bacillus globisporus*
    xvii. *Bacillus amyloliquefaciens*
    xviii. *Bacillus thuringiensis galleriae*
    xix. *Bacillus thuringiensis kurstaki*
    xx. *Bacillus mycoide* isolate
    xxi. *Bacillus* aryabhattai
    xxii. *B. flexus*
    xxiii. *B. nealsonii*
    xxiv. *Bacillus sphaericus*
    xxv. *B. vallismortis*
  b. *Rhizobium*
  c. *Bradyrhizobium* species
  d. *Bradyrhizobium japonicum*
  e. *Rhizobium meliloti*
  f. One or more *Azospirillum* biologics selected from the group consisting of
    i. *Azospirillum lipoferum*
    ii. *Azospirillum brasilense*
    iii. *Azospirillum amazonense*
    iv. *Azospirillum halopreaferens*
    v. *Azospirillum irankense*
  g. One or more *Azobacter* and *Gluconacetobacter* biologics selected from the group consisting of
    i. *Azotobacter agilis*
    ii. *Azotobacter armeniacus*
    iii. *Azotobacter* sp. AR
    iv. *Azotobacter beijerinckii*
    v. *Azotobacter chroococcum*
    vi. *Azotobacter* sp. DCU26
    vii. *Azotobacter* sp. FA8
    viii. *Azotobacter nigricans*
    ix. *Azotobacter paspali*
    x. *Azotobacter salinestris*
    xi. *Azotobacter tropicalis*
    xii. *Azotobacter vinelandii*
  h. *Phosphobacteria*
  i. *Cyanobacteria*
  j. *Herbaspirillum*
  k. *Burkholderia*,
  l. *Pseudomonas*
  m. *Gluconacetobacter*
  n. *Enterobacter*
  o. *Klebsiella*
  p. *Burkholderia*
  q. *Laccaria bicolor*
  r. *Glomus imraradices timanita*
  s. *Actinomyces*
  t. *Penicillium*
  u. *Mesorhizobiwn cicero*
  v. *Reynoutria sachalinensis*
  w. One or more insecticidal or insect repellent microbial species and strains selected from the group consisting of: *Telenomus podisi, Baculovirus anticarsia, Trichogramma pretiosum, Trichogramma gallai, Chromobacterium subtsugae, Trichoderma fertile, Beauveria bassiana, Beauveria bassiana, Beauveria bassiana, Paecilomyces fumosoroseus, Trichoderma harzianum, Verticillium lecanii, lsarfofumosarosea Lecanicillium muscarium, Streptomyces microflavus, Muscodor albus,*
  x. one or more nematodal microbial species and strains selected from the group consisting of: *Myrothecium verrucaria, Pasteuria* species, *Pasteuria Metarhizium* species, *Flavobacterium* species and
  y. one or more antifungal, antimicrobial and/or plant growth promoting microbial species and strains selected from a group consisting of: *Gliocladium* species, *Pseudomonas* species (e.g. *Pseudomonas fluorescens, Pseudomonas fluorescens. putida* and *P. chlororaphis*), *Pseudomonasfluorescens* VP5, *Pseudomonas diazotrophicus, Enterobacter cloacae, Trichoderma* species, *Trichoderma virens, Trichoderma atroviride* strains, *Coniothyrium minitans, Gliocladium* species, *Gliacladium virens, Gliacladium roseum, Trichoderma harzianum* species.

2) and one or more biologically active agents selected from the group consisting of:
  a. one or more urease inhibitors selected from the group consisting of a) aliphatic phosphoric triamide, b) phosphoramides, c) N-alkyl thiophosphoric triamides, d) N-(n-butyl) thiophosphoric Triamide, e) one or more (aminomethyl)phosphinic acids and their salts selected by the formula structure:

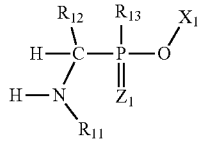

wherein:
  $R_{11}$ is selected from one or more of the group consisting of H, $CH_3$, $C_2H_5$, $C_3H_7$, $C_4H_9$, $C_5H_{11}$, $C_6H_{13}$, $C_7H_{15}$ and $C_8H_{17}$,
  $R_{12}$ is selected from one or more of the group consisting of H, $CH_3$, $C_2H_5$, $C_3H_7$, $C_4H_9$, $C_5H_{11}$ and $C_6H_{13}$,
  $R_{13}$ is selected from one or more of the group consisting of H, O—$X_3$, $CH_3$, $C_2H_5$, $C_3H_7$, $C_4H_9$, $C_5H_{11}$, $C_6H_{13}$, $C_7H_{15}$, $C_8H_{17}$, $OCH_3$, $OC_2H_5$, $OC_3H_7$, $OC_4H_9$, $OC_5H_{11}$, $OC_6H_{13}$, $OC_7H_{15}$ and $OC_8H_{17}$
  wherein
    (1) $X_3$ is selected from one or more of the group consisting of selected from the group consisting of:
      (a) H, Na, Li and K,
      (b) $NH_4$
      (c) one or more organoamines selected from the group consisting of mono $C_{1-6}$ amine, di $C_{1-6}$ amine, tri $C_{1-6}$ amine, mono ethanol amine, diethanol amine, triethanol amine, monoisopropanol amine, diisopropanol amine, triisopropanol amine, ethylene diamine, diethylene triamine, triethylene tetraamine, and tetraethylene pentamine.

$X_1$ is selected from one or more of the group consisting of
  (a) H, Na, Li and K,
  (b) $NH_4$
  (c) one or more organoamines selected from the group consisting of mono $C_{1-6}$ amine, di $C_{1-6}$ amine, tri $C_{1-6}$ amine, mono ethanol amine, diethanol amine, triethanol amine, monoisopropanol amine, diisopropanol amine, triisopropanol amine, ethylene diamine, diethylene triamine, triethylene tetraamine, and tetraethylene pentamine.

$Z_1$ is selected from one or more of the group consisting of Oxygen and Sulfur.

and f) one or more bis-(aminomethyl)phosphinic acids and their salts selected from the formula structure:

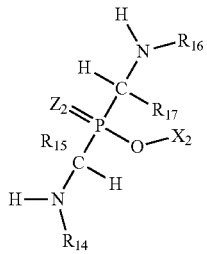

wherein:
  $R_{14}$ is selected from one or more of the group consisting of H, $CH_3$, $C_2H_5$, $C_3H_7$, $C_4H_9$, $C_5H_{11}$, $C_6H_{13}$, $C_7H_{15}$ and $C_8H_{17}$
  $R_{15}$ is selected from one or more of the group consisting of H, $CH_3$, $C_2H_5$, $C_3H_7$, $C_4H_9$, $C_5H_{11}$ and $C_6H_{13}$
  $R_{16}$ is selected from one or more of the group consisting of H, $CH_3$, $C_2H_5$, $C_3H_7$, $C_4H_9$, $C_5H_{11}$, $C_6H_{13}$, $C_7H_{15}$ and $C_8H_{17}$
  $R_{17}$ is selected from one or more of the group consisting of H, $CH_3$, $C_2H_5$, $C_3H_7$, $C_4H_9$, $C_5H_{11}$ and $C_6H_{13}$
    (1) $X_2$ is selected from one or more of the group consisting of
      (a) H, Na, Li and K,
      (b) $NH_4$
      (c) one or more organoamines selected from the group consisting of mono $C_{1-6}$ amine, di $C_{1-6}$ amine, tri $C_{1-6}$,
b. one or more nitrification inhibitors selected from the group consisting of 2-chloro-6-trichloromethyl)pyridine, 4-amino-1,2,4,6-triazole-HCl, 2,4-diamino-6-trichloromethyltriazine CL-1580, dicyandiamide (DCD), thiourea, 1-mercapto-1,2,4-triazole, ammonium thiosulfate, dimethylpyrazole organic and inorganic salts, and 2-amino-4-chloro-6-methylpyrimidine,
c. one or more fungicides such as but not limited to azoystrobin, *bacillus* lichenformis, boscalid, captan, chloroneb, chlorothalonil, ethazole (etridiazole), fenarimol, fludioxonil, flutolanil, fosetyl-aluminum, iprodione, mancozeb, mefenoxam, myclobutanil, potassium phosphite, polyoxin D, propamocarb, propiconazole, pyraclostrobin, tebuconazole, thiophanate-methyl, thiram, triadimefon, trifloxystrobin, vinclozolin,
d. one or more herbicides such as but not limited to 2,4-D, 2,4-DB, acetochlor, aciflumfen, alachlor, ametryn, atrazine, aminopyralid, benefin, bensulfuron, bensulide, bentazon, bromacil, bromoxynil, butylate, carfentrazone, chlorimuron, chlorsulfuron, clethodim, clomazone, clopyralid, cloransulam, cycloate, DCPA, desmedipham, dicamba, dichlobenil, diclofop, diclosulam, diflufenzopyr, dimethenamid, diquat, diuron, DSMA, endothall, EPTC, ethalfluralin, ethofumesate, fenoxaprop, fluazifop-P, flucarbazone, flufenacet, flumetsulam, flumiclorac, flumioxazin, fluometuron, fluroxypyr, fomesafen, foramsulfuron, glufosinate, glyphosate, halosulfuron, hexazinone, imazamethabenz, imazamox, imazapic, imazaquin, imazethapyr, isoxaben, isoxaflutole, lactofen, linuron, MCPA, MCPB, mesotrione, metolachlor-s, metribuzin, metsulfuron, molinate, MSMA, napropamide, naptalam, nicosulfuron, norflurazon, oryzalin, oxadiazon, oxyfluorfen, paraquat, pelargonic acid, pendimethalin, phenmedipham, picloram, primisulfuron, prodiamine, prometryn, pronamide, propanil, prosulfuron, pyrazon, pyrithiobac, quinclorac, quizalofop, rimsulfuron, sethoxydim, siduron, simazine, sulfentrazone, sulfometuron, sulfosulfuron, tebuthiuron, terbacil, thiazopyr, thifensulfuron, thiobencarb, tralkoxydim, triallate, triasulfuron, tribenuron, triclopyr, trifluralin, triflusulfuron,
e. and one or more insecticides such as but not limited to bifenthrin, cypermethrin, permethrin, piperonyl butoxide, lambda-cyhalothrin, (s)-methoprene, deltamethrin, permethrin, esfenvalerate, pyriproxyfen, fipronil, etofenprox, cyphenothrin, carbofuran, chlorpoyrifos, disulfoton, fenvalerate, ethoprop, fonofos, malathion, permethrin, phorate, tefluthrin, terbufos, trimethacarb, allicin, anabasine, azadirachtin, carvacrol, d-limonene, matrine, nicotine, nornicotine, oxymatrine, pyrethrins, cinerins, jasmolin, quassia, rhodojaponin, rotenone, ryania, sabadilla, sanguinarine, triptolide, carbamate insecticides, benzofuranyl methylcarbamate insecticides, dimethylcarbamate insecticides, oxime carbamate insecticides, phenyl methylcarbamate insecticides, dinosam, DNOC, fluorine insecticides, formamidine insecticides, amitraz, chlordimeform, formetanate, formparanate, medimeform, semiamitraz.

In a variation, the composition of a mobile liquid fertilizer for application to soil comprises water, one or more nitrogen sources selected from the group consisting of a) urea, b) modified urea, c) treated urea, d) treated modified urea, e) ammonium nitrate and f) ammonium sulfate, said liquid formulation wherein the liquid formulation comprises said NOSDS and said OPCF resulting in an even distribution of the micronutrients throughout the aqueous dispersion ensuring a more even distribution on the soil.

In a variation the said liquid formulation, bio-actives and NOSDS can be combined as a liquid nitrogen source additive wherein the liquid nitrogen source is an aqueous dispersion, wherein the additive's composition weight comprises 5-40% of said OPCFs, 5-25% of said bio-active agents and/or slow release/hydrophobizing bio-actives and 35-90% of said NOSDS.

In an embodiment, a composition of a granular or prilled treated nitrogen source for application to the soil comprises urea and/or modified urea, said liquid formulation wherein the liquid formulation comprises said NOSDS and said OPCF wherein the liquid formulation is coated onto the surface of the nitrogen source. In a variation, not being bound by theory, said granular and/or prilled treated nitrogen source for application to the soil results in depositing the OPCFs onto the soil imparting benefits of:
- moisture control,
- freeing up macronutrients and micronutrients bound in the soil as insoluble salts and complexes in a plant available form,
- providing chelated micronutrients to plants,
- providing additional nitrification inhibition properties though chelates and complexes with micronutrient,
- providing the micronutrient sulfur if the NOSDS comprises a sulfoxide or a sulfone.

In a further embodiment, a composition of a granular or prilled treated nitrogen source for application to the soil comprises urea and/or modified urea, said liquid solution wherein the liquid solution comprises said NOSDS and said OPCFs and one or more bio-active agents are selected from the group consisting of:

1) one or more biologics selected from the group consisting of
   a. one or more *Bacillus* biologics selected from the group consisting of
      i. *Bacillus mucilaginosas*
      ii. *Bacillus Subtilus*
      iii. *Lactobacillus acidophilus*
      iv. *Bacillus amylofliquifaciens*
      v. *Bacillus itcheniformis*
      vi. *Bacillus megaterium*
      vii. *Bacillus pumilus*
      viii. *Bacillus megaterium*
      ix. *Bacillus pumilus*
      x. *Bacillus circulans*
      xi. *Bacillus globisporus*
      xii. *Bacillus firmus*
      xiii. *Bacillus thuringiensis galleriae*
      xiv. *Bacillus thuringiensis kurstaki*
      xv. *Bacillus cereus*
      xvi. *Bacillus globisporus*
      xvii. *Bacillus amyloliquefaciens*
      xviii. *Bacillus thuringiensis galleriae*
      xix. *Bacillus thuringiensis kurstaki*
      xx. *Bacillus mycoide* isolate
      xxi. *Bacillus aryabhattai*
      xxii. *B. flexus*
      xxiii. *B. nealsonii*
      xxiv. *Bacillus sphaericus*
      xxv. *B. vallismortis*
   b. *Rhizobium*
   c. *Bradyrhizobium* species
   d. *Bradyrhizobium japonicum*
   e. *Rhizobium meliloti*
   f. One or more *Azospirillum* biologics selected from the group consisting of
      i. *Azospirillum lipoferum*
      ii. *Azospirillum brasilense*
      iii. *Azospirillum amazonense*
      iv. *Azospirillum halopreaferens*
      v. *Azospirillum irankense*
   g. One or more *Azobacter* and *Gluconacetobacter* biologics selected from the group consisting of
      i. *Azotobacter agilis*
      ii. *Azotobacter armeniacus*
      iii. *Azotobacter sp. AR*
      iv. *Azotobacter beijerinckii*
      v. *Azotobacter chroococcum*
      vi. *Azotobacter sp. DCU26*
      vii. *Azotobacter sp. FA8*
      viii. *Azotobacter nigricans*
      ix. *Azotobacter paspali*
      x. *Azotobacter salinestris*
      xi. *Azotobacter tropicalis*
      xii. *Azotobacter vinelandii*
   h. *Phosphobacteria*
   i. *Cyanobacteria*
   j. *Herbaspirillum*
   k. *Burkholderia,*
   l. *Pseudomonas*
   m. *Gluconacetobacter*
   n. *Enterobacter*
   o. *Klebsiella*
   p. *Burkholderia*
   q. *Laccaria bicolor*
   r. *Glomus imraradices timanita*
   s. *Actinomyces*
   t. *Penicillium*
   u. *Mesorhizobiwn cicero*
   v. *Reynoutria sachalinensis*
   w. One or more insecticidal or insect repellent microbial species and strains selected from the group consisting of: *Telenomus podisi, Baculovirus anticarsia, Trichogramma pretiosum, Trichogramma gallai, Chromobacterium subtsugae, Trichoderma fertile, Beauveria bassiana, Beauveria bassiana, Beauveria bassiana, Paecilomyces fumosoroseus, Trichoderma harzianum, Verticillium lecanii, lsarfofumosarosea Lecanicillium muscarium, Streptomyces microflavus, Muscodor albus,*
   x. one or more nematodal microbial species and strains selected from the group consisting of: *Myrothecium verrucaria, Pasteuria* species, *Pasteuria Metarhizium* species, *Flavobacterium* species and
   y. one or more antifungal, antimicrobial and/or plant growth promoting microbial species and strains selected from a group consisting of: *Gliocladium* species, *Pseudomonas* species (e.g. *Pseudomonas fluorescens, Pseudomonas fluorescens. putida* and *P. chlororaphis*), *Pseudomonasfluorescens* VP5, *Pseudomonas diazotrophicus, Enterobacter cloacae, Trichoderma* species, *Trichoderma virens, Trichoderma atroviride* strains, *Coniothyrium minitans, Gliocladium* species, *Gliacladium virens, Gliacladium roseum, Trichoderma harzianum* species.

2) and one or more biologically active agents selected from the group consisting of:
   a. one or more urease inhibitors selected from the group consisting of a) aliphatic phosphoric triamide, b) phosphoramides, c) N-alkyl thiophosphoric triamides, d) N-(n-butyl) thiophosphoric Triamide, e) one or more (aminomethyl)phosphinic acids and their salts selected by the formula structure:

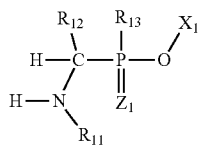

wherein:
   $R_{11}$ is selected from one or more of the group consisting of H, $CH_3$, $C_2H_5$, $C_3H_7$, $C_4H_9$, $C_5H_{11}$, $C_6H_{13}$, $C_7H_{15}$ and $C_8H_{17}$, R<sub>12</sub> is selected from one or more of the group consisting of H, CH$_3$, C$_2$H$_5$, C$_3$H$_7$, C$_4$H$_9$, C$_5$H$_{11}$ and C$_6$H$_{13}$, R<sub>13</sub> is selected from one or more of the group consisting of H, O—X$_3$, CH$_3$, C$_2$H$_5$, C$_3$H$_7$, C$_4$H$_9$, C$_5$H$_{11}$, C$_6$H$_{13}$, C$_7$H$_{15}$, C$_8$H$_{17}$, OCH$_3$, OC$_2$H$_5$, OC$_3$H$_7$, OC$_4$H$_9$, OC$_5$H$_{11}$, OC$_6$H$_{13}$, OC$_7$H$_{15}$ and OC$_8$H$_{17}$ wherein
(1) X$_3$ is selected from one or more of the group consisting of selected from the group consisting of:
  (a) H, Na, Li and K,
  (b) NH$_4$
  (c) one or more organoamines selected from the group consisting of mono C$_{1-6}$ amine, di C$_{1-6}$ amine, tri C$_{1-6}$ amine, mono ethanol amine, diethanol amine, triethanol amine, monoisopropanol amine, diisopropanol amine, triisopropanol amine, ethylene diamine, diethylene triamine, triethylene tetraamine, and tetraethylene pentamine.

X$_1$ is selected from one or more of the group consisting of
  (a) H, Na, Li and K,
  (b) NH$_4$
  (c) one or more organoamines selected from the group consisting of mono C$_{1-6}$ amine, di C$_{1-6}$ amine, tri C$_{1-6}$ amine, mono ethanol amine, diethanol amine, triethanol amine, monoisopropanol amine, diisopropanol amine, triisopropanol amine, ethylene diamine, diethylene triamine, triethylene tetraamine, and tetraethylene pentamine.

Z$_1$ is selected from one or more of the group consisting of Oxygen and Sulfur.

and f) one or more bis-(aminomethyl)phosphinic acids and their salts selected from the formula structure:

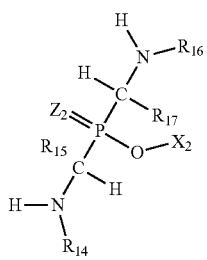

wherein:
R<sub>14</sub> is selected from one or more of the group consisting of H, CH$_3$, C$_2$H$_5$, C$_3$H$_7$, C$_4$H$_9$, C$_5$H$_{11}$, C$_6$H$_{13}$, C$_7$H$_{15}$ and C$_8$H$_{17}$ R<sub>15</sub> is selected from one or more of the group consisting of H, CH$_3$, C$_2$H$_5$, C$_3$H$_7$, C$_4$H$_9$, C$_5$H$_{11}$ and C$_6$H$_{13}$ R<sub>16</sub> is selected from one or more of the group consisting of H, CH$_3$, C$_2$H$_5$, C$_3$H$_7$, C$_4$H$_9$, C$_5$H$_{11}$, C$_6$H$_{13}$, C$_7$H$_{15}$ and C$_8$H$_{17}$ R<sub>17</sub> is selected from one or more of the group consisting of H, CH$_3$, C$_2$H$_5$, C$_3$H$_7$, C$_4$H$_9$, C$_5$H$_{11}$ and C$_6$H$_{13}$ X$_2$ is selected from one or more of the group consisting of
  (a) H, Na, Li and K,
  (b) NH$_4$
  (c) one or more organoamines selected from the group consisting of mono C$_{1-6}$ amine, di C$_{1-6}$ amine, tri C$_{1-6}$,
b. one or more nitrification inhibitors selected from the group consisting of 2-chloro-6-trichloromethyl)pyridine, 4-amino-1,2,4,6-triazole-HCl, 2,4-diamino-6-trichloromethyltriazine CL-1580, dicyandiamide (DCD), thiourea, 1-mercapto-1,2,4-triazole, ammonium thiosulfate, dimethylpyrazole organic and inorganic salts, and 2-amino-4-chloro-6-methylpyrimidine,
c. one or more fungicides such as but not limited to azoxystrobin, *bacillus* lichenformis, boscalid, captan, chloroneb, chlorothalonil, ethazole (etridiazole), fenarimol, fludioxonil, flutolanil, fosetyl-aluminum, iprodione, mancozeb, mefenoxam, myclobutanil, potassium phosphite, polyoxin D, propamocarb, propiconazole, pyraclostrobin, tebuconazole, thiophanate-methyl, thiram, triadimefon, trifloxystrobin, vinclozolin,
d. one or more herbicides such as but not limited to 2,4-D, 2,4-DB, acetochlor, aciflumfen, alachlor, ametryn, atrazine, aminopyralid, benefin, bensulfuron, bensulide, bentazon, bromacil, bromoxynil, butylate, carfentrazone, chlorimuron, chlorsulfuron, clethodim, clomazone, clopyralid, cloransulam, cycloate, DCPA, desmedipham, dicamba, dichlobenil, diclofop, diclosulam, diflufenzopyr, dimethenamid, diquat, diuron, DSMA, endothall, EPTC, ethalfluralin, ethofumesate, fenoxaprop, fluazifop-P, flucarbazone, flufenacet, flumetsulam, flumiclorac, flumioxazin, fluometuron, fluroxypyr, fomesafen, foramsulfuron, glufosinate, glyphosate, halosulfuron, hexazinone, imazamethabenz, imazamox, imazapic, imazaquin, imazethapyr, isoxaben, isoxaflutole, lactofen, linuron, MCPA, MCPB, mesotrione, metolachlor-s, metribuzin, metsulfuron, molinate, MSMA, napropamide, naptalam, nicosulfuron, norflurazon, oryzalin, oxadiazon, oxyfluorfen, paraquat, pelargonic acid, pendimethalin, phenmedipham, picloram, primisulfuron, prodiamine, prometryn, pronamide, propanil, prosulfuron, pyrazon, pyrithiobac, quinclorac, quizalofop, rimsulfuron, sethoxydim, siduron, simazine, sulfentrazone, sulfometuron, sulfosulfuron, tebuthiuron, terbacil, thiazopyr, thifensulfuron, thiobencarb, tralkoxydim, triallate, triasulfuron, tribenuron, triclopyr, trifluralin, triflusulfuron,
e. and one or more insecticides such as but not limited to bifenthrin, cypermethrin, permethrin, piperonyl butoxide, lambda-cyhalothrin, (s)-methoprene, deltamethrin, permethrin, esfenvalerate, pyriproxyfen, fipronil, etofenprox, cyphenothrin, carbofuran, chlorpoyrifos, disulfoton, fenvalerate, ethoprop, fonofos, malathion, permethrin, phorate, tefluthrin, terbufos, trimethacarb, allicin, anabasine, azadirachtin, carvacrol, d-limonene, matrine, nicotine, nornicotine, oxymatrine, pyrethrins, cinerins, jasmolin, quassia, rhodojaponin, rotenone, ryania, sabadilla, sanguinarine, triptolide, carbamate insecticides, benzofuranyl methylcarbamate insecticides, dimethylcarbamate insecticides, oxime carbamate insecticides, phenyl methylcarbamate insecticides, dinosam, DNOC, fluorine insecticides, formamidine insecticides, amitraz, chlordimeform, formetanate, formparanate, medimeform, semiamitraz wherein the liquid solution plus the one or more bio-actives is coated onto the surface of the nitrogen source.

In a variation, a composition of a granular or prilled treated nitrogen source for application to the soil comprises urea and/or modified urea and said liquid solution wherein the liquid solution comprises said NOSDS and said OPCF wherein the liquid solution is coated onto the surface of the nitrogen source ensuring a more even distribution on the soil.

In an embodiment, a composition of a granular or prilled treated nitrogen source for application to the soil comprises the composition weight of 95-99.95% urea and/or modified urea and 0.05-5% of said liquid formulation or alternatively 96-99.9% of urea and/or modified urea and 0.1-4% of said liquid formulation or alternatively 97-99.8% of urea and/or modified urea and 0.2-3% of said liquid formulation or alternatively 98-99.7% of urea and/or modified urea and 0.3-2% of said liquid formulation or alternatively 99-99.5% of urea and/or modified urea and 0.5-1% of said liquid formulation wherein said liquid formulation comprises 99-20% of said NOSDS and 1-80% of said OPCF or alternatively 80-30% of said NOSDS and 20-70% of said OPCF or alternatively 70-40% of said NOSDS and 30-60% of said OPCF or alternatively 60-50% of said NOSDS and 40-50% of said OPCF. In a variation, a composition of a granular or prilled treated nitrogen source for application to the soil comprises the composition weight of 95-99.9% urea and/or modified urea and 0.1-5% of said liquid formulation wherein the liquid formulation comprises 99-30% of said NOSDS and 1-70% of said OPCF or alternatively 80-30% of said NOSDS and 20-70% of said OPCF or alternatively 70-40% of said NOSDS and 30-60% of said OPCF or alternatively 60-50% of said NOSDS and 40-50% of said OPCF, 0.1-5% one or more of said bio-active agents and/or slow release/hydrophobizing bio-actives and 4.4-15% of said NOSDS. In a variation the said liquid formulation, bio-actives and NOSDS can be combined as a coating for urea and/or modified urea wherein the additive's composition weight comprises 5-40% of said OPCFs, 5-25% of said bio-active agents and/or slow release/hydrophobizing bio-actives and 35-90% of said NOSDS.

In an embodiment, a composition of a granular or prilled treated nitrogen source for application to the soil comprises urea and/or modified urea, said liquid formulation wherein the liquid solution comprises said NOSDS and said OPCF may further comprise non-nitrogen source fertilizer components such as but not limited to diammonium phosphate, monoammonium phosphate lime, potash and one or more micronutrient inorganic salts wherein the salts' cations are one or more micronutrients selected from the group consisting of Mg, Ca, Fe, Zn, Mn, Cu, Co, Mo and Ni wherein the liquid solution is coated onto the surfaces of all components of a fertilizer.

In an embodiment, a composition of a treated natural nitrogen source comprises manure and said liquid solution wherein the liquid solution comprises said NOSDS and said OPCF wherein the liquid solution is sprayed onto the surface of the manure. In a variation, the composition further comprises one or more bioactive agents selected from the group consisting of 2-chloro-6-trichloromethyl)pyridine, 4-amino-1,2,4,6-triazole-HCl, 2,4-diamino-6-trichloromethyltriazine CL-1580, dicyandiamide (DCD), thiourea, 1-mercapto-1,2,4-triazole, ammonium thiosulfate, dimethylpyrazole organic and inorganic salts, and 2-amino-4-chloro-6-methylpyrimidine.

The following Examples are presented to illustrate certain embodiments of the present invention:

Example 1

400 grams of ethylene glycol were charged to a vessel, placed under strong agitation and then heated to 60° C. 222.2 grams of polyaspartate-potassium salt/90% NVS were then slowly charged to the vessel and mixed until completely dissolved. Once dissolved, the mixture was placed under high shear agitation by using an overhead mixer equipped with a cowles blade while maintaining the batch temperature at 60-80° C. for 1 hour. After one hour the vessel was sealed and a vacuum of 200 mm or less was pulled to remove water. The mixture was cooled to <30° C. and then packaged off in an appropriate container.

Example 2

120 grams of Example 1 were heated to 60° C., placed under agitation and then 80 grams of propylene glycol were charged to the vessel. The combination was mixed for 30 minutes and then cooled to <40° C. and packaged off.

Example 3

120 grams of Example 1 were heated to 60° C., placed under agitation and then 80 grams of glycerin were charged to the vessel. The combination was mixed for 30 minutes and then cooled to <40° C. and packaged off.

Example 4

120 grams of Example 1 were heated to 60° C., placed under agitation and then 40 grams of ethylene glycol and 40 grams of tripropylene glycol monomethyl ether were charged to the vessel. The combination was mixed for 30 minutes and then cooled to <40° C. and packaged off.

Example 5

450 grams of ethylene glycol were charged to a vessel, placed under strong agitation and then heated to 60° C. 300 grams of a polysuccinimide (5000 average molecular weight) were then slowly charged to the vessel and mixed until completely dispersed. The mixture was then heated to 140° C. and held until all particles dissolved (~1.5 hrs). The mix was then cooled to 50° C. 147 grams of KOH flakes were slowly charged to the mix at a rate to maintain temperature of 60-80° C. The formulation was mixed until all KOH flakes (100%) were dissolved. The mix was then cooled to 40° C. and then placed under high shear agitation by using an overhead mixer equipped with a cowles blade while maintaining the batch temperature at 60-80° C. for 1 hour. After one hour, an FTIR scan was run to determine if the presence of ester had been eliminated. The mixture was sampled every 30 minutes until traces of esters had been eliminated. The mixture was cooled to <30° C. and then packaged off in an appropriate container.

Example 6

58.54 grams of Example 5 were charged to a vessel and then placed under strong agitation and then heated to 60° C. 65.4 grams of ethylene glycol were then charged to the vessel and mixed for 30 minutes. After 30 minutes, the mixture was cooled to 38° C. and then packaged off in an appropriate container.

Example 7

58.54 grams of Example 5 were charged to a vessel and then placed under strong agitation and then heated to 60° C. 35.4 grams of ethylene glycol and 30 grams of dimethyl glutarate were then charged to the vessel and mixed for 30 minutes. After 30 minutes, the mixture was cooled to 38° C. and then packaged off in an appropriate container.

Example 8

58.54 grams of Example 5 were charged to a vessel and then placed under strong agitation and then heated to 60° C. 65.4 grams of glycerin were then charged to the vessel and mixed for 30 minutes. After 30 minutes, the mixture was cooled to 38° C. and then packaged off in an appropriate container.

Example 9

104.3 grams of Example 5 were charged to a vessel and then placed under strong agitation and then heated to 60° C. 45.7 grams of ethylene glycol were then charged to the vessel and mixed for 30 minutes. After 30 minutes, the mixture was cooled to 38° C. and then packaged off in an appropriate container.

Example 10

183.12 grams of dimethyl sulfoxide were charged to a vessel, placed under strong agitation and then heated to 60° C. 78.48 grams of a polysuccinimide (5000 average molecular weight) were then slowly charged to the vessel and mixed until completely dispersed. 72.74 grams of DI water were charged to the vessel and then 49.07 grams of NH$_4$OH/28% were slowly charged holding the mixture's temperature at 60-80° C. It was mixed for one hour and then placed under a vacuum of 50 mm with a slight N$_2$ sparge until distillation ceases. The mix was then cooled to 40° C. and then packaged off in an appropriate container.

Example 11

282.52 grams of dimethyl sulfoxide were charged to a vessel, placed under strong agitation and then heated to 60° C. 146.23 grams of a partial sodium hydroxide neutralized polyacrylic acid (Kemira 5847) were then charged to the vessel and mixed for 15 minutes. A vacuum of 38 mm was applied until distillation ceases. The mix was then cooled to 40° C. and then packaged off in an appropriate container.

Example 12

150 grams of ethylene glycol, 150 grams of L-aspartic acid and 1.5 grams of phosphoric acid/85% were charged to a vessel, then placed under strong agitation and then heated to 185° C. After 5 hrs, 64.3 grams of distillate were collected and the batch was cooled to 60° C. 97.44 grams KOH flake (100%) were then slowly charged to the vessel at a rate that allowed the batch temperature to be 60-80° C. and mixed until completely dissolved. It was then placed under high shear agitation by using an overhead mixer equipped with a cowles blade while maintaining the batch temperature at 60-80° C. for 1 hour. After one hour, an FTIR scan was run to determine if the presence of ester had been eliminated. The mixture was sampled every 30 minutes until traces of esters had been eliminated. After the ester peak was eliminated, 281.08 grams of ethylene glycol were charged and the resulting mixture was mixed for 30 minutes. The mix was then cooled to 40° C. and then packaged off in an appropriate container.

Example 13

71.58 grams of acetone were charged to a vessel and then 12.48 grams of maleic anhydride and 16.49 grams itaconic anhydride and 0.98 grams of benzoyl peroxide were charged to the vessel. Very slow agitation was used until the maleic briquettes were dissolved. The vessel was then sealed and inserted with N$_2$ and the batch was heated to 60° C. and held at 55-65° C. for five hours. After five hours, the batch was cooled to 35° C. and 43.45 grams of ethylene glycol were charged. A vacuum was then pulled on the vessel slowly decreasing the pressure based on the distillation rate while heating the batch back to 55-65° C. When distillation ceases, the vacuum was broken with N$_2$ and then 15.39 grams of KOH flake (100%) were slowly charged in order to hold temperature at 60-80° C. When KOH flakes were completely dissolved, the mix was placed under high shear agitation by using an overhead mixer equipped with a cowles blade while maintaining the batch temperature at 60-80° C. for 1 hour. Thereafter the mix was checked using an FTIR scan. The FTIR scan was run and checked every 30 minutes for the disappearance of the ester peak. After the ester peak disappeared, 89.63 grams of ethylene glycol were charged, and the batch was then mixed 30 minutes and cooled to <40° C. and then off-loaded into the appropriate container.

Example 14

45 grams of Example 12 were mixed with 10 grams of N-Yield (a urease inhibitor in a non-aqueous liquid), 40 grams of N-Bound (a nitrification inhibitor in a non-aqueous liquid) and 5 grams of glycerin. The resulting fluid product was then off-loaded into the appropriate container.

Example 15

99.5 grams of DMSO, 99.5 grams of L-aspartic acid and 1.0 grams of phosphoric acid/85% were charged to a vessel, then placed under strong agitation and then heated to 155° C. After 4.5 hrs. 28.49 grams of distillate were collected and the batch was cooled to 80° C. 85.09 grams NH$_4$OH (28%) was then slowly charged to the vessel at a rate that allowed the batch temperature to be 60-80° C. over a 5 hour period. The reactor was sealed and heated to 95 C and held for 17 hrs and then checked by IR to insure the ester was eliminated. 352.88 gms of DMSO were charged and then heated back to 80 C. 68.07 gms of DCD were charge and mixed until particles dissolved. The batch was cooled to 35 C and then 17.02 NBPT were charged and mixed until particles dissolved. 51.05 gms of propylene glycol were charged and mix 15 minutes. The mixture was then package and 50 gms placed in a 50 C oven for 3 days. After 3 days at 50 C, the product showed no signs of instability.

Example 16

43.57 grams of polysuccinimide (molecular weight 3000-5000), 119.12 grams of ethylene glycol were charged to a reactor, placed under agitation and heated to 140° C. until all particles were solubilized. 2.41 grams of zinc oxide were charged while holding temperature at 120° C. until appearance of mixture transitioned from milky to translucent. The reactor was then cooled to 40 C and 19.19 of KOH/45% were slowed charged while holding the temperature less than 80° C. The product was then cooled to <40° C. and packaged off.

Example 17

250 grams of ethylene glycol, 250 grams of L-aspartic acid and 2.94 grams of phosphoric acid/85% were charged to a vessel, then placed under strong agitation and then heated to 150° C. After 5 hours no particles were observed and 67.6 grams of distillate were collected. The batch was cooled to 120° C. and 23.67 grams of magnesium oxide were slowly charged and dispersed with 15 minutes if agitation. 10.57 grams of distilled water were then charged to the vessel and the contents were agitated until contents cleared in approximately 5.5 hours. The contents of the vessel were then cooled to 60° C., 103.21 grams KOH flake (100%) were then slowly charged to the vessel at a rate that allowed the batch temperature to be maintained at 60-80° C. and mixed until completely dissolved. It was then mixed an additional hour. After one hour, an FTIR scan was run to determine if the presence of ester had been eliminated. The mixture was sampled every 30 minutes until traces of esters had been eliminated. After the ester peak was eliminated, the batch was cooled to 40° C. and then placed under high shear agitation by using rotor stator mixer while maintaining the batch temperature at less than 80° C. by using an ice bath and by slowly increasing the RPM's of the mixer to 10,000 over a 1 hour time period. After the high shear mixing, 233.66 grams of ethylene glycol were charged and the resulting mixture was mixed for 30 minutes. The mix was cooled to <40° C. and then packaged off in an appropriate container.

Example 18

128.46 grams of ethylene glycol, 62.06 grams of L-aspartic acid and 0.99 grams of phosphoric acid/85% were charged to a vessel, then placed under strong agitation and heated to 150° C. After 5 hours no particles were observed and 16.22 grams of distillate were collected. The batch was cooled to 120° C. and 7.67 grams of zinc oxide were slowly charged and dispersed with 15 minutes if agitation. 1.70 grams of distilled water were then charged to the vessel and the contents were agitated until the contents cleared in approximately 8.5 hours. The contents of the vessel were then cooled to 60° C., 14.27 grams KOH flake (100%) were then slowly charged to the vessel at a rate that allowed the batch temperature to be maintained at 60-80° C. and mixed until completely dissolved. It was then mixed an additional hour. After one hour, an FTIR scan was run to determine if the presence of ester had been eliminated. The mixture was sampled every 30 minutes until traces of esters had been eliminated. After the ester peak was eliminated, the batch was then cooled to <40° C. and then packaged off in an appropriate container.

Example 19

333.9 grams of DMSO were charged to a reactor, placed under agitation and then 477 grams of sorbitol/70% were charged to the reactor. The mixture was then heated to 75° C. and placed under 20 mm of vacuum to strip out residual water. Once the formation of distillate ceased, the mixture was cooled to 40° C. and 611.59 grams of DMSO/sorbitol were recovered. In a mixing vessel, 71.3 grams of Example #5 were charged followed by 31.1 grams of the DMSO/sorbitol mixture and 31.1 grams of DMSO. The combination was mixed for 15 minutes and then 16.5 grams of KOH flakes were slowly charged holding the temperature below 80° C. The product was cooled below 40° C. and packaged.

Example 20

In a reactor, 122.24 grams of L-aspartic acid and 76.77 grams of propylene glycol were charged, placed under agitation and heated to 170° C. It was held at 17° C. until all particles disappeared. 199.04 grams of PG and 14.92 grams of zinc oxide were charged to the reactor while maintaining the batch temperature at 120-160° C. After batch appearance transitioned from milky to translucent, the batch was cooled to 40° C. and 61.81 grams of KOH/45% were slowly charged to reactor while maintaining the batch temperature below 80° C. The product was mixed 14 hours at 80° C. to saponify all ester linkages. The batch was then cooled to less than 40° C. and packaged

Example 21

In a reactor, charge 450.77 grams glycerin and 300 grams polysuccinimide (3000-5000 molecular weight) and heat to 140° C. and hold until all particles have reacted/dissolved. Cool to 40° C.

Example 22

In a mixing vessel under agitation, 48.8 grams of Example 21 and 28.6 grams of glycerin were charged. Then 22.6 grams of KOH/45% were slowly charged holding temp less than 80° C. during charge. After charging KOH, hold at 80° C. until ester linkages have been saponified. Cool to less than 40° C. and package off.

Example 23

In a mixing vessel under agitation, charge 48.8 grams of Example 22 and 28.6 grams of propylene glycol. Slowly charge 22.6 grams of KOH/45% holding temp less than 80° C. during charge. After charging KOH, hold at 80° C. until ester linkages have been saponified. Cool to less than 40° C. and package off.

Example 24

60.55 grams of ethylene glycol, 130.01 grams of L-aspartic acid (ethylene glycol/aspartic acid molar ratio of 1:1 and a weight ratio of 32% to 68%) and 0.95 grams of phosphoric acid/85% were charged to a vessel, then placed under very low agitation and then slowly heated to 170° C. over a period of five hours. The rate of temperature rise was dependent on ability to increase agitation speed as high as product solids and viscosity would allow so as to not allow the product to burn. After 5 hours no particles were observed and 37.33 grams of distillate were collected. 279.42 grams of ethylene glycol were charged and the batch was cooled to 60° C. 49.82 grams KOH flake (100%) were then slowly charged to the vessel at a rate that allowed the batch temperature to be maintained at 60-80° C. and mixed until completely dissolved. It was then mixed and heated to 80 C and held an additional hour. The mix was cooled to <40° C. and then packaged off in an appropriate container.

Example 25

48.4 grams of ethylene glycol were charge to a reactor, placed under agitation and a nitrogen sparge and heated to 90° C. 113.7 grams of a polysuccinimide (molecular weight 3000-5000) were slowly added to the reactor while increasing the agitation as needed and holding the temperature between 80 and 100° C. The very viscous product was then heated to 120° C. and 37.9 grams of addition polysuccinimide (molecular weight 3000-5000) were slowly charged to the reactor raising the molar ratio of PSI to Ethylene Glycol to 1:0.5 and the weight ratio 75.8% to 24.2%. The agitation was increased as product viscosity allowed. After 30 minutes the batch temperature was increased to 150° C. After 60 minutes at 150° C., all particles were dissolved. 384.48 grams of ethylene glycol were charged and the batch was cooled to 60 C. 63.46 grams of KOH (100%) were slowly charged to the reactor while maintaining the batch temperature 60-80° C. utilizing a cooling bath to assist in removing the heat from the exothermic neutralization. After all the KOH had been charged and was dissolved, the batch temperature was held at 80° C. under strong agitation for 3 hours. The batch was then cooled to <40 C and packaged off in an appropriate container.

Example 26

A dye was required in order to determine effectiveness of coating 20 grams of each Example was placed under agitation and 0.4 grams of a 20% FD&C Blue #1 in a solvent was added to the 20 grams of each example. Each example was mixed for 15 minutes after addition of dye. Included in the testing were two aqueous commercial products, Avail & P-Max

| Sample ID prepared for coating test | |
|---|---|
| Example ID | Sample ID |
| Example 2 | Sample 1 |
| Example 3 | Sample 2 |
| Example 4 | Sample 3 |
| Example 6 | Sample 4 |
| Example 7 | Sample 5 |
| Example 8 | Sample 6 |
| Example 9 | Sample 7 |
| Example 10 | Sample 8 |
| Example 11 | Sample 9 |
| Example 12 | Sample 10 |
| Example 13 | Sample 11 |
| Example 14 | Sample 12 |
| Example 15 | Sample 13 |
| Example 16 | Sample 14 |
| Example 17 | Sample 15 |
| Example 18 | Sample 16 |
| Example 19 | Sample 17 |
| Example 20 | Sample 18 |
| Avail | Sample 19 |
| P-Max | Sample 20 |
| Example 23 | Sample 21 |
| Example 24 | Sample 22 |
| Example 25 | Sample 23 |

Example 27

200 grams of a technical grade of DAP were charged to a glass 1000 ml beaker. The beaker was then placed under an overhead agitator with an anchor agitator blade. The height of the beaker was adjusted such that the bottom of the anchor agitator blade was close to the bottom of the glass beaker. The RPM of the overhead stirrer was adjusted to 200 RPM's and the DAP was agitated for 30 seconds. After 30 seconds, a 2.0 gram of a sample of Example 21 was charged within 10 seconds. A stopwatch was used for timing to complete coating. (Visually: when 95% of DAP particles were colored blue). This was repeated for each of the tested samples from Example 26.

After coating, the 200 grams of coated DAP were poured in a one quart jar and 200 grams of weight were placed on top of each sample in the quart jar. After setting for 48 hours, the weight was removed and a lid was placed on each quart jar. Each jar was then inverted and rated for flowability. If the contents of a jar did not flow in 5 minutes, a wooden handle of a 4 inch spatula was used to tap the jar to encourage flow. Flow rating is as follows:

| Rating | Action after inversion |
|---|---|
| 1 | Instant flow |
| 2 | >70% flow in 1 minute |
| 3 | >70% flow in 1-3 minutes |
| 4 | >70% flow in 3-5 minutes |
| 5 | >70% flow after 1-2 taps |
| 6 | >70% flow after 3-4 taps |
| 7 | >70% flow after 5-6 taps |
| 8 | 40-60% flow after 5-6 taps |
| 9 | 20-40% flow after 5-6 taps |
| 10 | 0-20% flow after 5-6 taps |

| Sample Performance on DAP | | |
|---|---|---|
| Sample ID | Time to coat in seconds | 48 hour pack test |
| Sample 1 | 20 | 4 |
| Sample 2 | 24 | 5 |
| Sample 3 | 20 | 3 |
| Sample 4 | 15 | 2 |
| Sample 5 | 27 | 3 |
| Sample 6 | 26 | 4 |
| Sample 7 | 18 | 3 |
| Sample 8 | 14 | 2 |
| Sample 9 | 27 | 3 |
| Sample 10 | 34 | 5 |
| Sample 11 | 32 | 4 |
| Sample 12 | 25 | 4 |
| Sample 13 | 24 | 4 |
| Sample 14 | 24 | 4 |
| Sample 15 | 27 | 3 |
| Sample 16 | 29 | 5 |
| Sample 17 | 30 | 6 |
| Sample 18 | 21 | 2 |
| Sample 19* | 51 | 10 |
| Sample 20* | 56 | 10 |
| Sample 21 | 32 | 4 |
| Sample 22 | 28 | 4 |
| Sample 23 | 28 | 4 |

*Difficult to determine coating time as the color was streaky and not continuous.

Example 27A 200 grams of a technical grade of magnesium sulfate were charged to a glass 1000 ml beaker. The beaker was then placed under an overhead agitator with an anchor agitator blade. The height of the beaker was adjusted such that the bottom of the anchor agitator blade was close to the bottom of the glass beaker. The RPM of the overhead stirrer was adjusted to 200 RPM's and the magnesium sulfate was agitated for 30 seconds. After 30 seconds, a 2.0 gram of a sample of Example 21 was charged within 10 seconds. A stopwatch was used for timing to complete coating. (Visually: when 95% of magnesium sulfate particles were colored blue). This was repeated for each of samples tested. After coating, the 200 grams of coated magnesium sulfate were poured in a one quart jar and 200 grams of weight were placed on top of each sample in the quart jar. After setting for 48 hours, the weight was removed and a lid was placed on each quart jar. Each jar was then inverted and rated for flowability. If the contents of a jar did not flow in 5 minutes, a wooden handle of a 4 inch spatula was used to tap the jar to encourage flow. Flow rating is as follows:

| Rating | Action after inversion |
|---|---|
| 1 | Instant flow |
| 2 | >70% flow in 1 minute |
| 3 | >70% flow in 1-3 minutes |
| 4 | >70% flow in 3-5 minutes |
| 5 | >70% flow after 1-2 taps |
| 6 | >70% flow after 3-4 taps |
| 7 | >70% flow after 5-6 taps |
| 8 | 40-60% flow after 5-6 taps |
| 9 | 20-40% flow after 5-6 taps |
| 10 | 0-20% flow after 5-6 taps |

| Sample Performance on Magnesium Sulfate | | |
|---|---|---|
| Sample ID | Time to coat in seconds | 48 hour pack test |
| Sample 1 | 22 | 4 |
| Sample 2 | 23 | 5 |
| Sample 3 | 20 | 4 |
| Sample 4 | 18 | 2 |
| Sample 5 | 27 | 3 |
| Sample 6 | 29 | 3 |
| Sample 7 | 17 | 3 |
| Sample 8 | 14 | 2 |
| Sample 9 | 29 | 3 |
| Sample 10 | 31 | 6 |
| Sample 11 | 33 | 4 |
| Sample 12 | 26 | 4 |
| Sample 13 | 36 | 4 |
| Sample 14 | 25 | 5 |
| Sample 15 | 28 | 3 |
| Sample 16 | 29 | 5 |
| Sample 17 | 30 | 6 |
| Sample 18 | 18 | 2 |
| Sample 19* | 54 | 10 |
| Sample 20* | 58 | 10 |
| Sample 21 | 33 | 4 |
| Sample 22 | 28 | 3 |
| Sample 23 | 38 | 3 |

*Difficult to determine coating time as the color was streaky and not continuous.

Example 28

120 grams of prilled urea, 20 grams of fertilizer grade potassium sulfate, 40 grams of fertilizer grade diammonium phosphate, 10 grams of fertilizer grade zinc sulfate and 10 grams of fertilizer grade iron sulfate were charged to a glass 1000 ml beaker. The beaker was then placed under an overhead agitator with an anchor agitator blade. The height of the beaker was adjusted such that the bottom of the anchor agitator blade was close to the bottom of the glass beaker. The RPM of the overhead stirrer was adjusted to 200 RPM's and the contents of the compounded fertilizer were agitated for 30 seconds. After 30 seconds, a 2.0 gram of each sample to be tested was charged within 10 seconds. A stopwatch was used for timing to complete coating. (Visually: when 95% of magnesium sulfate particles were colored blue). This was repeated for each of the samples to be tested.

After coating, the 200 grams of coated compounded fertilizer were poured in a one quart jar and 200 grams of weight were placed on top of each sample in the quart jar. After setting for 48 hours, the weight was removed and a lid was placed on each quart jar. Each jar was then inverted and rated for flowability. If the contents of a jar did not flow in 5 minutes, a wooden handle of a 4 inch spatula was used to tap the jar to encourage flow. Flow rating is as follows:

| Sample ID | Time to coat in seconds | 48 hour pack test |
|---|---|---|
| Sample 1 | 18 | 3 |
| Sample 2 | 22 | 5 |
| Sample 3 | 23 | 3 |
| Sample 4 | 14 | 2 |
| Sample 5 | 26 | 3 |
| Sample 6 | 28 | 5 |
| Sample 7 | 20 | 3 |
| Sample 8 | 18 | 2 |
| Sample 9 | 25 | 3 |
| Sample 10 | 32 | 5 |
| Sample 11 | 28 | 4 |
| Sample 12 | 25 | 4 |
| Sample 13 | 26 | 3 |
| Sample 14 | 27 | 4 |
| Sample 15 | 27 | 3 |
| Sample 16 | 28 | 5 |
| Sample 17 | 28 | 6 |
| Sample 18 | 15 | 2 |
| Sample 19* | 47 | 8 |
| Sample 20* | 48 | 9 |
| Sample 21 | 29 | 5 |
| Sample 22 | 28 | 4 |
| Sample 23 | 29 | 5 |

*Difficult to determine coating time as the color was streaky and not continuous

| Rating | Action after inversion |
|---|---|
| 1 | Instant flow |
| 2 | >70% flow in 1 minute |
| 3 | >70% flow in 1-3 minutes |
| 4 | >70% flow in 3-5 minutes |
| 5 | >70% flow after 1-2 taps |
| 6 | >70% flow after 3-4 taps |
| 7 | >70% flow after 5-6 taps |
| 8 | 40-60% flow after 5-6 taps |
| 9 | 20-40% flow after 5-6 taps |
| 10 | 0-20% flow after 5-6 taps |

Example 29

100 grams of uncoated "tall" fescue grass seeds were charged to a glass 1000 ml beaker. The beaker was then placed under an overhead agitator with an anchor agitator blade. The height of the beaker was adjusted such that the bottom of the anchor agitator blade was close to the bottom of the glass beaker. The RPM of the overhead stirrer was adjusted to 100 RPM's and the seeds were agitated for 30 seconds. After 30 seconds, a 2.0 gram of a sample was charged within 10 seconds. The seeds were agitated until 95% of the seeds were coated.

After coating, the 1 gram of coated seeds was added to 150 ml glass beaker in a manner to insure the seeds were equally distributed on the bottom of the beaker. The top of the beaker was sealed with a plastic wrap and placed in an dark environment at 30 C. The beaker was checked at 7, 14 and 21 days for signs of germination and rated for % of seeds that germinated.

After 60 days, the plastic wrap covering was slit and a prepared Contec test strip was inserted and placed just above the seed to test for presence of mold and mildew.

| Rating | % germination of seeds |
|---|---|
| 0 | None |
| 1 | 0-5% |
| 2 | 5-10% |
| 3 | 10-20% |
| 4 | 20-30% |
| 5 | >30% |

| Sample Performance on Tall Fescue Grass seed | | | |
|---|---|---|---|
| Sample ID | 7 days | 14 days | 21 days | Mold/mildew after 60 days |
| Sample 1 | 0 | 0 | 0 | No |
| Sample 2 | 0 | 0 | 0 | No |
| Sample 3 | 0 | 0 | 0 | No |
| Sample 4 | 0 | 0 | 0 | No |
| Sample 7 | 0 | 0 | 0 | No |
| Sample 8 | 0 | 0 | 0 | No |
| Sample 9 | 0 | 0 | 0 | No |
| Sample 10 | 0 | 0 | 0 | No |
| Sample 14 | 0 | 0 | 0 | No |
| Sample 18 | 0 | 0 | 0 | No |
| Sample 19 | 0 | 1 | 2 | Yes |
| Sample 20 | 0 | 1 | 2 | Yes |

The below table 1 summarizes the compositions that occur in each of the examples. The presence of an "X" in table 1 means that the particular example composition contains that particular component.

Samples from Examples 1-25 were evaluated for safety and environmental properties and the results are shown in the below Table 2:

TABLE 2

| Sample # | Human Health Rating | Flash Point ° F. | Aquatic Toxicity Rating |
|---|---|---|---|
| Ex 1 | 1.0 | >145° | Low |
| Ex 2 | 1.0 | >145° | Low |
| Ex 3 | 1.0 | >145° | Low |
| Ex 4 | 1.0 | >145° | Low |
| Ex 5 | 1.0 | >145° | Low |
| Ex 6 | 1.0 | >145° | Low |
| Ex 7 | 1.0 | >145° | Low |
| Ex 8 | 1.0 | >145° | Low |
| Ex 9 | 1.0 | >145° | Low |
| Ex 10 | 1.0 | >145° | Low |
| Ex 11 | 1.0 | >145° | Low |
| Ex 12 | 1.0 | >145° | Low |
| Ex13 | 1.0 | >145° | Low |
| Ex 14 | 1.0 | >145° | Low |
| Ex 15 | 1.0 | >145° | Low |
| Ex 16 | 1.0 | >145° | Low |
| Ex 17 | 1.0 | >145° | Low |
| Ex 18 | 1.0 | >145° | Low |
| Ex 19 | 1.0 | <145° | Low |
| Ex 20 | 1.0 | >145° | Low |
| Ex 21 | 1.0 | >145° | Low |
| Ex 22 | 1.0 | >145° | Low |
| Ex 23 | 1.0 | >145° | Low |
| Ex 24 | 1.0 | >145° | Low |
| Ex 25 | 1.0 | >145° | Low |

The Human Health rating is based on HMIS (Hazardous Materials Information System) rating on Health of any organic solvent component >2%

The Flash Point is based on flash point of any organic solvent component >5%

TABLE 1

| Example No. | DMSO | Glycerine | TPGME | Sorbitol | DMG | PG | DPG | EG | PC | TT | DD | AT | DMA |
|---|---|---|---|---|---|---|---|---|---|---|---|---|---|
| 1 | | | | | | | | | X | | | | |
| 2 | | | | | | | X | | X | | | | |
| 3 | | X | | | | | | | X | | | | |
| 4 | | | X | | | | | | X | | | | |
| 5 | | | | | | | | | X | | | | |
| 6 | | | | | | | | | X | | | | |
| 7 | | | | | | X | | | X | | | | |
| 8 | | X | | | | | | | X | | | | |
| 9 | | | | | | | | | X | | | | |
| 10 | X | | | | | | | | | | | | |
| 11 | X | | | | | | | | | | | | |
| 12 | | | | | | | | | X | | | | |
| 13 | | | | | | | | | X | | | | |
| 14 | X | | | | | X | | | X | | | | |
| 15 | X | | | | | | | | | | | | |
| 16 | | | | | | | | | X | | | | |
| 17 | | | | | | | | | X | | | | |
| 18 | | | | | | | | | X | | | | |
| 19 | X | | | X | | | | | | | | | |
| 20 | | | | | | X | | | | | | | |
| 21 | | X | | | | | | | | | | | |
| 22 | | X | | | | | | | | | | | |
| 23 | | X | | | | X | | | | | | | |
| 24 | | | | | | | | X | | | | | |
| 25 | | | | | | | | X | | | | | |

DMSO-dimethylsulfwdde
TPGME-tripropylene glycol methyl ether
PG-propylene glycol
DPG-dipropylene glycol
EG-ethylene glycol
DMG-Dimethyl Gluterate The Aquatic Toxicity Rating is based on any organic solvent component at any level

Example 30

100 grams of dimethyl sulfoxide were heated to 60° C. Under agitation 75 grams of a polysuccinimide (polymer molecular weight: 3000-5000 Da) were slowly charged. After two hours of mixing, the polysuccinimide was completely dissolved and the batch was cooled and packaged.

Example 31

2000 grams of dimethyl sulfoxide were heated to 60° C. and then 1450.38 grams of a polysuccinimide (polymer molecular weight: 3000-5000 Da) were slowly charged under strong agitation. After two hours of mixing at 60° C., 295.72 grams of distilled water were charged and then 253.9 grams of ammonia gas were slowly charged through sparging into the mixture while maintaining the temperature at 60-80° C. The batch was cooled and packaged.

Example 32

1470.47 grams of dimethyl sulfoxide were heated to 60° C. and then 1075.34 grams of a polysuccinimide (polymer molecular weight: 3000-5000 Da) were slowly charged under strong agitation. After two hours of mixing at 60° C., 59.02 grams of a zinc oxide powder were slowly sifted into the mixture to prevent clumping of the powder under strong agitation. 219.25 grams of distilled water were charged and the content of the reactor were mixed until all particles were dissolved. 175.92 grams of ammonia gas were slowly charged through sparging into the mixture while maintaining the temperature at 60-80° C. The batch was cooled and packaged with a 10% pH of 7.8 and an elemental zinc content of 1.58%.

Example 33

237 grams of dimethyl sulfoxide were heated to 80° C. and then 86 grams of dicyandiamide were charged under agitation and held at 80° C. until the dicyandiamide was completely dissolved. 107.8 grams of a polysuccinimide (polymer molecular weight: 3000-5000 Da) were slowly charged under strong agitation while the batch temperature was allowed to drop to 60° C. The batch was held at 60° C. and agitated until batch was free of particles. The batch was cooled and packaged as a combination of a nitrification inhibitor and a organo polycarboxylate functionality.

Example 34

41.72 grams of a solution of 43% of a dicyandiamide-formaldehyde oligomer in 57% dimethyl sulfoxide were heated to 60° C. 58.28 grams of Example 30 were charged and mixed until homogeneous. The batch was cooled and packaged.

Example 35

38 grams of Example 5, 21 grams of propylene glycol, 9 grams of dimethyl sulfoxide and 0.25 grams of triethanolamine were charged, heated to 45° C. under agitation. 25.8 grams of N-(n-butyl) thiophosphoric triamides powder were slowly charged to the batch and mixed until all of the N-(n-butyl) thiophosphoric triamide was dissolved. 6.0 grams of FD&C Blue #1 dissolved in DMSO at 20:80 ratio were charge and mixed until homogeneous. The batch was cooled and packaged.

Example 36

74.69 grams of ethylene glycol, 74.69 grams of ethylenediamine tetraacetic acid, 0.93 grams of 50% hypophosphoric acid and 0.04 of 70% methane sulfonic acid were mixed and heated to 180° C. under a nitrogen sparge and held a 180-185° C. until the reaction was free of particles and that 18-24 grams of distillate were removed. The reaction was cooled to 140-150° C. and 20.8 grams of Zinc Oxide were slowly shifted into the reactor to prevent the powder from clumping. 11.93 grams of distilled water were slowly charged over a 30 minute period. The reaction temperature was maintained at 140-180° C. until the reaction appearance was clear and free of particles. The reaction was cooled to 120° C. and 21.51 grams of KOH flakes were slowly charged to control the exotherm. After the KOH flakes were charge the batch was cooled to 60-80° C. and held until IR scan revealed no ester linkages remained. The batch was then cooled and packaged with a 84% yield and approximately 9.32% elemental Zinc. Product did thicken to a paste upon standing and was used as an intermediate for other examples.

Example 37

14 grams of Example 36, 40 grams of ethylene glycol and 50 grams of a 50% solution of N-(n-butyl) thiophosphoric triamide in dimethyl sulfoxide were mixed together and then packaged.

Example 38

128.25 grams of ethylene carbonate, 101.34 grams of ethylenediamine tetraacetic acid, 65.65 grams of ethylene glycol and 1.44 grams of KOH flakes were charged to a reactor and heated to 180-185° C. under agitation and nitrogen sparge. After the reaction off-gassed the $CO_2$ by-product and mixed for 1 hour, the reaction product cleared and was cooled to 160° C. 28.22 grams of a Zinc Oxide powder were slowly sifted into the reaction under strong agitation to prevent the powder from clumping. 16.19 grams of distilled water were slowly charged over a 30 minutes period while the reaction temperature was maintained at 140-180° C. The reaction was maintained at 140-180° C. until the appearance was clear and free of particles. Excess water distilled from reaction was removed and reaction was cooled to 60° C. and packaged. The reaction product contained approximately 8.42% elemental zinc.

Example 39

113.4 grams of dimethyl sulfoxide and 1.0 grams of triethanolamine were charged and heated to 45° C. under agitation. 11.85 grams of Example 38 and 30.93 grams N-(n-butyl) thiophosphoric triamide were charged and mixed until homogenous. Batch was cooled and packaged as a urease inhibitor with approximately 1% elemental zinc.

Example 40

88.15 grams of a 34% dicyandiamide in 56% DMSO were charged and heated to 45° C. with agitation. 11.85 grams of Example 38 were charged. Contents were mixed until homogeneous and the cooled and packaged as nitrification inhibitor with 1% elemental zinc.

Example 41

88.15 grams of a solution of 43% of a dicyandiamide-formaldehyde oligomer in 57% dimethyl sulfoxide were charged and heated to 45° C. 11.85 grams of Example 38 were charged and the contents mixed until homogeneous. Batched was cooled and packaged as a slow release nitrification inhibitor with 1% elemental zinc.

Example 42

141.23 grams of diethylenetriamine pentaacetic acid, 111.43 grams of ethylene glycol and 1.01 grams of 50% hypophosphorous acid and 1.77 grams of methane sulfonic acid were charged to a reactor and heated to 180-185° C. under agitation and nitrogen sparge. After the reaction product cleared and approximately 33 grams of water were removed, the reaction was cooled and packaged.

Example 43

103 grams of Example 42 were charged and heated to 160° C. under nitrogen sparge and agitation. 10.42 grams of $Fe_2O_3$ powder were slowly sifted in the reaction. The reaction was held a 140-180° C. and mixed until all the $Fe_2O_3$ powder had dissolved. The reaction was cooled and a product containing a chelated 6.6% elemental Fe was packaged.

Example 44

592.23 grams of ethylene glycol were heated to 60° C. Under agitation 407.77 grams of a polysuccinimide (polymer molecular weight: 3000-5000 Da) were slowly charged. The batch was then heated to 140° C. and held until the polysuccinimide was completely dissolved. The reaction was then cooled and packaged.

Example 45

499.98 grams of Example 44 were charged to a reactor and heated to 140° C. with agitation and a nitrogen sparge. 6.64 grams of ZnO were slowly sifted into the reactor and then 1.61 grams of distilled water were charged. The reaction was held at 140-150° C. and mixed until all the Zinc Oxide had dissolved and the product was clear. The reaction was cooled and a product containing 1% elemental zinc was packaged.

Example 46

56.2 grams of dimethyl sulfoxide, 1 gram triethanolamine and 11.85 grams of Example 42 were charge and heated to 45° C. under agitation. 30.93 grams of N-(n-butyl) thiophosphoric triamides were charged and mixed until dissolved. The product was cooled and packaged as a urease inhibitor containing complex to free up nutrients and micronutrients bound as insoluble salts and complexes in the soil.

Example 47

84.85 grams of a solution of 34% dicyandiamide in 56% dimethyl sulfoxide were heated to 45° C. and 15.15 grams of Example 43 were charge and mixed until homogeneous. The product was cooled and packaged as a nitrification inhibitor containing a chelated 1% elemental Fe.

Example 48

52.92 grams of dimethyl sulfoxide, 1 gram triethanolamine and 15.15 grams of Example 43 were charge and heated to 45° C. under agitation. 30.93 grams of N-(n-butyl) thiophosphoric triamides were charged and mixed until dissolved. The product was cooled and packaged as a urease inhibitor containing a chelated 1% elemental Fe.

Example 49

Coating Performance

A dye was required to be added at a composition of 1% of a 20% FD&C Blue #1 in DMSO to 50 grams of each sample in order to determine effectiveness of coating properties. Each example was mixed for 15 minutes after addition of dye. 200 grams of a technical grade of urea were charged to a glass 1000 ml beaker. The beaker was then placed under an overhead agitator with an anchor agitator blade. The height of the beaker was adjusted such that the bottom of the anchor agitator blade was close to the bottom of the glass beaker. The RPM of the overhead stirrer was adjusted to 200 RPM's and the urea was agitated for 30 seconds. After 30 seconds, a 2.0 gram of a sample of the Example to be evaluated was charged within 10 seconds. A stopwatch was used for timing to complete coating. (Visually: when 95% of urea particles were colored blue).

After coating, the 200 grams of coated urea were poured in a one quart jar and 200 grams of weight were placed on top of each sample in the quart jar. After setting for 48 hours, the weight was removed and a lid was placed on each quart jar. Each jar was then inverted and rated for flowability. If the contents of a jar did not flow in 5 minutes, a wooden handle of a 4 inch spatula was used to tap the jar to encourage flow. Flow rating is as follows:

| Rating | Action after inversion |
|---|---|
| 1 | Instant flow |
| 2 | >70% flow in 1 minute |
| 3 | >70% flow in 1-3 minutes |
| 4 | >70% flow in 3-5 minutes |
| 5 | >70% flow after 1-2 taps |
| 6 | >70% flow after 3-4 taps |
| 7 | >70% flow after 5-6 taps |
| 8 | 40-60% flow after 5-6 taps |
| 9 | 20-40% flow after 5-6 taps |
| 10 | 0-20% flow after 5-6 taps |

| Sample Performance on urea | | |
|---|---|---|
| Sample ID | Time to coat in seconds | 48 hour pack test |
| Example 37 | 20 | 2 |
| Example 39 | 24 | 3 |
| Example 40 | 19 | 5 |
| Example 41 | 21 | 2 |
| Example 46 | 18 | 4 |
| Example 47 | 24 | 2 |

Results show that Examples easily coat urea and demonstrate good flow properties after storage.

The following references are incorporated by reference in their entireties.

| | |
|---|---|
| 4,839,461 | Boehmke |
| 4,172,072 | Ashmead |
| 4,799,953 | Danzig |
| 4,813,997 | Kinnersley |
| 4,863,506 | Young |
| 5,059,241 | Young |
| 5,047,078 | Gill |
| 5,350,735 | Kinnersley |
| 5,593,947 | Kinnersley |
| 5,783,523 | Koskan |
| 5,814,582 | Koskan |
| 6,753,395 | Sanders |
| 6,756,461 | Sanders |
| 6,818,039 | Sanders |
| 8,043,995 | Sanders |
| 8,016,907 | Sanders |
| 8,025,709 | Sanders |
| 9,359,264 | Sanders |
| 9,139,481 | Sanders |
| U.S. patent application Ser. No. 14/740,327 | McKnight |
| U.S. patent application Ser. No. 15/079,844 | McKnight |
| U.S. patent application Ser. No. 15/854,319 | McKnight |

It is contemplated and therefore within the scope of the present invention that any feature that is described above can be combined with any other feature that is described above. When mixtures, solutions, formulations and/or compositions are discussed, it should be understood that those mixtures, formulations and/or compositions are contemplated as being parts of bigger mixtures, formulations and/or compositions. Further, if a composition is enumerated, methods using and methods of making that composition are contemplated and within the scope of the present invention. When a range is discussed, it is contemplated and therefore within the scope of the invention that any number that falls within that range is contemplated as an end point generating a plurality of sub-ranges within that range. For example if a range of 1-10 is given, 2, 3, 4, 5, 6, 7, 8, and 9 are contemplated as end points to generate a sub-range that fit within the scope of the enumerated range. Moreover, it should be understood that the present invention contemplates minor modifications that can be made to the compositions and methods of the present invention. In any event, the present invention is defined by the below claims.

We claim:

1. A composition of a liquid formulation comprising a) Organo Polycarboxylate Functionalities (OPCF)s and/or their salts and b) a Non-aqueous Organo Solvent Delivery System (NOSDS),
   wherein the one or more OPCFs is selected from the group consisting of amino polycarboxylate functionalities and/or their salts wherein the amino polycarboxylate functionalities and/or their salts are one or more members selected from the group consisting of a) ethylenediaminetetraacetic acid, b) N-hydroxyethylethylenediaminetriacetic acid, c) diethylenetriaminepentaacetic acid, d) cyclohexanediaminetetraacetic acid, e) propylenediaminetetraacetic acid, f) ethylenediamine-N,N'-disuccinic acid, g) methylglycinediacetic acid, h) L-glutamic acid N,N-diacetic acid, i) nitrilotriacetic acid, j) N,Nbis(carboxymethyl)glutamic acid, k) ethylenediamine-N,N'-bis(2-hydroxyphenylacetic acid, l) N,N'-bis(2-hydroxybenzyl)ethylenediamine-N,N'-diacetic acid, m) glycine, n) N,N'-ethylenebis(N-salicyl) and o) iminodisuccinic acid,
   wherein the NOSDS comprises one or more solvents selected from the group consisting of protic and aprotic solvents wherein the protic solvents are one or more members selected from the group consisting of:
   a) an alcohol from the family of $C_{1-10}$ alkanols,
   b) one or more polyols selected from the group consisting of i) trimethylol propane, ii) trimethylol ethane, iii) pentaerythritol, iv) sorbitol v) sorbitan, vi) glucose, vii) fructose, viii) galactose, and ix) glycerin,
   c) poly($C_{1-10}$ alkylene) glycols,
   d) one or more alkylene glycols selected from the group consisting of i) ethylene, ii) 1,3 propylene glycol, iii) 1,2 propylene glycol, and iv) butylene glycol,
   e) isopropylidene glycerol,
   f) one or more alkylene glycol alkyl ethers selected from the group consisting of i) tripropylene glycol methyl ether, ii) tripropylene glycol butyl ether, iii) dipropylene glycol butyl ether and iv) dipropylene glycol butyl ether,
   g) one or more alkyl lactates selected from the group consisting of i) ethyl lactate, ii) propyl lactate and iii) butyl lactate,
   h) one or more alkanolamine selected from the group consisting of i) ethanolamine, ii) diethanolamine, iii) dipropanolamine, iv) methyl diethanolamine, v) monoisopropanolamine and vi) triethanolamine, and
   i) glycerol carbonate,
   wherein the aprotic solvents are one or more members selected from the group consisting of:
   a) dimethyl sulfoxide,
   b) dialkyl, diaryl, or alkylaryl sulfoxide(s) having the formula:

$R_1S(O)_xR_2$ wherein $R_1$ and $R_2$ are each independently a $C_{1-6}$ alkylene group, an aryl group, or $C_{1-3}$alkylenearyl group or $R_1$ and $R_2$ with the sulfur to which they are attached form a 4 to 8 membered ring wherein $R_1$ and $R_2$ together are a $C_{1-6}$ alkylene group which optionally contains one or more atoms selected from the group consisting of O, S, Se, Te, N, and P in the ring and x is 1 or 2,
   c) one or more alkylene carbonates selected from the group consisting of i) ethylene carbonate, ii) propylene carbonate and iii) butylene carbonate,
   d) one or more polyols capped with acetate or formate wherein the one or more polyols are selected from the group consisting of i) ethylene glycol, ii) 1,3 propylene glycol, iii) 1,2 propylene glycol, iv) butylene glycol, v) trimethylol propane, vi) trimethylol ethane, vii) pentaerythritol, viii) sorbitol, vii) sorbitan, viii) glucose, ix) fructose, x) galactose and xi) glycerin,
   e) one or more alkylene glycol alkyl ethers acetates selected from the group consisting of i) dipropylene glycol methyl ether acetate, iii) tripropylene glycol methyl ether acetate, and iii) tripropylene glycol butyl ether acetate,
   f) isophorone,
   g) one or more dialkyl esters selected from the group consisting of
      i) dimethylsuccinate, ii) dimethyl adipate, iii) diethyl glutarate, and iv) dimethyl glutarate,
   h) dimethylacetamide,
   i) dimethylformamide,
   j) dimethyl-2-imidazolidinone,
   k) hexamethylphosphoramide,
   l) 1,2-dimethyloxethane, 2-methoxyethyl ether,
   m) cyclohexylpyrrolidone,
   n) limonene, and o) one or more organo phosphorous liquids selected from the group consisting of hexamethylphosphoramide and one or more trialkylphosphates represented by the formula:

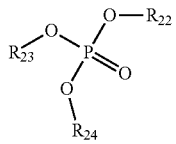

wherein:

$R_{22}$ is an alkyl radical —$C_1H_3$ to —$C_6H_{13}$, $R_{23}$ is an alkyl radical —$C_1H_3$ to —$C_6H_{13}$, $R_{24}$ is an alkyl radical —$C_1H_3$ to —$C_6H_{13}$, and wherein the composition of liquid formulation comprises less than 5% water.

2. The composition of claim 1, wherein the OPCFs further comprise one or more carboxylic functionalities selected from the group consisting of, a) carboxylic anhydrides b) carboxylic imides, and c) one or more carboxylic esters, and wherein said carboxylic esters are derived from the reaction of a carboxylate functionality with a protic NOSDS.

3. The composition of claim 1, wherein said amino polycarboxylate salts are derived from the reaction of a neutralizing agent with a carboxylate functionality.

4. The composition of claim 1, wherein the composition:
a. is environmentally safe;
b. has flashpoints above 62.8° C.;
c. is inherently rated safe for contact with humans and animals;

d. provides stable dispersions of OPCFs and/or their salts at levels of 1-70% in a NOSDS, e. provides improved even application of a coating to fertilizer granules while not causing clumping of the fertilizer granules, f. is quickly and evenly dispersed into one or more mobile liquid forms of nitrogen selected from the group consisting of an aqueous dispersion, pressurized ammonia gas, molten urea and molten modified urea, and g. will not cause a violent exotherm when mixed with anhydrous ammonia.

5. The composition of claim 1, wherein the composition further comprises one or more members selected from the group consisting of:

a. one or more bio-active agents selected from the group consisting of i) urease inhibitors, ii) nitrification inhibitors, iii) pesticides, iv) herbicides, v) fungicides, vi) insecticides and vii) biologics, b. a food coloring or dye, c. scents or masking agents, d. nonionic, anionic, cationic, zwitterionic, and/or amphoteric surfactants, e. buffering agents, micronutrients and one or more flow modifiers selected from the group consisting of silica, zinc stearate and calcium stearate, and f. one or more crosslinking agents selected from the group consisting of i) paraformaldehyde, ii) trioxane, iii) one or more methoxy capped formaldehyde reaction products selected from the group consisting of 1,3,4,6-Tetrakis(methoxymethyl)glycoluril and N,N,N',N',N",N"-Hexakis(methoxymethyl)-1,3,5-triazine-2,4,6-triamine.

6. The composition of claim 5, wherein the one or more bio-active agents are selected from the group consisting of:

a) one or more biologics selected from the group consisting of:

i) *Bacillus* biologics, ii) *Azospirillum* biologics, iii) *Azobacter* biologics iv) *Gluconacetobacter* biologics, v) *Phosphobacteria*, vi) *Cyanobacteria*, vii) *Herbaspirillum*, viii) *Burkholderia*, ix) *Pseudomonas*, x) *Gluconacetobacter*, xi) *Enterobacter*, xii) *Klebsiella*, xiii) *Burkholderia*, xiv) *Bradyrhiwbium* species, xv) *Bradyrhiwbium japonicum*, xvi) *Rhizobium meliloti*, xvii) *Laccaria* bicolor, xviii) *Glomus imraradices timanita*, xix) *Actinomyces*, xx) *Penicillium*, xxi) *Mesorhizobiwn cicero*, xxii) one or more insecticidal or insect repellent microbial species and strains selected from a group consisting of:

(1) *Telenomus podisi*, (2) *Baculovirus anticarsia*; (3) *Trichogramma pretiosum*, (4) *Trichogramma gallai*, (5) *Chromobacterium subtsugae*, (6) *Trichoderma fertile*, (7) *Beauveria bassiana*, (8) *Beauveria bassiana*, (9) *Beauveria bassiana*, (10) *Paecilomyces jknwsoroseu*, (11) *Trichoderma harzianum*, (12) *Verticillium lecanii*, (13) *lsarfofumosarosea Lecanicillium muscarium*, (14) *Streptomyces microflavus*, and (15) *Muscodor albus,* xxiii) one or more nematodal microbial species and strains selected from the group consisting of:

(1) *Myrothecium verrucaria*, (2) *Pasteuria* species, (3) *Pasteuria Metarhizium* species, (4) *Flavobacteriwn* species, xxiv) *Reynoutria sachalinensis,* xxv) one or more antifungal, antimicrobial and/or plant growth promoting microbial species and strains selected from a group consisting of:

(1) *Gliocladium* species, (2) *Pseudomonas* species (e.g. *Pseudomonas fluorescens*, (3) *Pseudomonas fluorescens, putida* (4) *P. chlororaphis*), (5) *Pseudomonasfluorescens* VP5, (6) *Pseudomonas diazotrophicus*, (7) *Enterobacter cloacae*, (8) *Trichodema* species, (9) *Trichoderma virens*, (10) *Trichoderma atroviride* strains, (11) *Coniothyrium minitans*, (12) *Gliocladium* species, (13) *Gliacladium virens*, (14) *Gliacladium roseum*, and (15) *Trichodemw harzianum* species, b) and one or more bio active agents selected from the group consisting of:

i) one or more urease inhibitors selected from the group consisting of (1) aliphatic phosphoric triamide, (2) phosphoramides, (3) N-alkyl thiophosphoric triamides, (4) N-(n-butyl) thiophosphoric Triamide, (5) one or more (aminomethyl)phosphinic acids and their salts of the formula:

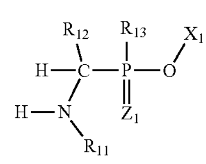

wherein:

$R_{11}$ is selected from the group consisting of H, $CH_3$, $C_2H_5$, $C_3H_7$, $C_4H_9$, $C_5H_{11}$, $C_6H_{13}$, $C_7H_{15}$, and $C_8H_{17}$, $R_{12}$ is selected from the group consisting of H, $CH_3$, $C_2H_5$, $C_3H_7$, $C_4H_9$, $C_5H_{11}$, and $C_6H_{13}$, $R_{13}$ is selected from the group consisting of H, O—$X_3$, $CH_3$, $C_2H_5$, $C_3H_7$, $C_4H_9$, $C_5H_{11}$, $C_6H_{13}$, $C_7H_{15}$, $C_8H_{17}$, $OCH_3$, $OC_2H_5$, $OC_3H_7$, $OC_4H_9$, $OC_5H_{11}$, $OC_6H_{13}$, $OC_7H_{15}$, and $OC_8H_{17}$, wherein
(1) X3 is selected from the group consisting of:
  (a) H, Na, Li, and K,
  (b) $NH_4$,
  (c) one or more organoamines selected from the group consisting of (i) mono $C_{1-6}$ amine, (ii) di $C_{1-6}$ amine, (iii) tri $C_{1-6}$ amine, (iv) mono ethanol amine, (v) diethanol amine, (vi) triethanol amine, (vii) monoisopropanol amine, (viii) diisopropanol amine, (ix) triisopropanol amine, (x) ethylene diamine, (xi) diethylene triamine, (xii) triethylene tetraamine, and (xiii) tetraethylene pentamine,
(2) $X_1$ is one or more members selected from the group consisting of:
  (a) H, Na, Li, and K,
  (b) $NH_4$,
  (c) one or more organoamines selected from the group consisting of: (i) mono $C_{1-6}$ amine, (ii) di $C_{1-6}$ amine, (iii) tri $C_{1-6}$ amine, (iv) mono ethanol amine, (v) diethanol amine, (vi) triethanol amine, (vii) monoisopropanol amine, (viii) diisopropanol amine, (ix) triisopropanol amine, (x) ethylene diamine, (xi) diethylene triamine, (xii) triethylene tetraamine, and (xiii) tetraethylene pentamine, $Z_1$ is one or more members selected from the group consisting of Oxygen and Sulfur, and (6) one or more bis-(aminomethyl)phosphinic acids and their salts of the formula:

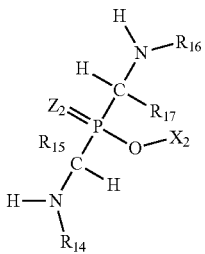

wherein:
$R_{14}$ is one or more members selected from the group consisting of H, $CH_3$, $C_2H_5$, $C_3H_7$, $C_4H_9$, $C_5H_{11}$, $C_6H_{13}$, $C_7H_{15}$, and $C_8H_{17}$,
$R_{15}$ is one or more members selected from the group consisting of H, $CH_3$, $C_2H_5$, $C_3H_7$, $C_4H_9$, $C_5H_{13}$, and $C_6H_{13}$,
$R_{16}$ is one or more members selected from the group consisting of H, $CH_3$, $C_2H_5$, $C_3H_7$, $C_4H_9$, $C_5H_{11}$, $C_6H_{13}$, $C_7H_{15}$, and $C_8H_{17}$,
$R_{17}$ is one or more members selected from the group consisting of H, $CH_3$, $C_2H_5$, $C_3H_7$, $C_4H_9$, $C_5H_{11}$, and $C_6H_{13}$,
$X_2$ is one or more members selected from the group consisting of
  (a) H, Na, Li, and K,
  (b) $NH_4$,
  (c) one or more organoamines selected from the group consisting of (i) mono $C_{1-6}$ amine, (ii) di $C_{1-6}$ amine, (iii) tri $C_{1-6}$ amine, (iv) mono ethanol amine, (v) diethanol amine, (vi) triethanol amine, (vii) monoisopropanol amine, (viii) diisopropanol amine, (ix) triisopropanol amine, (x) ethylene diamine, (xi) diethylene triamine, (xii) triethylene tetraamine, and (xiii) tetraethylene pentamine, c) one or more nitrification inhibitors selected from the group consisting of 2-chloro-6-trichloromethyl)pyridine, ii) 4-amino-1,2,4,6-triazole-HCl, iii) 2,4-diamino-6-trichloromethyltriazine CL-1580, iv) dicyandiamide (DCD), v) thiourea, vi) 1-mercapto-1,2,4-triazole, vii) ammonium thiosulfate, viii) dimethylpyrazole salts, and ix) 2-amino-4-chloro-6-methylpyrimidine, d) one or more fungicides selected from the group consisting of i) azoxystrobin, ii) *bacillus* lichenformis, ii) boscalid, captan, iv) chloroneb, v) chlorothalonil, vi) ethazole (etridiazole), vii) fenarimol, viii) fludioxonil, ix) flutolanil, x) fosetyl-aluminum, xi) iprodione, xii) mancozeb, xiii) mefenoxam, xiv) myclobutanil, xv) potassium phosphite, xvi) polyoxin D, xvii) propamocarb, xviii) propiconazole, xix) pyraclostrobin, xx) tebuconazole, xxi) thiophanate-methyl, xxii) thiram, xxiii) triadimefon, xxiv) trifloxystrobin, and xxv) vinclozolin, e) one or more herbicides selected from the group consisting of 2,4-D, 2,4-DB, acetochlor, acifluorfen, alachlor, ametryn, atrazine, aminopyralid, benefin, bensulfuron, bensulide, bentazon, bromacil, bromoxynil, butylate, carfentrazone, chlorimuron, chlorsulfuron, clethodim, clomazone, clopyralid, cloransulam, cycloate, DCPA, desmedipham, dicamba, dichlobenil, diclofop, diclosulam, diflufenzopyr, dimethenamid, diquat, diuron, DSMA, endothall, EPTC, ethalfluralin, ethofumesate, fenoxaprop, fluazifop-P, flucarbazone, flufenacet, flumetsulam, flumiclorac, flumioxazin, fluometuron, fluroxypyr, fomesafen, foramsulfuron, glufosinate, glyphosate, halosulfuron, hexazinone, imazamethabenz, imazamox, imazapic, imazaquin, imazethapyr, isoxaben, isoxaflutole, lactofen, linuron, MCPA, MCPB, mesotrione, metolachlor-s, metribuzin, metsulfuron, molinate, MSMA, napropamide, naptalam, nicosulfuron, norflurazon, oryzalin, oxadiazon, oxyfluorfen, paraquat, pelargonic acid, pendimethalin, phenmedipham, picloram, primisulfuron, prodiamine, prometryn, pronamide, propanil, prosulfuron, pyrazon, pyrithiobac, quinclorac, quizalofop, rimsulfuron, sethoxydim, siduron, simazine, sulfentrazone, sulfometuron, sulfosulfuron, tebuthiuron, terbacil, thiazopyr, thifensulfuron, thiobencarb, tralkoxydim, triallate, triasulfuron, tribenuron, triclopyr, trifluralin, and triflusulfuron, f) and one or more insecticides selected from the group consisting of bifenthrin, cypermethrin, permethrin, piperonyl butoxide, lambda-cyhalothrin, (s)-methoprene, deltamethrin, permethrin, esfenvalerate, pyriproxyfen, fipronil, etofenprox, cyphenothrin, carbofuran, chlorpoyrifos, disulfoton, fenvalerate, ethoprop, fonofos, malathion, permethrin, phorate, tefluthrin, terbufos, trimethacarb, allicin, anabasine, azadirachtin, carvacrol, d-limonene, matrine, nicotine, nornicotine, oxymatrine, pyrethrins, cinerins, jasmolin, quassia, rhodojaponin, rotenone, ryania, sabadilla, sanguinarine, triptolide, carbamate insecticides, benzofuranyl methylcarbamate insecticides, dimethylcarbamate insecticides, oxime carbamate insecticides, phenyl methylcarbamate insecticides, dinosam, DNOC, fluorine insecticides, formamidine insecticides, amitraz, chlordimeform, formetanate, formparanate, medimeform, and semiamitraz.

7. The composition of claim 1, wherein the composition further comprises one or more slow release bio-active agents selected from the group consisting of a) a composition comprising a polymer/oligomer resulting from a reaction of formaldehyde and dicyandiamide wherein a cyano functionality of the dicyandiamide has been conserved wherein a reaction medium is an aprotic NOSDS and b) a composition comprising a polymer/oligomer resulting from a reaction of formaldehyde and one or more pyrazoles utilizing an aprotic NOSDS as reaction medium wherein the one or more pyrazoles has the structure:

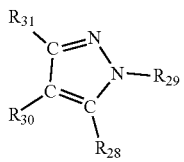

wherein $R_{28}$=—H, —CH$_3$, —CH$_2$CH$_3$, —NH$_2$ or —NHCH$_3$, wherein $R_{29}$=—H, —OH, —SH, —CONH$_2$ or —CONHCH$_3$, wherein $R_{30}$=—H, —CH$_3$, —CH$_2$CH$_3$, —NH$_2$ or —NHCH$_3$, wherein $R_{31}$=—H, —CH$_3$, —CH$_2$CH$_3$, —NH$_2$ or —NHCH$_3$.

8. The composition of claim 3, wherein said neutralizing agents comprises of a) one or more metal cations, wherein the one or more metal cations are derived from the group consisting of i) elemental metals ii) metal oxides iii) metal hydroxides, iv) metal alkylates, and v) metal carbonates, and wherein the one or more metal cations are selected from the group consisting of Na, K, Mg, Ca, Fe, Zn, Mn, Cu, Co, Mo and Ni, and b) one or more nitrogen containing compounds, wherein the one or more nitrogen containing compounds are selected from the group consisting of i) ammonia, ii) ammonium hydroxide, and iii) one or more organoamines selected from the group consisting of: (1) mono $C_{1-6}$ amine, (2) di $C_{1-6}$ amine, (3) tri $C_{1-6}$ amine, (4) monoethanolamine, (5) diethanolamine, (6) triethanolamine, (7) monoisopropylamine, (8) diisopropylamine, (9) triisopropylamine, (10) diethylamine, (11) diethylene triamine, and (12) tetraethylene pentamine.

9. The composition of claim 1, wherein the composition further comprises one or more organic polymers/oligomers polycarboxylate functionalities, wherein the polymers and oligomers polycarboxylate functionalities comprise homopolymers, copolymers and terpolymers, which are a reaction product of one or more monomers selected from the group consisting of aspartic acid, glutamic acid, maleic acid, itaconic acid, citraconic acid, citric acid, acrylic acid, and methacrylic acid.

10. The composition of claim 9, wherein said one or more organic polymers/oligomers polycarboxylate functionalities comprise one or more carboxylic functionalities selected from the group consisting of a) carboxylic acids, b) carboxylic anhydrides c) carboxylic imides, d) one or more carboxylic esters and e) carboxylic acid salts, wherein said carboxylic acid salts are derived from the reaction of a neutralizing agent with a carboxylate functionality, and wherein said carboxylic esters are derived from the reaction of said carboxylate functionality with a protic NOSDS.

11. The composition of claim 10, wherein said neutralizing agent comprises one or more members selected from the group consisting of a) one or more metal cations and b) one or more nitrogen containing compounds, wherein the one or more metal cations are derived from the group consisting of: i) elemental metals ii) metal oxides iii) metal hydroxides, iv) metal alkylates, and v) metal carbonates, wherein the one or more metal cations are selected from the group consisting of Na, K, Mg, Ca, Fe, Zn, Mn, Cu, Co, Mo and Ni, and wherein the one or more nitrogen containing compounds are selected from the group consisting of i) ammonia, ii) ammonium hydroxide, and iii) one or more organoamines selected from the group consisting of: i) mono $C_{1-6}$amine, ii) di $C_{1-6}$ amine, iii) tri $C_{1-6}$ amine, iv) monoethanolamine, v) diethanolamine, vi) triethanolamine, vii) monoisopropylamine, viii) diisopropylamine, ix) triisopropylamine, x) diethylamine, xi) diethylene triamine, and xii) tetraethylene pentamine.

* * * * *